United States Patent
Alloin et al.

(10) Patent No.: US 9,385,780 B2
(45) Date of Patent: Jul. 5, 2016

(54) METHOD AND APPARATUS FOR DETECTING AND ANALYZING NOISE AND OTHER EVENTS AFFECTING A COMMUNICATION SYSTEM

(71) Applicant: IKANOS COMMUNICATIONS, INC., Fremont, CA (US)

(72) Inventors: Laurent F. Alloin, Monmouth Beach, NJ (US); Laurent Pierrugues, Fort Lee, NJ (US); Ming Gu, Holmdel, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 0 days.

(21) Appl. No.: 14/054,552

(22) Filed: Oct. 15, 2013

(65) Prior Publication Data

US 2014/0105262 A1    Apr. 17, 2014

Related U.S. Application Data

(60) Provisional application No. 61/714,195, filed on Oct. 15, 2012.

(51) Int. Cl.
  *H04B 3/46* (2015.01)

(52) U.S. Cl.
  CPC ........................................ *H04B 3/46* (2013.01)

(58) Field of Classification Search
  CPC ........................................................ H04B 3/46
  USPC ............................................................ 375/224
  See application file for complete search history.

(56) References Cited

U.S. PATENT DOCUMENTS

| 2002/0155811 | A1 | 10/2002 | Prismantas et al. |
| 2006/0039454 | A1 | 2/2006 | Cioffi |
| 2008/0190639 | A1* | 8/2008 | Baran et al. ..................... 174/50 |
| 2009/0252234 | A1 | 10/2009 | Samdani et al. |
| 2010/0061437 | A1* | 3/2010 | Samdani et al. .............. 375/227 |
| 2013/0290507 | A1* | 10/2013 | Drooghaag et al. ......... 709/223 |
| 2014/0098705 | A1* | 4/2014 | Chow et al. ................... 370/254 |

FOREIGN PATENT DOCUMENTS

| WO | WO03-094461 A1 | 11/2003 |
| WO | WO2011-065945 A1 | 6/2011 |
| WO | WO2012-091725 A1 | 7/2012 |

OTHER PUBLICATIONS

International Search Report and Written Opinion issued Feb. 17, 2014 for PCT/US2013/065090.

* cited by examiner

*Primary Examiner* — Juan A Torres
(74) *Attorney, Agent, or Firm* — Holland & Hart LLP

(57) ABSTRACT

The present invention generally relates to a method and apparatus for effectively detecting and characterizing noise and other events affecting a communications system such as digital subscriber lines (DSL). According to certain aspects, the invention includes a noise analysis engine that is embedded in customer premises equipment that classifies noise sources according to their specific characteristics and tracks each noise source in a dynamic manner, in such a way as to provide visibility to the changing noise environment within the customer premises and/or report this environment to a remote entity.

19 Claims, 25 Drawing Sheets

FIG. 14

METHOD AND APPARATUS FOR DETECTING AND ANALYZING NOISE AND OTHER EVENTS AFFECTING A COMMUNICATION SYSTEM

CROSS REFERENCE TO RELATED APPLICATIONS

This application claims the benefit under 35 USC 119(e) of prior U.S. Provisional Patent Application No. 61/714,195, filed Oct. 15, 2012, the disclosure of which is hereby incorporated by reference in its entirety.

FIELD OF THE INVENTION

The present invention relates generally to data communications, and more particularly to an embedded analysis engine for use in detecting and analyzing noise and other events impacting a communications systems.

BACKGROUND OF THE INVENTION

In a digital subscriber line (DSL) deployment, stationary and impulsive, noises are generated within the home environment, which impact the reliability of the wide area network (WAN) interface of a residential device delivering network services such as IPTV. Sources of such disturbances include house appliances, such as vacuum cleaners, lamps, or equipment, such as pool pumps, washing machines, etc. Noise characteristics may evolve with time, as noise sources turn on or off, or as noise sources move closer or farther away from a point of coupling with the DSL line.

The G.ploam standard (G.997.1), together with G.992.x DSL standards, provide performance monitoring functions, test, diagnostics and status parameters that characterize the behavior of the DSL line and channel under noisy conditions. Two important primitives for monitoring the channel at the customer premises (CPE) are downstream per bin signal to noise ratio (SNR) array and the impulse noise monitoring counters impacting the downstream receiver. The line performance monitoring counters defined in G.997.1 are aggregated by the CPE over a 15 minute and 24 hour window, and the central office (CO) can poll and obtain these counters.

These counters provide little granularity or visibility to changes of noise conditions that take place in between two instances of data collection. Moreover, no attempt is made in G.997.1 and G.996.2 (i.e. the line testing standards for DSL) to qualify the noise environment, by appropriately describing the noise constituents of all aggregate noises affecting a particular DSL line. Hence, there is a need for a diagnostics tool that provides fine granularity to track noise variation, as well as that makes an attempt to identify individually and to track the various noise sources that make up an aggregate noise environment affecting a DSL channel.

SUMMARY OF THE INVENTION

The present invention generally relates to a method and apparatus for effectively detecting and characterizing noise and other events affecting a communications system such as DSL. According to certain aspects, the invention includes a noise analysis engine that is embedded in customer premises equipment that classifies noise sources according to their specific characteristics and tracks each noise source in a dynamic manner, in such a way as to provide visibility to the changing noise environment within the customer premises and/or report this environment to a remote entity. According to other aspects, the invention relates to methods for using noise signatures to correlate classified noise sources within a CPE or among multiple CPEs for performing actual noise source identification and timing information. According to yet further aspects, the invention relates to deriving noise primitives for using in monitoring and finding noise events. According to still further aspects, the invention relates to a wiring analysis engine that detects and classifies wiring events affecting the communications system.

In accordance with these and other aspects, a customer premises equipment (CPE) apparatus according to embodiments of the invention includes an embedded noise analysis engine implemented by a modem chipset that collects information regarding a noise affecting communications to and from the CPE apparatus and classifies the noise according to dimensions of frequency, time, and persistence.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 14 illustrates how noise events across different CPEs can be correlated by embodiments of the invention;

DETAILED DESCRIPTION OF THE PREFERRED EMBODIMENTS

Figure 1A:
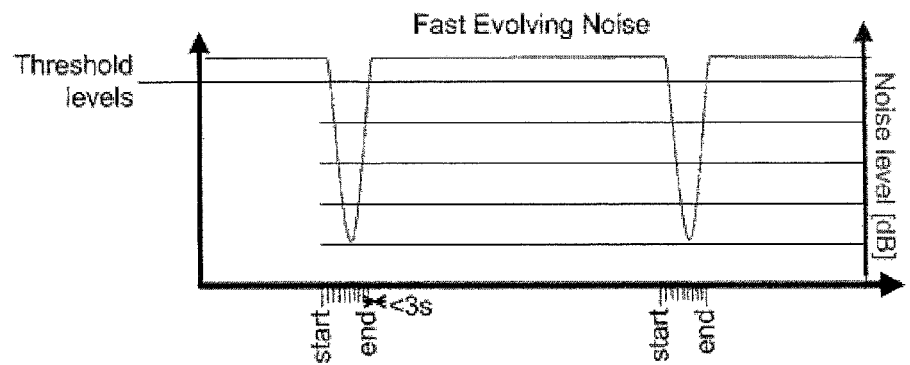
FIGS. 1a to 1c are diagrams illustrating evolving classes of noise.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain general aspects, the invention provides a noise analysis engine that is embedded in a CPE that maintains a list of noise sources in the CPE environment, as well as a corresponding signature of the noise source and its impact on the communications channel. In embodiments, the signature includes classification of noises according to three dimensions in an attempt to represent the entire noise space of noises affecting a DSL line. It is expected that by representing all noises in a space determined by three somewhat orthogonal dimensions will allow classification of substantially all the noise types considered in one of the various categories defined.

Although the invention will be described herein in connection with a particularly useful application to DSL communications over conventional telephone lines, the invention is not limited to this application. Rather, the principles of the invention can be extended to various types of wireline transmission systems such as coaxial cable systems, including, for example, Multi-Media over COAX (aka MoCA), HPNA (including HPNA 3.1 over COAX as well as in-home twisted pair), IEEE P1901 (PLC over in home power line), Home Plug (including HPAV and HPAV2 and "green PLC"), and ITU-T G.hn (including twisted pair, power line, base-band coax and RF coax).

Moreover, although the invention will be described herein in a particularly useful application as being embedded in a CPE and analyzing downstream signals, the invention can also be implemented in a CO and analyzing upstream signals.

The three dimensions selected in embodiments of the invention are very natural for the DMT modulation scheme employed in DSL, which operates as a multicarrier system (hence, with a certain granularity of frequency spacing) and a certain baud rate (hence, a certain granularity of time unit). The three dimensions are frequency, time and persistence.

Frequency dimension: narrowband vs. wideband nature. Since DSL is a multicarrier system, it is highly natural to classify interfering noise types depending on their bandwidth. In embodiments, a noise affecting a reduced number of adjacent tones of 4.3215 kHz bandwidth will be characterized as narrowband, while a noise affecting a large number of adjacent tones of 4.3215 kHz bandwidth will be characterized as wideband.

Time dimension: Continuous vs. Impulsive nature. Continuous versus impulsive noise sources are defined with respect to the scale of a DMT symbol of unit of time of 250 microseconds A noise will be considered continuous over a one second window, which corresponds to a time period over which a statistical average can be performed reliably in a DMT system. Stated differently, a continuous noise source is defined as affecting all or nearly all symbols of a contiguous window of approximately one second in a stationary manner, such that it is reflected meaningfully in a stationary statistical average (e.g. a SNR measurement is currently performed over 2048 contiguous DMT symbols, or half a second; over this period, the output of the SNR average is expected to be representative of a stationary process). Impulsive noises are non-stationary noise sources, as a single instance (i.e. a pulse) is expected to impact an isolated DMT symbol, or a limited series of contiguous or non-contiguous DMT symbols, over a one second window. An isolated impulse event or a train of impulses is therefore considered non-stationary, and not continuous, if it only impacts a limited number of DMT symbols over a one second window.

Persistence dimension: permanent, intermittent or evolving noise. Permanent noise types are defined to be present and approximately constant over a long window of observation selected, for example, a 15 minute period. An intermittent noise has an On/Off characteristic—it is present over a certain window of time, which may last from a couple of seconds up to 15 minutes. An evolving noise is a noise type in which characteristics evolve with time over the 15 minute window of observation.

In embodiments, two main primitives (e.g. the showtime Line Noise primitive and Impulse Noise hit counts) are used for classifying the various noise types according to their Time and Frequency nature into the categories defined above. The constant monitoring of these two primitives over time will help discern the persistence of the noise types.

General aspects of characterizing or classifying noise sources (i.e. interferers) according to various combinations of the three dimensions listed above will now be described in more detail in connection with a particular application in a DSL system.

Frequency Dimension: Narrowband vs. Wideband Interferers

Since DSL is a multicarrier system, it is highly natural to classify the interfering noise types dependent on their bandwidth, with respect to the nominal intercarrier spacing of 4.3125 kHz. In embodiments, the primitive of choice selected for discriminating between wideband and narrowband disturbers is the showtime Line Noise primitive.

Narrowband Interferer

A narrowband interferer is defined as limited to a maximum of 64 continuous tones (i.e. bandwidth is less than 256 kHz). Within the 256 kHz wideband, there could be a single narrowband (NB) peak(s) or packet of peaks. In embodiments, the bandwidth of the NBI is computed as the start-end frequency 3 dB (TBC) above background noise.

Continuous vs. Impulsive

As the narrowband interferer has an impact on the Showtime Line Noise primitive, it is considered to be continuous in nature (as opposed to impulsive), even if a repetitive pulsing noise injection (quasi continuous) may also leave a signature in the form of a degradation of the LN noise primitive used for the determination of narrowband vs. wideband disturber.

Permanent, Intermittent vs. Evolving

A narrowband interferer can be found in one of three categories in the persistence dimension.

Permanent: An AM radio (continuous/permanent) transmission is expected with stable power over a period of time and is associated with a list of given frequencies in any particular geographical area.

Intermittent: A HAM radio transmission is expected with an ON/OFF pattern and is associated with a list of given frequency region in any particular geographical area.

Evolving: Quasi-continuous Common Mode noise, originating as a pulsing noise, with unspecified frequency characteristics may appear as a narrowband disturber with power characteristics that may vary based on the variation of the coupling of the noise into the loop.

Wideband Interferer

As opposed to a narrowband interferer, a wideband interferer is declared if one of two conditions apply: the bandwidth of the interferer is more than 256 kHz, and if its psd is a certain threshold (e.g. 6 dB) above an expected background noise; or if the bandwidth is more than 256 kHz and if its psd is for example 12 dB above −140 dBm/Hz (if no background noise reference available).

In embodiments, a wideband interferer is characterized by a bandwidth that is computed as the start-end frequency 3 dB (TBC) above background or reference noise. As an example, expected wideband interferer categories are: Alien DSL service (non self-FEXT); wideband CM noise (e.g. HP-AV); synchronized self-FEXT Permanent, Intermittent vs. Evolving Wideband interferers may fall into any of the three categories of the persistence dimension, with the following expectations for the three categories of wideband interferers listed above. Alien DSL service (non self-FEXT) and synchronized self-FEXT fall into categories of "permanent" or "intermittent", depending on whether the interference is not an always on service. Wideband CM noise may fall into the "intermittent" and "evolving" categories.

Time Dimension: Continuous vs. Impulsive Interferers

Continuous Interferers

Continuous noise sources are defined as continuous on the scale of a one second window or more, which corresponds to a time period over which a statistical average is meaningful assuming a stationary noise source in a DMT system. In other words, a continuous noise source is defined as affecting all or nearly all symbols of a contiguous window of approximately 1 second in a stationary manner. For example, a SNR measurement is currently performed over 2048 contiguous DMT symbols, or half a second. The output is expected to be representative of a stationary process over the 1 second measurement duration. To monitor continuous noise sources, the preferred primitive is a per bin average over a one second period, such as a Line Noise primitives, from which a noise psd can be derived.

Impulsive Interferers

Impulsive noises are non-stationary noise sources when considered over a single instance (a pulse). Impulsive noise sources generally impact an isolated DMT symbol, or a limited series of contiguous or non-contiguous DMT symbols. An isolated impulse event is therefore considered non-stationary. When considered as a collection of impulses, the impulse noise source may be considered as stationary. From there, some statistical characteristics (such as a psd) may be derived.

Impulsive and Continuous Categories

To monitor impulsive noise sources, the preferred primitive is a per symbol hit count triggered by an impulse noise detector, since an Line Noise primitive averaged over a one second window is not expected to yield a meaningful output, since the isolated impulse noise hits appear non-stationary. However, considered over a collection of impulses, a per bin average over n raw sync symbols errors derived on symbols that are all affected by an impulse may for example provide an equivalent noise psd to that of a stationary noise.

Along a time axis, a classification of impulsive versus continuous noises may be performed according to their burst duration as illustrated in Table 1 below:

TABLE 1

| Impulsive | | | Continuous | | | |
| --- | --- | --- | --- | --- | --- | --- |
| <2 ms | 2 ms << 4 ms | >4 ms & <1 s | >1 s & <4 s | >4 sec | >1 min | Duration |
| SEIN | PEIN | SHINE | SHORT | LONG | VERY LONG | Type |
| INM | INM | INM | INM/LN | LN | LN | Used primitives |

In embodiments, the boundary to distinguish between an impulse of large duration (e.g. greater than 4 ms and less than 1 sec) and a continuous noise of limited duration (e.g. greater than 1 sec) is selected to be corresponding to the duration at which the Line Referred Noise primitive provides a reliable output. Since the SNR is computed over 2048 symbols (an average of 16 sets of 128 symbols), the minimum duration of a noise burst that provides a reliable and meaningful LN output is 1 sec in the worst case. As a consequence, in embodiments, any noise burst of contiguous duration of 1 sec, which imprints the LN output, is considered as continuous, while burst of less than 1 sec that do not imprint the LN output is considered as impulsive in nature.

Persistence Dimension: Permanent, Intermittent or Evolving Interferers

Permanent Interferers

Permanent noise sources are defined to be present and approximately constant over a long period of time. The time scale associated with a long period of time has been selected to be the 15 min. period, over which G.Ploam parameters are currently being reported. Over this period, little variation is expected with respect to their statistics (e.g. less than a 3 dB power variation). In embodiments, an intermittent noise that stays on or off over a 15 minute window is considered permanent over the 15 minute window and transitions into the permanent category.

Intermittent Interferers

Intermittent noises are noise types of continuous or impulsive nature, which stays On or Off for a measurable period of time of the order of one second or more. For these noise types, three durations are of importance: (1) duration of individual noise burst (primarily applicable if the noise is impulsive in nature); (2) period of repetition (only applicable, if the noise is of a Repetitive Impulse Noise type); and (3) On/Off period (applicable to both impulsive and continuous noises).

Duration of Noise Bursts of Intermittent Interferers

As illustrated in TABLE 1, the duration of individual bursts of noise can be arbitrarily categorized as follows: for low duration bursts of less than one second, embodiments of the invention follow the traditional classification of impulse noise sources as suggested for INP evaluation for DSL application: SEIN, PEIN, SHINE. Above one second of burst duration, the noise classification suggested is based on the characteristics of the stationary noise detector (i.e. SNR or LN primitive), as the noise burst will appear continuous. A continuous noise burst of limited duration, such as the ones denoted as "SHORT or LONG" is considered as intermittent, while still being continuous in nature.

Repetition of Noise Bursts of Intermittent Interferers: Periodic vs. Aperiodic

All noise burst types can be recurring over a certain time base. Two types of repetition can be distinguished: "aperiodic" or "periodic" repetition.

An example of periodic noise is a REIN noise. REIN noise is typically a repetition of a single Impulse Noise (SEIN) in a permanent fashion over an extended period of time (permanent) or a limited duration (intermittent). Typically, repetition rates are for example 100 Hz (10 ms period).

PEIN and SHINE individual events may also be repetitive with a same or lower repetition rate. Arbitrarily, embodiments of the invention consider that a periodic noise always has a minimal frequency rate of 1 Hz. Any lower repetition rate (even if periodic) prompts the noise classification to be considered as aperiodic.

The occurrence of a periodic noise over a certain timeframe constitutes an intermittent appearance of a periodic noise. The pattern of interest to be detected for such a noise is the On/Off pattern of the periodic noise. Accordingly, a repetitive impulse noise may as well be qualified as intermittent and denoted "SHORT or LONG", even though it is not continuous in nature.

An aperiodic noise is a noise event of small or large duration (from SEIN to LONG), which does not repeat itself periodically, or, if a periodic repetition rate exists, the period of multiple consecutive noise events is more than one second apart, such that the noise events can be considered independent. An isolated impulse in time falls in the category of aperiodic event.

In embodiments, for these aperiodic noise events, the ON-OFF pattern of interest in their aperiodicity is simply the number of hits of a given type over a certain period (the default period can be 15 minutes or a proposed smaller 1 minute period).

On/Off Period of Intermittent Interferers

The On/Off period of an intermittent noise is by definition expected to be much less than 15 minutes. In embodiments, an intermittent noise that stays on over a 15 minute window is considered permanent over the 15 minute window and transitions into the permanent category.

For repetitive periodic impulsive or aperiodic continuous impulsive noise sources, the On-Off period is the measured period over which individual noise bursts are collected consecutively. Depending on the duration of the noise bursts collected, two definitions of On/Off periods are devised.

First, for noise bursts typically of the order of a dozen of seconds or less (in any case, less than one minute), the minimum On/Off period is defined to a fixed one-minute period, even if the noise burst only affects partially the one-minute duration. The number of hits of noise bursts during the one minute window are counted together with their typical duration. In embodiments, a one minute counter without hits is considered as an OFF window. A one minute counter with a minimum hit of one is considered an ON window.

Second, for very long continuous aperiodic noise sources (>1 min), the On-OFF period may coincide with the burst duration itself. I.e. the number of hits of very long continuous aperiodic noise bursts is reported in the corresponding 15 minutes counter together with the typical duration of the bursts.

Evolving Interferers

Figure 1B:
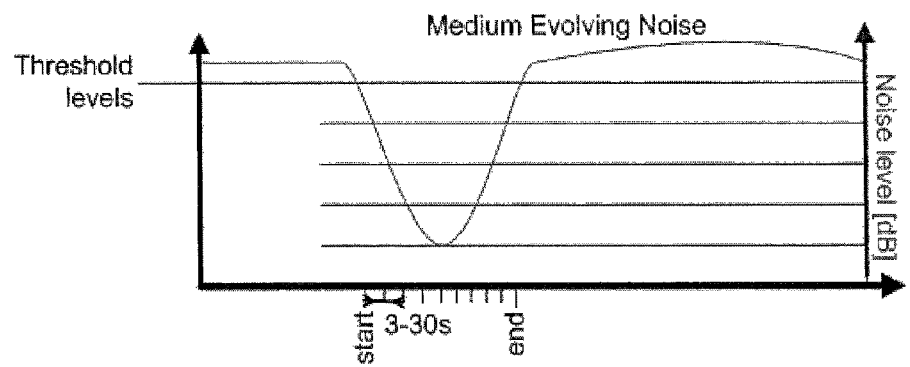
Figure 1C:
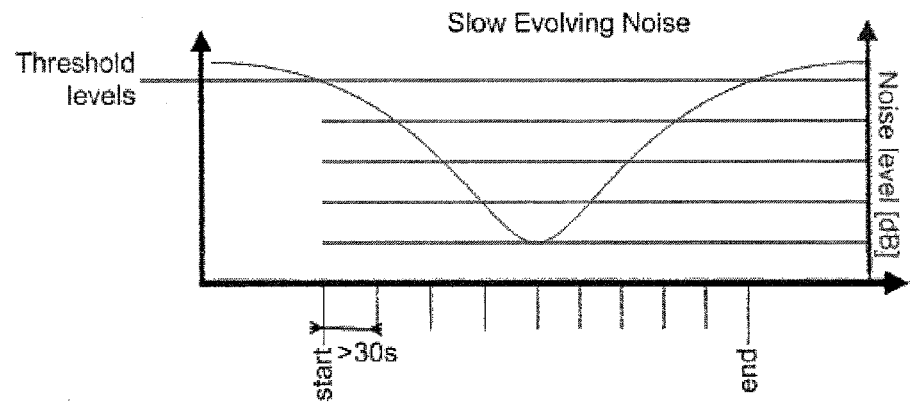

Evolving noises are noise sources which gradually affect the DSL line. The evolution of the noise is measured against expected threshold crossings. For evolving noise types, two time indicators are of importance: (1) Rate of evolution and (2) Start to End (On/Off) period Rate of Evolution In embodiments, the rate of evolution of an evolving noise is quantified as one of three rates, corresponding to a slow increase (>30 seconds per threshold crossing)/medium rate increase (3-30 seconds per threshold crossing)/fast increase (<3 second per threshold increase). A faster increase will fall in the category of ON/OFF intermittent noise. A slower increase falls in the category of permanent noise, for which the characteristics of the noise appear quasi-constant over a 15 min window. FIGS. 1a to 1c illustrate the three types of evolving noises, as also summarized in the table below together with the example boundaries between intermittent and permanent noise sources.

TABLE 2

| Evolution rate | <3 sec (Min-Max) | <3 sec (per Th. Inc) | 3 to 30 sec (per Th. Inc) | >30 sec (per Th. Inc) | >15 min (per Th. inc) |
|---|---|---|---|---|---|
| Type | Intermittent | Evolving Fast (FIG. 1a) | Evolving medium (FIG. 1b) | Evolving Slow (FIG. 1c) | permanent |

Start to End (On/Off) Period

The On/Off duration of the evolving noise is expected to be much less than the 15 min window. In embodiments, an evolving noise that stays on over a 15 minute window is considered permanent over the 15 minute window and transitions into the permanent noise category. An evolving noise that evolves at a rate that is faster than 3 seconds is considered intermittent On/Off.

Considering that evolving noise sources may be less frequent or less repetitive over a short period of time, a single definition of On/Off period is devised, as opposed to the two definitions reserved to the intermittent noise sources; in this case, the On/Off period coincides with the duration of the evolving noise itself. If occurring more than once, the number of hits of evolving noise sources is reported in the corresponding 15 minutes counter together with the typical duration of the period of evolution of the noise. A one minute counter records an eventual hit of the recurring evolving noise over a one minute contiguous window.

Persistence Class Changes

Permanent noise types are defined to be constant over a 15 minute period. Little variation is expected with respect to their statistics (e.g. less than a 3 dB power variation). An example embodiment of how permanent noise sources may be classified with respect to their presence in consecutive 15 minute windows is shown in FIG. 2.

Figure 2:
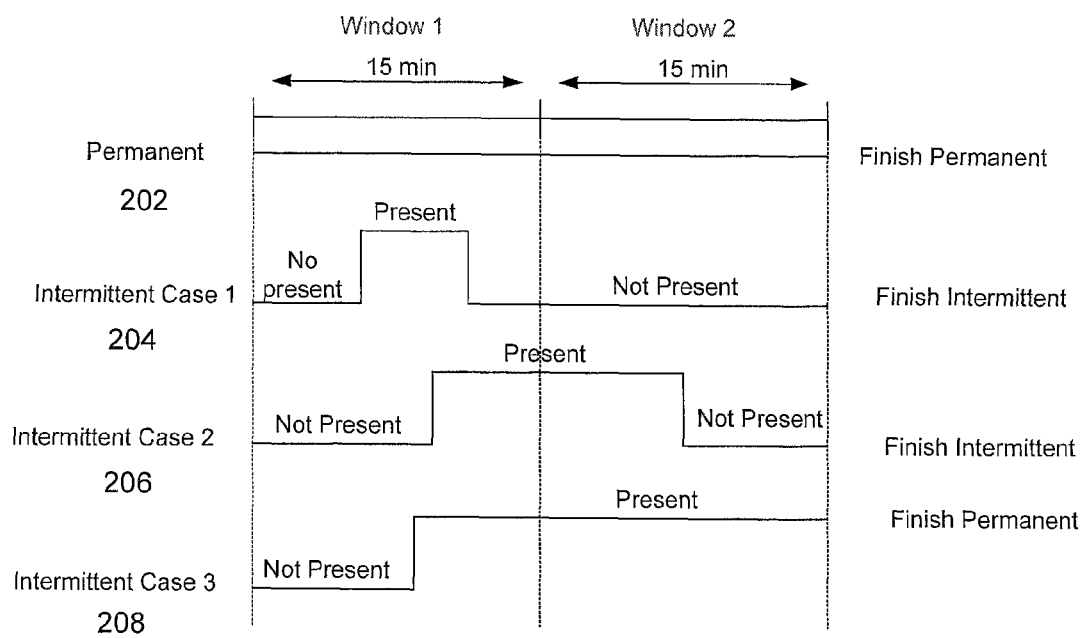
FIG. 2 is a diagram illustrating permanent versus intermittent noise.

As shown in FIG. 2, a noise 202 that is present in two consecutive 15 minute windows is obviously classified as permanent after the second window. FIG. 2 further shows how an intermittent noise source in one window can transition to a permanent noise source. Intermittent noise sources 204, 206 and 208 in FIG. 2 are classified as intermittent after the first 15 minute window. However, noise source 208 is considered permanent over the second 15 minute window and transitions into the permanent category after the second 15 minute window.

Having detailed the various noises that will be tracked and their categorization according to the three dimensions of bandwidth, time and persistence, a noise analysis engine to detect, classify and characterize noises in a noise monitoring application according to general embodiments of the invention will now be described in connection with FIG. 3. Such an engine can be incorporated into a DSL modem, for example, and those skilled in the art will be able to understand how to adapt the firmware/software of such a modem to perform the noise analysis functionalities of the invention after being taught by these descriptions.

Figure 3:
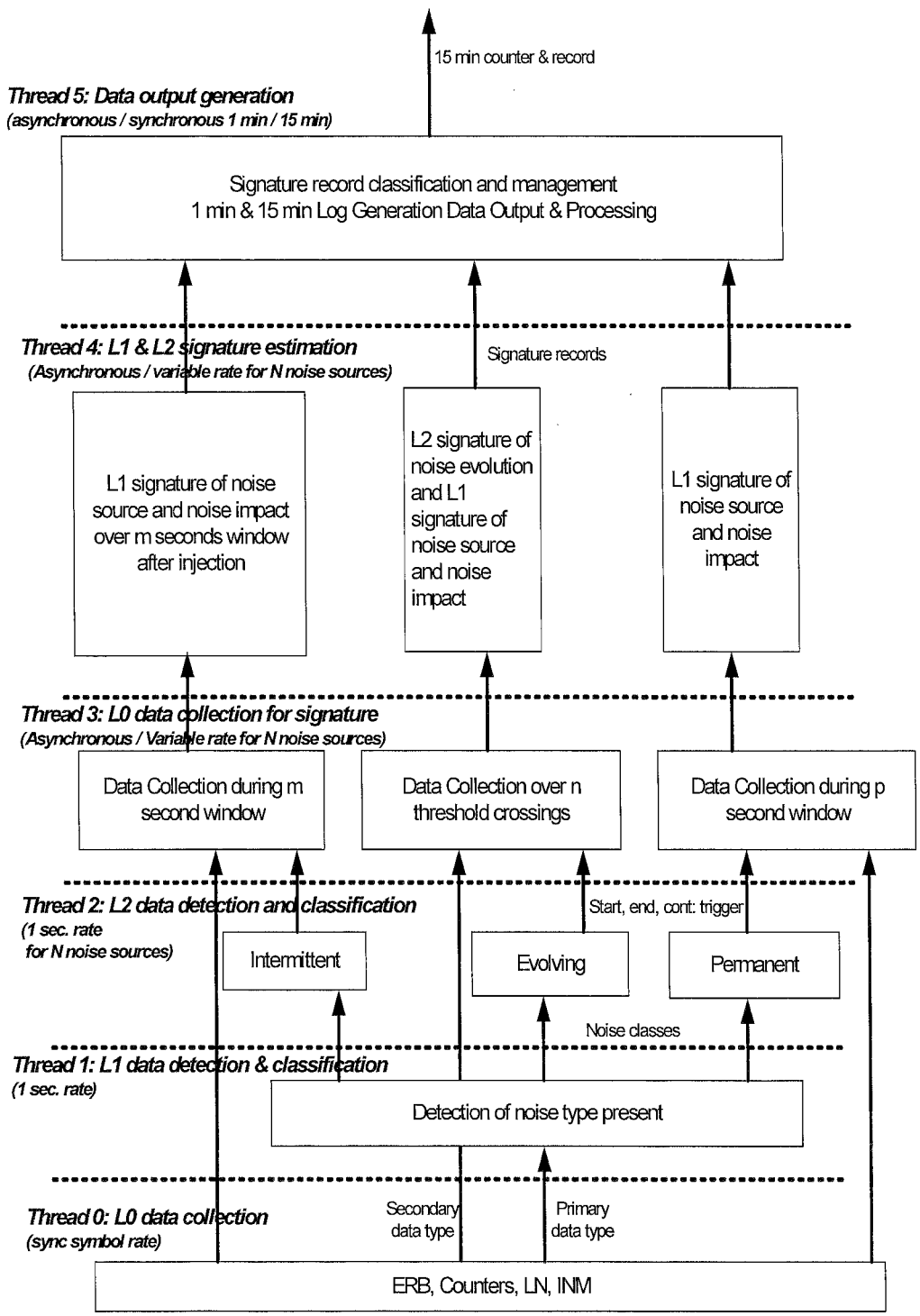
FIG. 3 is a generic noise monitor process flowchart according to embodiments of the invention.

As shown in FIG. 3, a generic noise monitoring application according to embodiments of the invention includes six logical threads, from the lowest level Thread 0 to the highest level Thread 5. Their objectives and purposes are described below. The terms L0, L1, L2 used in the flowchart are defined as follows. L0 refers to the low level DSL primitives retrieved by the Firmware, such as an SNR, INM histograms, etc. L1 refers to the result of the analysis of an L0 primitive, which for example provides the constitution of the noise over a single observation of the L0 data. L2 refers to the result of the analysis of a set of L0 primitives and associated L1 data, which provides information as to the evolution noise observed over multiple observations of the L0 data.

Thread 0 is a repetitive thread, whose sole objective is to retrieve from the CPE (e.g. DSL modem) the raw L0 data on which analysis is to be performed. Example characteristics of this thread of retrieval of the data onto which detection will be performed are as follows. The data collection is performed at the smallest time granularity specified in the requirements: e.g. one second rate or sync symbol rate (16 per second). The thread collects primary L0 data on which Thread 1's detection process will be performed (i.e. SNR, INM Histograms) at the smallest time granularity. The thread also collects secondary L0 data on which Thread 3 data collection process is performed for Thread 4 estimation.

Thread 0 can be implemented as a state machine polling required statuses at a rate of once per second, or faster for those statuses which are passed systematically to Thread 1, or on demand to the Thread 3 data collection thread. The polling rate may be every sync symbol, or every 128 symbols for partial SNR calculation, for example. Any systematic post-processing of the L0 data is considered part of the thread 0 process.

Thread 1 consists of a detection and classification thread that is performed systematically on the data collected every second by thread 0. In embodiments, thread 1 typically runs at a one second rate. The purpose of Thread 1 is to detect the presence of various predefined noise classes (NB vs WB and impulsive vs. continuous). Various detectors, each of them specific to one noise class, may be used, and their outputs can be combined in order to classify noises in classes.

Thread 1 can be implemented as a set of standalone algorithmic processes, each tailored to the various pre-identified noise classes, and which provide a positive or negative result corresponding to the presence or absence of each noise class in the current one second L0 data analyzed. In addition, a confidence metric associated with each output can be derived.

In embodiments, the number of independent noises detected in Thread 1 determines the number of parallel processing that will take place in the subsequent threads. Thread 2 consists of a detection and classification thread that is performed systematically on the data analyzed every second by Thread 1. The purpose of Thread 2 is to estimate whether the various types of noise classes detected by Thread 1 are of one of three types: Permanent, Evolving or Intermittent. In embodiments, this determination is done for each of the noise sources identified in Thread 1.

Being an L2 detection type thread, Thread 2 makes use of comparison logic to a reference data set collected at another point in time in order to determine the persistence of the noises detected in Thread 1. The reference data against which the current data set is compared may be different based on the types. For example, permanent noise types use the previous 1 second data and previous 15 minutes data record as a reference. Evolving noise types use the previous 1 second data, last threshold data and next threshold data. Intermittent noise types use the previous 1 second data.

Thread 2 can be implemented as a set of standalone algorithmic and logical processes, each tailored to the three class types identified, and which should provide a mutually exclusive output corresponding to the evolution or not of each class of noise detected in Thread 1. In addition, a confidence metric associated with each of the three classified evolution types can be derived.

In embodiments, since Thread 2 is responsible for tracking appearance of noises, it also tracks their disappearance. Thread 2 provides appropriate triggers "start", "end" and "cont." triggers to Thread 3.

Thread 3 consists of an L0 data collection thread that is particularized to each type (permanent, intermittent, evolving) and class of noise (NB vs. WB, continuous vs. impulsive) detected in lower threads 1 and 2. This data collection complements, over a determined window of time, the L0 data collection performed by Thread 0. In embodiments, the trigger for the Thread 3 data collection is initiated asynchronously by triggering events "start", "end", "cont." determined in Thread 2. The rate of the Thread 3 L0 data collection is variable, based on the purpose of the Thread 4 process for which this data is collected.

The purpose of Thread 3 is to collect additional data that will enable a subsequent signature detection of the impact of the noise by Thread 4 as well as the characterization of the noises themselves, for each of the three types, as described below.

For an intermittent noise type, the data collection comprises additional data sets that will help determine (by Thread 4), over a predefined contiguous window of time, the impact of the appearance of the intermittent noise on the receiver's operation. The window may be limited in time (for example, 10 seconds) or extend over the presence of the noise, and the data collection may be contiguous (e.g. every second, or at the start and end of the analysis window).

For an evolving noise type, the data collection comprises additional data sets to be collected each time the noise characteristics cross a given threshold out of a fixed set of predetermined thresholds. The window is limited in size by the number of thresholds it can possibly cross in its evolution. The rate of the data collection is determined by the evolution speed of the noise.

For a permanent noise type, additional data collection may be collected for the purpose of qualifying the permanent noise over the 15 minutes duration in Thread 4. The rate of the data collection is expected to be slow.

Thread 3 can be implemented as a state machine polling additional required statuses at an asynchronous rate of once per second for intermittent noise types, or less frequently or on demand for permanent and evolving noise types. In embodiments, Thread 3 is triggered by a Thread 2 detection trigger of type "start" and "end" and "cont". Thread 3 computes and records the time between a trigger start and a trigger end event of an evolving or intermittent noise type.

As a pre-requirement, for each noise type (permanent, intermittent, evolving) and for each noise classes detected in Thread 1, an exhaustive list of relevant parameters characterizing the impact of the various noises is preferably listed as candidate records to be logged in, as well as any desirable L0 data information that may help further refine a signature of the noise class detected in Thread 1. An example of such relevant parameters are counters (such as Severe Error Seconds, Error Seconds, CRC, FEC) that occur during the presence of the noise detected, or SNR margin status attesting of a degradation of the line stability during their presence. An important task of Thread 4 is to populate the individual counters associated to each noise that will report the amount of CV, FEC, ES, SES, FEC_S attributed to each noise individually over the duration of the presence of each noise.

Thread 4 consists of an estimation thread that is performed on the data collected by Thread 3, once the data set is complete. It can be implemented as an off-line thread, or it can start in-line as partial data is made available. The purpose of Thread 4 is to estimate a signature of the various noise types detected for each noise class.

For an intermittent noise, the signature estimation consists in deriving from the augmented L0 data set, characteristics of the impact of the noise once it is turned ON. The type of analysis suggested is akin a L1 analysis on a limited time window, during which the ON noise is expected to be stationary. It leads to the derivation of a signature of stability and capacity reduction that the appearance of the noise imprints on the modem behavior.

For an evolving noise, the signature estimation consists in deriving from the augmented L0 data set and the corresponding time stamp, characteristics of the impacts of the noise and the rate of evolution of the noise once it is crosses the minimum threshold to be declared as evolving. The type of analysis suggested is akin a L2 analysis on a fixed window. It leads to the derivation of a signature of stability and capacity reduction that the appearance of the noise imprints on the modem behavior, together with a coarse classification of the rate of evolution of the noise: fast, slow, medium.

For permanent noise, additional processing on the data collected in thread 3 may be performed for the purpose of qualifying the permanent noise over the 15 minutes window.

For all noise types (permanent, evolving, and intermittent), augmented L0 data enables the derivation of an enhanced noise signature detected in Thread 1. For example, Thread 4 also uses information for various noises across different types to distinguish characteristics of noise pertaining to one type, or subtracting the influence of the presence of other noise classes in order to better derive a signature of all noises separately. An example of the primary signature of the detected noises includes information along the three dimensions of classification. For the frequency dimension, the signature information includes bandwidth, center frequency, and average/peak psd level. For the persistence dimension, the signature information includes duration/hit. For the time dimension, the signature information includes burst length (cont./shine/short/long/REIN).

An example of secondary signature information includes stability and capacity impact estimates such as margin drop impact (e.g. per band, in-band, total), counters (e.g. SES, ES, CRC, FEC-S) and capacity impact. An example of supplemental signature data includes array signature such as min, max, and average PSD arrays, time domain characteristics when applicable, and statistical higher order moments arrays (e.g. mean, variance, skewness, kurtosis).

Examples of enhanced noise signature data includes for a REIN noise, the ability to report a PSD associated with the impulse, information as to the statistics of the impulse noise (Gaussian or deterministic), or a category in which isolated impulses may fold. For a wideband noise source resulting from a repetitive impulse train at a rate much higher than the baudrate of the DSL system (4 kHz), enhanced noise signature may include the underlying frequency of the pulse trains and whether the pulses are Gaussian or deterministic waveforms.

Thread 4 can be implemented as a set of standalone algorithmic and logical processes, each tailored to the three noise classes identified and possible subclasses, and which output provides a record of the noise signature and impacts of each noise. In embodiments, each noise signature record generated is stored and used in thread 5 to track and report on the recurring occurrence of each noise.

Thread 5 consists of a data output generation and formatting thread that is performed on the data collected by Thread 4. In embodiments, the purpose of Thread 5 is to derive relevant data to populate 1 minute and 15 minute counter reports for each noise type detected for each noise class.

Besides counter information generation, Thread 5 can classify Thread 4 signatures and determine whether a signature matches a pre-stored signature record or not. If a signature match is found to an existing record, the corresponding counters are incremented. In embodiments, Thread 5 also manages a 24 hour record database used for a signatures matching process. Each 24 hour signature record may be optionally transferred to the cloud every 24 hours for further processing. Every 24 hours, the signature records may be reset and new signature records can generated upon appearance of noise in the next 24 hour window. Thread 5 may concatenate individual noise elements within the database, in order to report composite noise sources that have an impact on a multitude of independent noise records.

Thread 5 also manages transition of noise types (permanent, intermittent, evolving) over the 15 minutes boundary, if noises change in behavior. Thread 5 produces in the 15 minute window a system report, which classifies the noise environment, as high/medium/low severity and the deviation from expected natural background noise environment for each important class of noise: NB, WB, impulsive noise. Thread 5 also formats non counter output information, such as noise psd levels provided together with the 15 min or 24 hour report. Thread 5 can be implemented as a set of logical processes that run asynchronously based on the detection of appearance and disappearance of noise sources. However, it is expected to run also at a minimum of once per minute or per 15 minutes for populating corresponding counters.

Output Data Record

According to certain aspects, one of the purposes of a noise analysis engine according to embodiments of the invention is to identify the various constituents of the aggregate noise affecting a DSL connection, to classify them into categories of various types (narrowband vs. wideband, continuous vs. impulsive) and to determine the number of independent sources of each type. The engine also provides signature details for each noise across which noises impacting multiple CPEs can be correlated, or can be associated with specific noise sources. Another purpose of the noise analysis engine is to track the variation of each independent noise sources over time, and record their impact over time on the DSL line stability, with respect to specific defined time stamps.

Accordingly, two types of output data records may be created: one type that relates to the noise constitution itself, and another type that relates to the presence and impact of each noise over time. Both types of output record can be used ultimately to perform noise correlation of sources affecting multiple CPEs or further characterization of actual noise sources and specific equipment that are causing appearance of such noise signatures.

Noise Constitution Record

A description of the aggregate noise affecting a DSL receiver follows. An objective of this classification is similar to the one proposed in G.996.2 in Annex B. B1.1.3, which relates to the description of the loop topology following a SELT-UER primitive analysis. For the loop topology, a description of the loop structure, with identification of the physical length of each loop segment is proposed. The Loop Topology is reported as a list of loop segments, using a set of given conventions. Similarly, the proposed Noise Constitution analysis output consists of a list of noise constituents, each being identified as narrowband vs. wideband and impulsive vs. continuous.

Each noise constituent of the list is further described with sub-parameters following a certain convention with an indicator of persistence (e.g. permanent, intermittent, evolving), an indicator of frequency content (e.g. a center frequency, a bandwidth (start and end frequency)), an indicator of a power level (e.g. a power level or a psd level (peak or nominal)), a characterization of the impulses, if noise is impulsive in nature (e.g. type of impulse: periodic/aperiodic, frequency and duration of impulses, if REIN, length of impulses, if aperiodic: (SEIN, PEIN, SHINE, SHORT, . . . ), along with a number of impulses over the period of observations).

Optionally, each noise constituent of the list may be further characterized with sub-parameters that relate to a metric of the performance reduction that the noise imposes on the DSL line due to its presence. These parameters can include: an impact on the capacity (e.g. in MBps) if the noise is continuous or an equivalent rate loss for a required INP and associated throughput rate loss, if the noise is impulsive; an impact on the margin reduction (e.g. in dB) if the noise is continuous, or stability (e.g. RS/sec or CRC min rate), if the noise is impulsive or if its intermittent occurrence produces instability.

Noise Tracking Record

While the noise constitution analysis at a given point in time provides details of the number and type of noise sources affecting the DSL line, the tracking and logging of the presence of the noise and of their impact over the course of time is also required.

The current line performance monitoring parameters described in G.997.1 (G.ploam), only reports a limited set of parameters, that are related primarily to line performance monitoring parameters characterizing the stability of the link, in terms of Code Violation (CV) and Forward Error Correction (FEC), and their related Error Seconds (ES, SES) counters. The only parameters that attempt to quantify over time the characteristics of a noise source that may affect the line are the ones that relate to the raw Impulse Noise monitoring parameters. Moreover, line performance monitoring parameters are accumulated in a 15 minutes and 24 hour counters, which provide little granularity for monitoring of rapid noise changes.

An extension of the definition of the current set of line monitoring parameters is therefore provided by embodiments of the invention as follows.

First, additional line monitoring parameters are provided that describe the activity of the noise constituents that have been identified, as part of the noise constitution analysis. Those additional parameters report over the window of observation (15 min, 24 hour) such information as: number and type of active Narrow Band interferers; number and type of active Wide Band interferers; and Number and type of active impulse noise sources.

These parameters are meant to list and detail specifically the noise sources themselves, as compared to the existing generic parameters related to the DSL line stability (CV, FEC, ES, . . . ). The type of each interferer may be characterized by the sub-parameters detailed in the noise constitution records listed above, such as persistence, frequency content, power level, etc.

Secondly, an extension is provided to report the actual duration of the presence of the noise source with a granularity much less than the 15 min. This report can be provided in one of several ways.

For example, a one minute counter during which the corresponding noise type has become active can be provided. Each one minute count that makes up a 15 min counter reports on the number of times the noise has reappeared during the corresponding 1 minute interval (one count amounts for the consecutive duration of the noise burst). This is the per minute hit counter.

Alternatively, the one minute counter can report the number of seconds during which the noise source is declared active, over each 1 minute interval, thereby aggregating all bursts together over the one minute interval: this is the per minute duration counter.

An aggregate 15 minute counter can report the total number of seconds over which the noise has been declared active over the 15 minutes period, together with a counts of actual noise burst hits over the 15 minute interval: this the 15 minute total duration counter and the 15 minute total hit counter.

Finally, the finer granularity of the indication of each noise presence enables a better correlation over time of the impact of each noise and the parameters related to the DSL line stability (CV, FEC, ES, . . . ): over the 15 minute window, each noise is associated with its own G.ploam-like counters, related primarily to line performance monitoring parameters characterizing the stability of the link, in terms of Code Violation (CV) and Forward Error Correction (FEC), and their related Error Seconds (ES, SES) counters. These counters report the amount of CV, FEC, ES, SES, FEC_S attributed to each noise individually over the duration of the presence of each noise. By projecting these 15 minutes individual counters against existing G.Ploam counters, the ability is given to pinpoint which of the noise sources is the predominant source of instability over the 15 minute window, and which noises are not actually impacting the line stability.

Example Noise Data Records

Below are examples of output data records produced for various types (permanent, intermittent and evolving) of narrowband, wideband and impulsive noise sources according to embodiments of a noise analysis engine of the invention.

Continuous narrowband disturbers can be permanent, intermittent and evolving.

Typical permanent narrowband disturbers are for example AM radio transmitters. Continuous pulsed noise may also generate narrowband interference when the noise source is permanent. To distinguish AM radios and CM NBI, a possible discrimination factor exists in the fact that AM transmitters operate at known frequencies in any geographical region. An example objective of the logging is to monitor daily/nightly coupling variation (e.g. related to weather) of AM radios and assess how they impact the capacity of the user. The data logging output can be part of a 15 minute record with the number of continuous NBI disturbers and for each NBI, a vector of power, frequency, and capacity loss estimate.

An example of a permanent narrowband disturber record is shown below:

| Permanent ID | Peak PSD level [dBm/Hz] | Freq. Range | Capacity Impact |
|---|---|---|---|
| NBI 1 | −110 dBm/Hz | 2.8 MHz | 1 Mbps |
| NBI 2 | −94 dBm/Hz | 162 kHz | 100 kbps |
| ... | | | |
| NBI N | −121 dBm/Hz | 9.1 MHz | 500 kbps |

As part of the detailed tracking characteristics of the noise, the following information is available for retrieval over a 24 hours window.

| Permanent ID | Noise PSD 15 min avge | Noise PSD min over 24 h | Noise PSD max over 24 h |
|---|---|---|---|
| NBI 1 | PSD(around 2.8 MHz) | | |
| NBI 2 | PSD(around 162 kHz) | | |
| ... | | | |
| NBI N | PSD(around 9.1 MHz) | | |

Typical intermittent narrowband disturbers are HAM radio transmitters. Common Mode (CM) noise sources of undefined types may also appear as intermittent narrowband interferers, if the CM noise source turns itself On or Off. To distinguish HAM radio and CM NBI, a possible discrimination factor exists in the fact that HAM bands are well known in any geographical region. Example objectives of the logging include: tracking of HAM radio human activity; record keeping of disturbance due to ionospheres' propagation variation; and diagnostics of HAM or intermittent NBI's impact on stability. The input data collected over the proposed 10 seconds window for each possible intermittent NBI or HAM radio noise source upon initial appearance includes an estimate upon appearance and the number of hits over the 15 min window.

An example of an intermittent NBI 15 minute record is given below. Compared to the permanent record, the following sub-parameters are added: duration; a stability impact (typically computed over data collected over a proposed 10 seconds window after appearance of a possible intermittent NBI or HAM radio); a hit count of the noise over the 15 minutes window; and a one-minute counter reporting for each minute the number of hits per minute.

| Inter. ID | Type | Duration | Peak Psd Level [dbm/hz] | Freq. Range | Impact | # Hits | 1 min Hit Counter | 1 min Duration Counter |
|---|---|---|---|---|---|---|---|---|
| NBI 1 | HAM | 10 s | −90 dBm/Hz | 14.5 MHz | 3SES/50 CRC/ 4000 RS/sec | 9 | 0030230 . . . 010 | 00100230 . . . 010 |
| NBI 2 | CM | 300 s | −94 dBm/Hz | 5.8 MHz | 0 SES/ 300 RS/sec | 1 | 0011111 . . . 000 | 0023632 . . . 000 |
| ... | | | | | | | | |
| NBI N | HAM | 20 s | −120 dBm/Hz | 15.1 MHz | 0SES/20 CRC/ 2000 RS/sec | 3 | 0000110 . . . 0100 | 00008160 . . . 0100 |

Typical evolving narrowband disturbers are common mode noise sources of undefined types. Common Mode noise sources may couple progressively, if the CM source moves closer or away from the point of imbalance from the loop. Example objectives of the logging include tracking of evolving CM noise sources.

The data is collected at well-defined instants, whenever a monitored primitive (e.g. a line referred noise) crosses a threshold. For example for a narrow band interferer, the threshold, which can be anticipated for the data collection, can be each 3 dB of increase of peak power above the background noise: [0 dB . . . 18 dB], for a total of 6 positive crossings and 6 negative crossings for a total of 12 3 dB crossings.

An example of an evolving NBI 15 minute record is given below. Compared to the intermittent record, the following sub-parameters were added or changed: duration (from the first threshold crossing to the last); a peak power increase over the evolution of the noise; and a peak capacity impact estimate.

| Evolving ID | Type | Duration [start-end] | Power Inc | Freq. Range | Capacity Impact | Hit counts | 1 min Counter |
|---|---|---|---|---|---|---|---|
| NBI 1 | Slow | 600 s | 14 dB | 2.8 MHz | 500 kbps | 1 | 0111111 . . . 000 |
| NBI 2 | Fast | 10 s | 3 dB | 6.1 MHz | 100 kbps | 3 | 0020100 . . . 000 |
| ... | | | | | | | |
| NBI N | Medium | 60 s | 12 dB | 9.1 MHz | 500 kbps | 1 | 0000010 . . . 000 |

The following information may also be made available for retrieval if desired: max PSD when noise reaches its peak power (i.e. Max Noise PSD); background noise PSD when noise is OFF; time interval vector of when selected threshold are crossed, which gives an indication of the evolution rate of the evolving noises. This is shown in the following example.

| Evolving ID | Max Noise PSD (ON) | Noise PSD (OFF) | Evolution Rate [time vector/ threshold crossing] |
|---|---|---|---|
| NBI 1 | PSD(around 2.8 MHz) | PSD(around 2.8 MHz) | [40 50 50 40 40 . . . 50 50] |
| NBI 2 | PSD(around 6.1 MHz) | PSD(around 6.1 MHz) | [2 3 0 0 0 0 0 0 . . . 3 2] |
| ... | | | |
| NBI N | PSD(around 9.1 MHz) | PSD(around 9.1 MHz) | [6 6 6 10 0 0 0 12 . . . 6 6] |

Typical permanent wideband disturbers are alien DSL services, self-FEXT, and common mode noise sources such as Home-Plug AV. Example objectives of the logging include: 1) Distinction between self-FEXT and or alien DM disturber; 2) Distinction of CM noise source through proper signature of CM imbalance; 3) Determination of unusual loop imbalance; and 4) Report of evolution of wideband noise.

Similarly to the NBI record, the logging of the WBI comprises for each WB noise, a vector of power, freq range, a capacity loss estimate, an identifier type, as shown in the following example:

| Permanent ID | Mean PSD level [dBm/Hz] | Freq. band | Center Frequency | Start end Frequency | Capacity Impact |
|---|---|---|---|---|---|
| WBI 1 | −120 | DS3 | 15 MHz | 14-16 MHz | 5 Mbps |
| WBI 2 | −110 | DS2 | 7.2 MHz | 5.5-8 MHz | 1 Mbps |
| ... | | | | | |
| WBI N | −115 | DS3 | 17 MHz | 16.8-17.4 MHz | 1 Mbps |

As part of the detailed tracking characteristics of for each WB noise, an estimate is made of maximum noise PSD per 15 min over the freq. range (i.e. up to 3000 tones*per bin SNR data). For all tones, one estimate of max and min noise PSD per freq. per 24 hours (i.e. up to 3000 tones*per bin SNR data) is also made.

| ID | Noise PSD 15 min avge | Noise PSD min over 24 h | Noise PSD max over 24 h |
|---|---|---|---|
| WBI 1 | PSD(DS3) | | |
| WBI 2 | PSD(DS2) | | |
| ... | | | |
| WBI N | PSD(DS3) | | |

Typical intermittent wideband disturbers are not always ON DSL services. Common mode noise sources of undefined types may also appear as intermittent wideband interferers, if the CM noise source turns itself On or Off (e.g. Home Plug AV). Example objectives of the logging include: tracking of DSL service activity variation and impact on victim line; record keeping of disturbance daily/nightly for pattern recognition in cloud; and diagnostics of CM noise impact on stability, as disturbance is turned on/off (E.g. pump, elevator, . . . ).

As for the NBI, the output data record comprises, for each intermittent WB noise of burst nature of duration of "SHORT or LONG", a vector of power, frequency range (possibly restricted to DS1, DS2, DS3), capacity loss estimate, stability loss estimate upon appearance, and number of hits over a 1 min window for each minute of the 15 minutes counter. An example record is as follows.

| Intermittent ID | Type | Duration | Mean PSD level [dBm/Hz] | Freq. Range | Capacity Impact | Hit counts | 1 min Counter |
|---|---|---|---|---|---|---|---|
| WBI 1 | Very Long | 90 s | −120 | DS3 | 5 Mbps | 1 | 0011000 . . . 000 |
| WBI 2 | Short | 4 s | −110 | DS2 | 1 Mbps | 15 | 0020346 . . . 000 |
| ... | | | | | | | |
| WBI N | Long | 20 s | −115 | DS3 | 1 Mbps | 3 | 0000010 . . . 0200 |

The data records for evolving NBI and WBI noise sources are similar. For each evolving WBI, a vector of max power, freq position, capacity loss estimate at peak, stability loss estimate upon appearance, nb of hits over the 15 min window, and rate of evolution (slow, medium, fast) is provided. An example record is as follows.

| Evolving ID | Type | Duration [start-end] | Mean PSD level [dBm/Hz] | Freq. Range | Capacity Impact | Hit counts | 1 min Counter |
|---|---|---|---|---|---|---|---|
| WBI 1 | Slow | 600 s | −120 | DS3 | 5 Mbps | 1 | 0111111 . . . 000 |
| WBI 2 | Fast | 10 s | −110 | DS2 | 1 Mbps | 3 | 0020100 . . . 000 |
| ... | | | | | | | |
| WBI N | Medium | 60 s | −115 | DS3 | 1 Mbps | 1 | 0000010 . . . 000 |

As part of the pattern matching process of associating noise characteristics to actual noise sources, the following information is available for retrieval if desired over the 15 minute or 24 hours window: max PSD when noise reaches its peak power [Max Noise PSD] background noise PSD when noise is OFF; and time vector of when selected threshold are crossed. An example is as follows.

| Evolving ID | Max Noise PSD (ON) | Noise PSD (OFF) | Evolution Rate [time vector/ threshold crossing] |
|---|---|---|---|
| WBI 1 | PSD(DS3) | PSD(DS3) | [40 50 50 40 40 . . . 50 50] |
| WBI 2 | PSD(DS2) | PSD(DS2) | [2 3 0 0 0 0 0 0 . . . 3 2] |
| . . . | | | |
| WBI N | PSD(DS3) | PSD(DS3) | [6 6 6 10 0 0 0 12 . . . 6 6] |

For wideband noises (intermittent, permanent or evolving) additional signature characterization can be made available such as the following.

| ID | Repetitive impulse Train Frequency | Deterministic waveform or Gaussian | Pulse length |
|---|---|---|---|
| WBI 1 | Not applicable | Gaussian | Continuous |
| WBI 2 | 16 kHz periodic | Deterministic | 25 micros |
| . . . | | | |
| WBI N | 300 kHz random | Gaussian | 5 to 20 micros |

Two types of permanent impulsive noise scenarios are considered. A first type includes REIN noises linked to the 50 Hz/60 Hz main power supply and/or PEIN or SHINE noise sources that generate pseudo-continuously bursts with a frequency of occurrence of more than 1 Hz. A second type includes isolated impulses of less than 1 sec duration occurring continuously over time.

Typical permanent impulsive noises are REIN linked to the 50 Hz/60 Hz mains power supply frequency that are produced by always-On equipment. Alternatively, a PEIN or shine noise source that generates pseudo-continuously bursts with a frequency of occurrence of more than 1 Hz will be considered as permanent repetitive impulsive interferers. An example is isolated bursts or EFTs (electrical fast transients) which are caused by operation of electro-mechanical switches, motors and distribution switch-gear connected to the power distribution network. A typical burst consists of a large number of recurring impulses at high frequency (5 kHz-100 kHz) for a short time period (15 ms-0.75 ms) with a repetition of 300 ms.

Determination of the presence of the permanent Repetitive noise sources is done in embodiments based on INM histograms. An objective is to monitor daily/nightly impulse noise activity. Determine peak/worst case continuous presence and associated peak impulse PSD and TD signature through inverse FFT.

An example of a data logging output record can be constituted with a Vector of impulse type, frequency, length, stability impact criteria, INP estimate, and number of hits over the 15 minute window, as shown below.

| Permanent ID | Type | Freq. | Length | Stability Impact | INP estimate | Per-minute Hits | Per-minute Duration |
|---|---|---|---|---|---|---|---|
| IMP 1 | REIN | 100 Hz | 0.5 ms | 50 RS/sec | INP3 | 1000000 . . . 0 | 60, 60 . . . 60 |
| IMP 2 | REIN | 100 Hz | 0.75 ms | 10 RS/sec | INP4 | 1, 1, 0000 . . . 1 | 60, 30, 0, . . . 40 |
| . . . | | | | | | | |
| IMP N | SHINE | | 4 ms | 2 CRC/min | INP16 | 200000 . . . 0 | 20, 0, 000 . . . 0 |

As part of the detailed tracking characteristics of the noise, the following information may be made available:

| Permanent ID | Noise PSD 15 min avge | Noise PSD min over 24 h | Noise PSD max over 24 h |
|---|---|---|---|
| IMP1 . . . N | Averaged PSD of impulses | | |

Isolated impulses of less than one second occurring continuously over time are counted over each 15 minute period in a histogram of isolated impulse occurrence of duration and inter-arrival time. The associated data logging output can be part of a 15 minute record with a total number of hits per minute of isolated impulses, corresponding to the "permanent" isolated noise source over the considered 15 minute window. In order to account for the possible existence of "intermittent" isolated impulses noises, the per minute "permanent" isolated impulse noise source count reported over the considered 15 minute window coincides with the minimum per minute "intermittent noise source" count hits reported every minute (see section below). Together with the histogram output data provided over the 15 minute window for the isolated impulses, an output record with severity level of high/medium/low that qualitatively indicates the deviation of the impulse noise environment with respect to natural background noise impulse environment.

Two types of intermittent impulsive noise scenarios are considered. A first type includes REIN noises linked to the 50 Hz/60 Hz main power supply and/or PEIN or SHINE noise sources that generate pseudo-continuously bursts with a frequency of occurrence of more than 1 Hz, whenever they are produced by an ON-OFF equipment type. A second type includes isolated impulses of less than 1 sec occurring intermittently over a determined period of time.

For REIN and repetitive pseudo-continuous burst noise types, an example objective of the monitoring is to detect a window in which the repetitive noise sources are present for any duration of more than 1 second, and to report the number of times the ON window is effective for each impulse noise type, together with an assessment of a stability metric over the ON window.

An example of an analysis output record is similar to the permanent data record to which the following fields are appended: duration of the burst of impulses; a stability impact (averaged or accumulated over the window of presence of a possible intermittent impulsive noise); a hit count of the noise over the 15 minutes window; a one-minute hit counter reporting for each minute the number of hits per minute; and a one-minute duration counter reporting for each minute the number of seconds of presence of the noise per minute For isolated impulses types, an example objective of the monitoring is to count over a one-minute window the number of isolated impulses in order to discern an increased number of impulse noise hits of a given type (SEIN, PEIN, SHINE) and of non-REIN types, and to report the number of minutes over which the noise is ON, together with an assessment of a stability metric over the ON window of 1 minute.

| Intermittent | Type | Duration | Freq. | Length | Stability Impact | INP estimate | Hits | 1 min Counter Hits |
|---|---|---|---|---|---|---|---|---|
| IMP 1 | REIN | SHORT (10 s) | 100 Hz | 0.5 ms | 50 RS/sec | 3 | 3 | 0012000 ... 000 |
| IMP 2 | CONT | SHORT (4 sec) | NA | 5 sec | 75 SES | NA | 15 | 0020346 ... 000 |
| ... | | | | | | | | |
| IMP N | PEIN | NA | NA | 2 ms | 4 CRC | 8 | 3 | 0000010 ... 0200 |

The evolving repetitive Impulsive noise sources are typically caused by common mode noise sources of an impulsive nature, which would move closer to point of imbalance of the cable and then moves away (e.g. an engine). The discrimination factor for an evolving noise can be the amplitude. Since the amplitude of the repetitive noise event is currently not tracked directly, and as the impulses are being captured by the impulse noise detector of finite resolution, it is expected that the evolving repetitive impulsive noise sources will appear as ON/OFF intermittent impulsive noise sources.

Hence, evolving repetitive Impulsive noises sources are not tracked separately, but will fall in the category of intermittent repetitive Impulsive noises. However, a specific record for evolving noises could be devised in the future, in a similar fashion as an evolving NB or WB interferer based on a discrimination factor other than the amplitude.

Example Implementation of Noise Analysis Engine

Having described a generic noise analysis engine and its potential application in a DSL communication system, an example implementation of noise analysis engine in a DSL modem according to embodiments of the invention will now be provided.

In embodiments, a noise analysis engine according to the invention is implemented by supplementing a conventional DSL modem with noise monitoring functionality such as a SmartCPE diagnostics suite such as that provided by Ikanos Communications, Inc. of Fremont, Calif., as adapted by the present invention. Those skilled in the art will understand how to implement the noise analysis engine of the present invention by adapting software/firmware of these and other conventional DSL diagnostics programs after being taught by the present disclosure.

Figure 4:
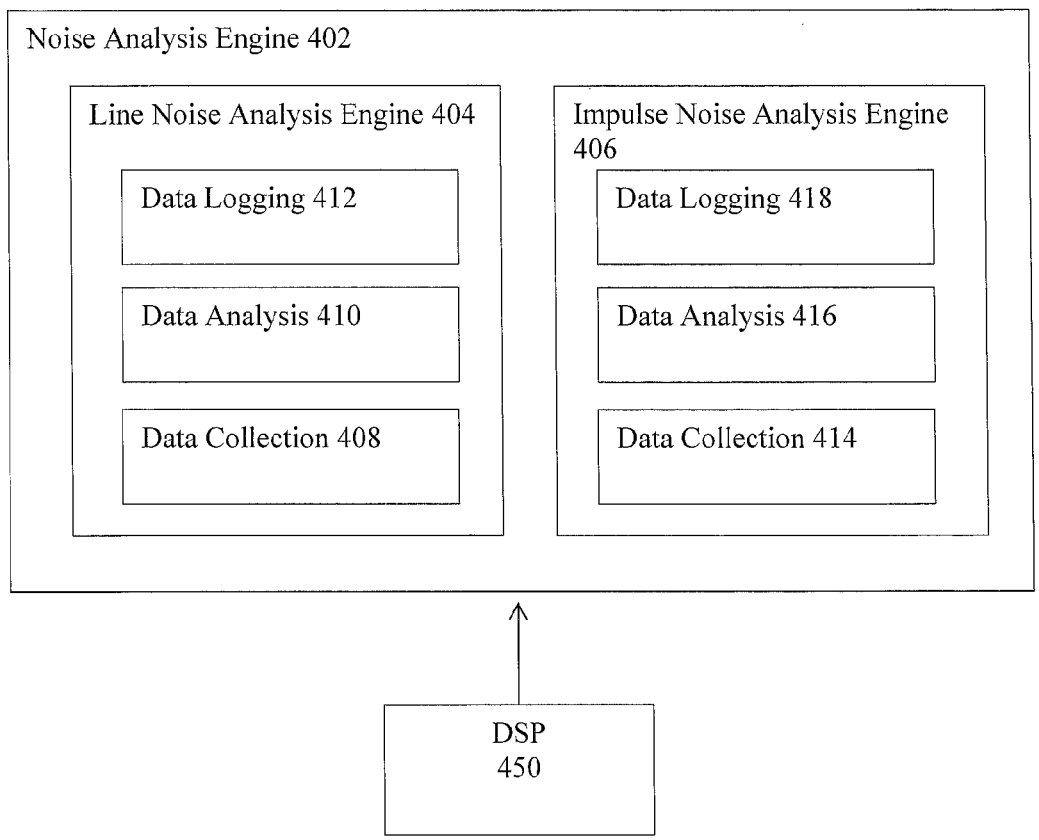
FIG. 4 is a block diagram of an example noise analysis engine according to embodiments of the invention.

As shown in FIG. 4, a noise analysis engine 402 according to these embodiments of the invention includes two distinct analysis engines: line noise analysis engine (LNAE) 404 and impulse noise analysis engine (INAE) 406. Both LNAE 404 and INAE 406 rely on the data feeding from the DSL Digital Signal Processor (DSP) 450 of the DSL modem. Further implementation details of LNAE 404 and INAE 406 will be provided below.

Figure 5:
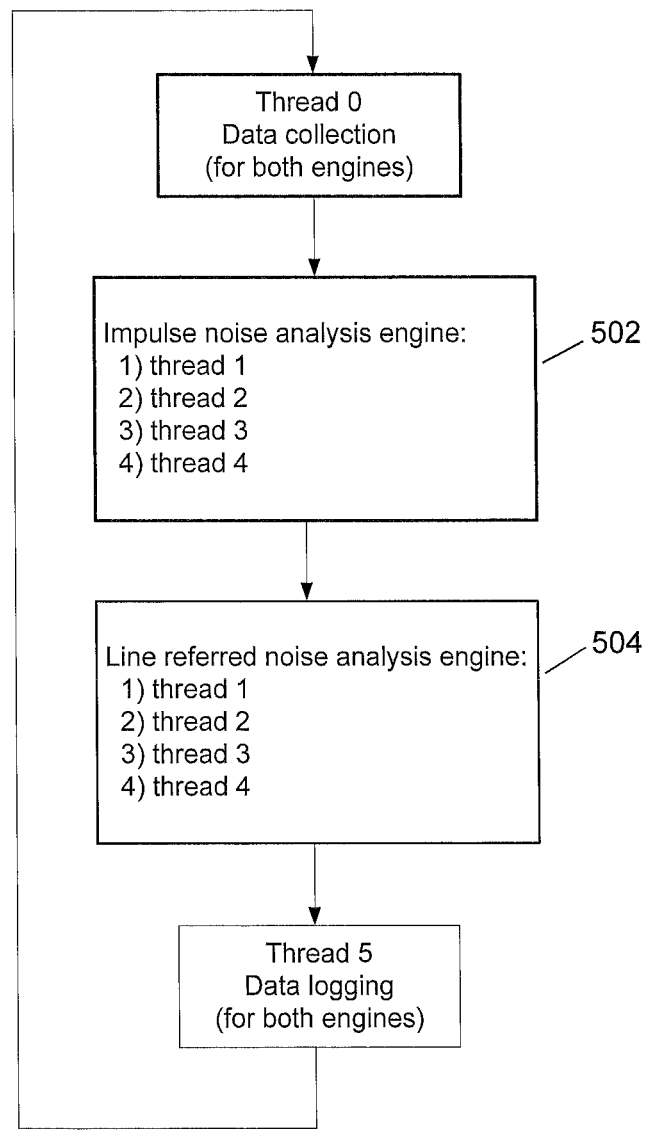
FIG. 5 is a flowchart of an overall noise monitoring process performed by the engine illustrated in FIG. 4.

An example overall process flowchart for noise analysis engine 402 is depicted in FIG. 5.

As shown in FIG. 5, due to the fact that both LNAE 404 and INAE 406 rely on the data feeding from DSP 450, and they share some common parameters such as counters, per bin status, etc., the data collection step Thread 0 is performed for both of the two engines. Following Thread 0 is process 502 containing Thread 1 to Thread 4 of the impulse noise analysis engine 406. Next comes process 504 corresponding to Thread 1 to Thread 4 of the line noise analysis engine 404. The reason why embodiments of the invention execute INAE processing 502 before LNAE processing 504 is because in the presence of impulse noise, the correct decision fed from INAE to LNAE will help the latter to avoid false detections. This aspect will be described further below in connection with descriptions regarding the generation of the Line Referred Noise and Impulse Noise primitives associated with the Noise Finder and Noise Monitor generation module.

Finally, at the end of the processing is the data logging unit, which, like Thread 0, is shared by both engines 404, 406.

Line Noise Analysis Engine Processing

Figure 6:
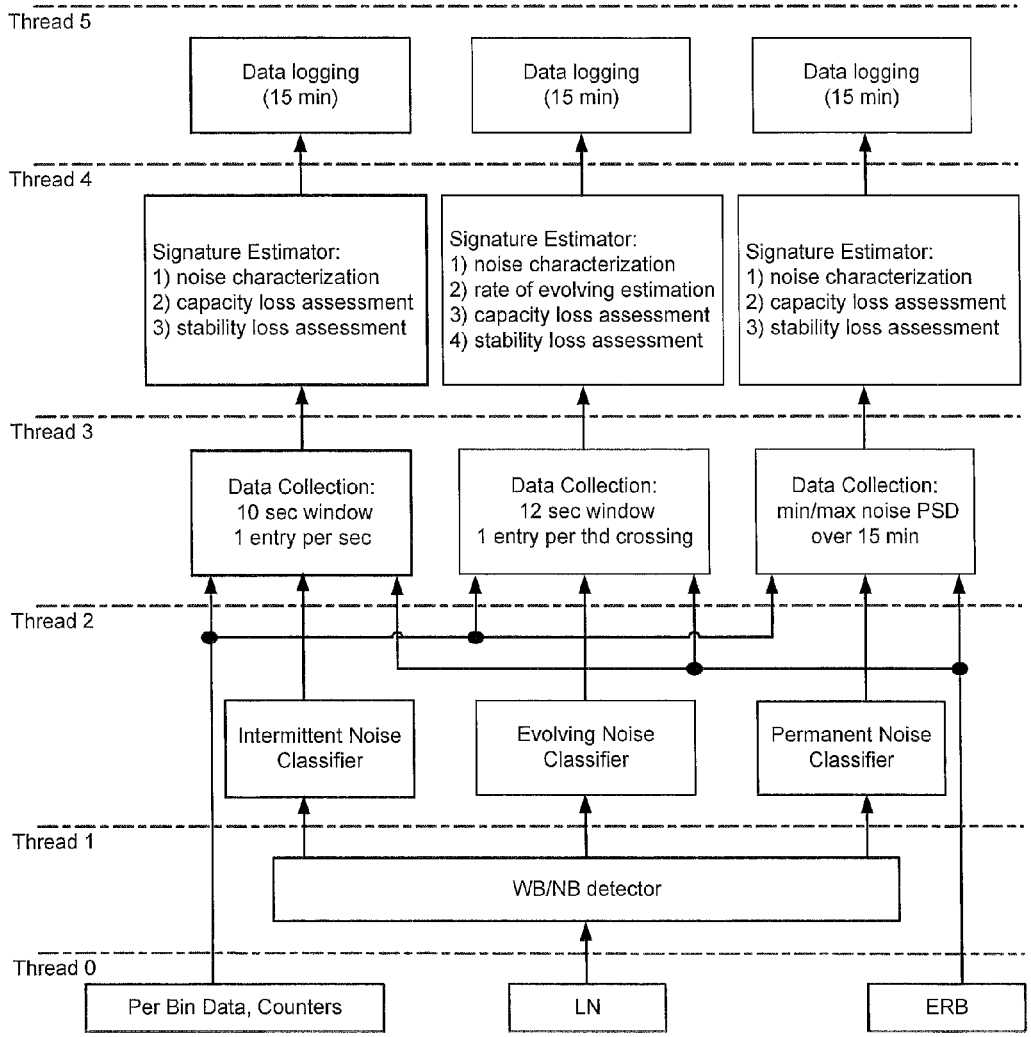
FIG. 6 is a flowchart of line noise analysis engine processing according to embodiments of the invention.

An example embodiment of the line noise analysis engine processing consists of Threads 0, 1, 2, 3, 4, and 5, as shown in FIG. 6.

Thread 0 retrieves primitives from the DSL DSP 450, which monitors the noise environment and feeds the line referred noise to Thread 1 and the per-bin status and counters to Thread 3. The main purpose of Threads 1 and 2 is to identify the presence, appearance and disappearance of all the noises on the line and to categorize the noises along the frequency axis (narrowband or wideband) and the presistence axis (permanent, evolving, or intermittent). The full characterization of the noise, called noise signature, is given in Thread 4, where advanced DSP algorithms are developed based on the results from the lower threads, multiple primitives from DSP, and certain a priori knowledge. The noise signature is exported to Thread 5, the data logging unit, for display and archiving.

Thread 0 provides L0 primitives to upper threads for noise analysis. It serves two purposes: Collect L0 primitive data from DSP; and Post process the collected data. As will be detailed in a later section, line primitives can be generated while the modem is in showtime and the DSL link is up in a Noise Monitor session, or while the modem is in a listening while the DSL link is down in a Noise Finder session. Different types of data will be captured in this thread, a non exhaustive example of which, is:

Line referred noise (LN), called primary data, is used by Thread 1 to detect wideband or narrowband noise. LN is generally calculated every half second averaged over 2048 symbols. The intermediate averaged noise using 128 symbols is also available for analyzing noise of short durations. LN data should be calibrated and referred back to the line in thread 0.

Per bin data (SNR margin, bi & gi, etc.) and counters (CRC, FEC, SES, etc.), called secondary data, will be collected by Thread 3 and passed to Thread 4 for noise signature estimation. These data can be retrieved every second on demand.

ERB, the sync errors formatted according to the IU-T G.Vector standard, is used to estimate Xlog and Fext free line noise in Thread 4. Since ERB is generated every sync symbol, the retrieval of ERB will be much faster than other primitives. With a buffer depth of 4, ERB corresponding to 4 sync symbols can be dumped every 250 ms. Raw ERB data collected from DSP is encoded. Therefore, an ERB decoder sits inside thread 0 such that normalized sync error samples can be used directly by higher threads.

Note that data collection and post processing in Thread 0 is preferably executed continually while the modem is in Showtime in the Noise Monitor session, or while listening to the line in a Noise Finder session.

One purpose of Thread 1 is to classify noise along the frequency dimension based on its bandwidth (narrowband vs. wideband) and its power.

In embodiments, a narrowband noise is defined as one whose bandwidth is no more than 276 kHz corresponding to 64 consecutive tones with a tone spacing of 4.3125 kHz. The bandwidth of a narrowband noise is determined as the frequency range on which the noise PSD is for example 3 dB above its background noise. A narrowband noise may have one or multiple peaks within its bandwidth. If the distance between two adjacent peaks is greater than 16 kHz, then they are treated as two independent narrow band interferences (NBIs). Typical narrowband noise includes AM, HAM, and certain common mode (CM) interference.

A wideband noise is declared if a noise satisfies either one of the following criteria: (1) its bandwidth is greater than 276 kHz and within that bandwidth its PSD is 6 dB above the background noise; or (2) its bandwidth is greater than 276 kHz and within that bandwidth its PSD 12 dB above a pre-defined reference noise level (e.g. −140 dBm/Hz) if no background noise is available. Typical wideband noise includes crosstalk (self Fext, alien Fext) and certain CM interferences.

Embodiments of the invention consider detecting up to 16 narrowband noises and multiple wideband noises per downstream band. All detected noises are mutually exclusive and are processed independently by the upper threads. A narrowband noise can sit within any downstream band, while a wideband noise pertains to either the DS1, DS2 or DS3 band.

Starting from Thread 2, all processes are per noise based, i.e. each identified noise from thread 1 is analyzed independently. Thread 2 intends to discriminate between three types of noise along the persistence dimension: intermittent, evolving and permanent.

Permanent noise is always present and exhibits little variation in statistics over a 15-minute window. Intermittent noise has an on-off period much less than 15 minutes with the noise burst duration greater than 1 second (less than 1 second case is covered in INM specification). Evolving noise sits between permanent noise and intermittent noise. It is characterized by a variable called the evolving rate, which is determined by the time it takes to pass consecutive threshold crossings. Fast evolving noise is defined by less than 3 seconds per threshold crossing, medium evolving noise is defined by 3 to 30 seconds per threshold crossing, while slow evolving noise is defined by greater than 30 seconds per threshold crossing.

Thread 3 provides data needed to Thread 4 for noise signature estimation. The collected data type and storage structure depend on the noise type identified in the previous thread.

For permanent noise, the following data is captured over 15 minutes time frame: Maximum/minimum noise per tone PSDs are collected to check its dynamic range; CRC/FEC/SES for stability assessment; and ERB to compute the crosstalk transfer function Xlog, if needed.

For intermittent noise, the following data is captured every second for a determined duration such as up to 10 seconds to capture the transition due to the noise arrival or departure, or for the duration of the entire presence of the noise: Values of line referred noise over its frequency range (64 tones for NB, or DS1/DS2/DS3 for WB); Values of bi/gi over its frequency range; Counters (CRC/FEC/SES); and ERB if Xlog is needed.

For evolving noise, the following data is captured every threshold crossing up to 12 entries: Values of line referred noise over its frequency range (64 tones for NB, or DS1/DS2/DS3 for WB); Values of bi/gi over its frequency range; Counters (CRC/FEC/SES); and ERB if Xlog is needed.

The identified noise is characterized in Thread 4. The noise signature estimator performs the following tasks. First, it extract general noise features such as frequency range, peak power, maximum/minimum/average noise PSD, evolving rate (for evolving noise). Next it estimates a noise signature. For NBI, this includes: If it is permanent, discriminate between AM radios and common mode (CM) NBI; If it is intermittent, discriminate between HAM radios and CM NBI; If it is evolving, it could be CM NBI. For WBI this includes: If it is permanent, discriminate between self Fext, alien Fext, and CM interference (CMI); If it is intermittent, discriminate between various DSL types and CM noise; If it is evolving, it could be CM noise.

Next the noise signature estimator performs noise separation. This includes deriving individual noise PSD by removing other components, such as: LN without RFI; LN without crosstalk; LN without CMI. Finally the noise signature estimator performs the following additional tasks including: assessing capacity loss; deriving a stability metric; and deriving secondary signature characteristics of noise (e.g. repetitive impulse train or gaussian process, frequency of impulse train, duration of characteristic pulse).

Thread 5 logs the noise signature and generates LNAE output data to send to the cloud. It forms a 15-minute data report for each noise type, as follows.

For every permanent noise identified over the 15-minute time frame, it logs noise type, frequency range, peak power and location (for narrowband noise), maximum/minimum/average noise PSD, counters and stability impact, and capacity impact.

For each intermittent noise, it reports noise type, frequency range, duration, number of hits, peak power and location (for narrowband noise), stability impact, and capacity impact.

For each evolving noise, it registers noise type, frequency range, duration, number of hits, peak power and location (for narrowband noise), rate of evolving, stability impact, and capacity impact.

Note that the determination of the permanence of a noise is made in this thread before logged data are sent out. It also matches the underlined noise with a pre-defined noise signature pool. A new noise type is registered if no matching can be found. Also, categories of composite noise are created in Thread 5 by concatenating individual noise elements of various characteristics and which occur simultaneously because they are created by a same noise disturber: e.g. a power line communication system such as an HPAV transmitter will produce over the course of its handshake and data-communication session a well-defined time and frequency domain signature that allow Thread 5 to associate various elementary noise constituents in the existing database to a likely source. By correlating the time of arrival in the database and the specific sequence of appearance of such noises, their duration to existing timing protocol and their signature related frequency domain characteristics (e.g. band limited PSD, power and duration), thread 4 determines the pattern of composite noise source and provide a likely characterization of the noise source itself.

Impulse Noise Analysis Processing

Figure 7:
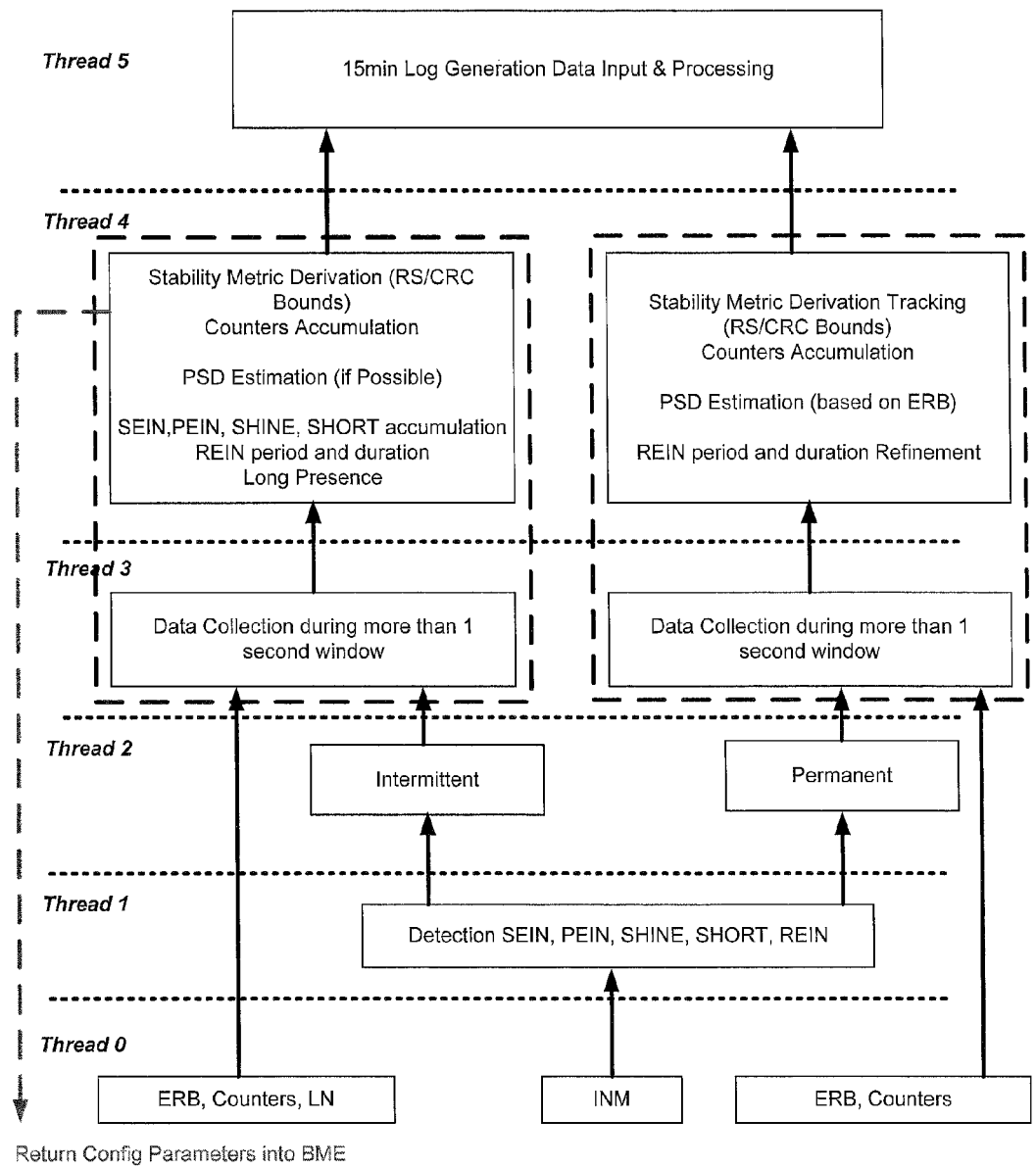
FIG. 7 is a flowchart of impulse noise analysis engine processing according to embodiments of the invention.

An example embodiment of processing with respect to the impulse noise analysis engine (INAE) 406 is shown in FIG. 7.

As shown in FIG. 7, processing for the impulse noise analysis engine 406 consists similarly of Threads 0, 1, 2, 3, 4, and 5. Each Thread represents a specific action such as data availability (Thread 0), processes (Thread 1, 2, 4 & 5) and Data Collection (Thread 3). The threads are not especially independent tasks. Embodiments of the invention assume the associated processing is always done between the arrival of two set of Thread 0 data. For example, when a new set of data arrives in Thread 0, it is automatically and immediately processed by Thread 1, 2 and 3. The processing of Thread 4 is not immediately necessary and could be postponed by few seconds.

In embodiments, processing for the Impulse Noise analysis engine is independent of line noise analysis engine processing. In other embodiments, some modules are able to interact with each other to be able to characterize such as classes as LONG or SHORT noise sources.

Thread 0 represents the availability of the data as input from DSP 450. INM data are available every second. They are the Impulse Length (IL) histogram and the Inter Arrival Time (IAT) histogram as well as other counters as defined by G993.2 Amendment 2. ERB are the error data available every sync symbol per ITU-T G.Vector standard. The array length depends of the frequency decimation Fsub factor. The counters represents G.Ploam counters such as CRC, FEC, etc. It could also include SNR, Margin, Bi, etc. if necessary. The data are available every second. The LN represents the Showtime Line Referred Noise and is available every second The process of Thread 1 detects simply the presence or not of an impulsive Noise. This process runs every second. The types of noise considered in this module are as follows. SEIN: Based on the IL histogram, aperiodic noise (small number of hits (<5)) smaller than 2 ms (8 successive DMT symbols). PEIN: Based on the IL histogram, aperiodic noise (small number of hits (<5)) larger than a SEIN and smaller than 4 ms (16 successive DMT symbols). SHINE: Based on the IL histogram, aperiodic noise (small number of hits (<5)) larger than a PEIN and smaller than 1 s (4000 successive DMT symbols). SHORT or LONG Presence: number of symbols affected by an impulse in the second window larger than 3000 (TBD). REIN: Based on the IL histogram, large number of hits (>5) for a consecutive duration smaller than 4 ms (16 successive DMT symbols).

It should be noted that the noise detector need not be limited to one source of noise.

For each noise detected in Thread 1, Thread 2 categorizes if the noise is intermittent or permanent. A noise is considered Intermittent if it was not present at the beginning of the 15 min window. A noise is considered permanent if it was present at the beginning of the 15 min window. When a noise presence is not detected in Thread 1, Thread 2 categorizes if in the previous observation window a noise had been detected, i.e. a noise has vanished. When a noise disappears, the phenomena is categorized as an intermittent Noise.

When a noise is qualified as intermittent (appearing or disappearing) or permanent, raw data are collected during a certain period of time. Thread 3 represents the process of collecting the data across a time window larger than a second. The time window of data collection varies according to the nature of the collected data. The duration of the data collection related to the INM standard parameters. For Noise detected as SEIN, PEIN, or SHINE, INM are collected for 1 sec. For SHORT, INM are collected up to 5 sec. For LONG, INM are collected for 5 sec. For REIN, INM are collected for 10 sec on a regular base. As an IAT mechanism is initiated, the 10 sec time window is renewed up to 512 times.

The duration of the data collection related to the counters is similar to the INM standards parameters described above. The data collection of the ERB array is done on every sync symbol. For an intermittent noise, data is collected starting at the appearance of the noise and finishing at the fade of the noise. For a permanent noise, data is collected at the start of the 15 min window and finishing at the end of the 15 min window. About the Showtime Line Noise, the array is collected only when a SHORT noise is detected for more than 500 msec. The data collection of Thread 3 is not especially independent of Thread 4.

Based on the data collection run on Thread 3, Thread 4 represents the processing tasks and the extraction of signature related to the different noise. The thread 4 processing can be started when only partially data vector are collected but will be finished after full data collection.

For a Permanent noise, the extracted signatures are as follows. First, the signatures include counters accumulation during the 15 min window. Based on the characteristic of the noise (type, frequency, duration) and the INP parameters, an analytical upper bound estimates the expected CRC, FEC counters incremental. When the permanent noise is detected as REIN, frequency as well as duration are estimated. Based on the ERB detected or not as carrying impulse noise (based on independent IN detector), the Noise PSD per type of impulse as well as the background noise are estimated.

For an intermittent noise, the extracted signatures are as follows. First, the signatures include counters accumulation during a 10 sec window or over the presence of the noise. Based on the characteristic of the noise (type, frequency, duration) and the INP parameters, an analytical upper bound estimates the expected CRC, FEC counters incremental. For each SEIN, PEIN, SHINE appearance SEIN, PEIN, SHINE counters are incremented accordingly. When an intermittent noise is detected as REIN, the frequency as well as the duration are estimated. The REIN PSD can be estimated through an ERB process (if REIN is present during a period long enough). Ff a SHINE noise is detected, the noise PSD could be represented by the SHOWTIME LN if this latter is valid (criteria to be determined such as SHINE longer than 2000 DMT symbols). If a SHORT presence is detected, processing across the 5 sec data determines if the noise is really a SHORT or a LONG. If it is determined that the noise is a SHORT, the SHORT counter is incremented. An estimate of the SHORT PSD can be extracted from the associated 5 instances of SHOWTIME LN. If it is determined that a LONG is detected (SHORT longer than 4 sec), no extra processing is done at this level. A message is sent to the line noise analysis engine processing which is in charge to process accordingly LONG.

Based on the signature extraction obtained from Thread 4, a data log for each 15 minute window is extracted. This Thread determines if some intermittent noises have the same nature based on their signature. If so, the numbers of occurrence of the specific identical noises are incremented. As a consequence the log data should not carry duplicate information about a same noise.

For Intermittent noise the data log fields are: A SEIN counter per type of SEIN Noise; A PEIN counter per type of PEIN Noise; A SHINE counter per type of SHINE Noise; A SHORT counter per type of SHORT Noise; Per SHINE noise source, a PSD estimate (3 k Tones); per SHORT noise source, a PSD estimate (3 k Tones); For each REIN noise detected, the frequency and duration; For SEIN, PEIN, SHINE, SHORT and REIN an aggregate counter of real CRC, FEC per 1 min window for the 15 min (15 1 min windows); and For SEIN, PEIN, SHINE, SHORT and REIN an aggregate counter of expected CRC, FEC per 1 min window for the 15 min (15 1 min windows).

For Permanent noise the data log fields are: For each REIN noise detected, the frequency and duration; For REIN an aggregate counter of real CRC, FEC per 1 min window for the 15 min (15 1 min windows); and For REIN an aggregate counter of expected CRC, FEC per 1 min window for the 15 min (15 1 min windows);

Detailed Functional Blocks of LNAE 402

Having described the processing performed by line noise analysis engine (LNAE) 402 according to embodiments of the invention, the functional blocks of the LNAE will now be described in more detail. As shown in FIG. 4, these blocks include data collection 408, data analysis 410, and data logging 412.

Data collection block 408 performs two levels of data collection: low level data collection corresponding to Thread 0, which mainly retrieves line referred noise array of data; and high level or secondary data collection happens at Thread 3, which gathers additional information like counters, per bin status, ERB, etc. for noise signature recognition.

The implementation of Thread 0 consists of two functional blocks with data collection block 408: L0 raw data retrieval and L0 data post processing.

L0 raw data retrieval is executed continually every second or faster, depending on what primitives are required, how they are generated by DSP 450, and how the interface to DSP 450 is implemented. Line referred noise is computed based on an SNR per bin array, which is averaged over 2048 symbols, i.e., every half second. Per bin status and counters can be accessed every second. Per tone raw sliced error data obtained on known transmitted symbol patterns regularly inserted in the data flow, and referred to as ERB data in the ITU-T G.Vector standard, is generally available every sync symbol, corresponding to 64 ms.

Thread 3 data collection performed by block 408 includes additional information from DSP 450 for signature estimation. In reality, both primary and secondary data are available at the beginning of every process cycle, and therefore, each higher thread is able to choose the data necessary for further processing at any time. For Thread 3 processing, block 408 collects the following data: Counters CRC/FEC/SES—An increase of any of these counter values indicates noise environment change and thus can be used for stability assessment and the association of a noise appearance and disappearance event with a line stability change; Per bin status (bi, gi, margin, etc.)—BS activity on affected tones can be used to characterize the underlying noise; Error samples (ERB)—Although post processing, i.e., decoding, of ERB is done in Thread 0, error samples is not used until in Thread 4, where errors can be used to calculate sync symbol SNR, estimate FEXT channel & FEXT free SNR if cross correlated with known orthogonal sequences, and compute statistics mean/variance/skewness/kurtosis to identify noise features.

One important function of the LNAE 404 is to analyze the line referred noise to achieve a complete characterization of the underlined noise environment, as performed by block 410. In embodiments, data analysis 410 performs three major tasks: band detection, noise classification and signature estimation. Signal processing algorithms are heavily involved in the development of these functional blocks.

One purpose of Thread 1 is to classify noise along the frequency axis. Based on the information provided by line referred noise, embodiments of the invention detect the number of wideband and narrowband noises, their peak PSD, central frequency, and bandwidth. To achieve this goal, signal processing algorithms in block 410 address the following issues: narrowband and wideband discriminator; bandwidth estimation; peaks or a packet of peaks detection for narrowband signals; multiple NB/WB detection—e.g. 16 narrowband noises and 3 wideband noises.

An example narrowband detector in block 410 performs the following tasks: peak detection, background noise evaluation and bandwidth estimation. Peak detection can be based on a peak-to-mean ratio (PMR) calculated on each sub-band. The detailed processing is described as follows: First, equally divide the whole receive band into N sub-bands. Then, for each sub-band, we calculate the maximum or peak, and the mean noise PSD. Next compute the value of peak-to-mean ratio according to the following equation:

$$R = 10 \log_{10} \text{peak/mean}$$

Finally, a peak is declared if the value of PMR exceeds a predefined threshold. Note that some of the peaks thus found may be duplicated due to the fact that one single peak may present in two consecutive windows. Therefore, an extra step is needed to consolidate the peaks.

Alternative NB detection capabilities are possible based on primitives that are alternative to the PSD primitive and the specific characteristics of the NB noises. An example of such primitive, referred to as a "crownratio" primitive is defined as the ratio of the power of the modulus of the line noise referred samples over the variance of this modulus. Such primitive enables proper discrimination of narrowband frequency signals, which statistics appear quasi stationary over the period of the DSL DMT system.

Following the detection of all the peaks, embodiments of block 410 next identify the frequency ranges, or the bandwidth, associated with these peaks. Estimation of bandwidth requires the knowledge of the background noise corresponding to each peak. To calculate the background noise, a reference band for each detected peak is defined. At the center of each reference band sits the corresponding peak. The background noise is obtained via an iterative process described as follows. First, compute current noise, which is the average noise level over the reference band. Next, compare current noise with the previous noise; if its difference is less than a predefined threshold, then current noise is saved as the background noise for this particular peak. Otherwise go to next step. For those frequencies (on the reference band) whose noise PSD is greater than the current noise, substitute their noise PSD with the current noise, and replace the previous noise with the current noise. Then go back to step the initial step. The convergence speed of this iterative method is pretty fast; usually it converges within 5 iterations.

Armed with the knowledge of peaks and corresponding background noise, embodiments of block 410 are able to identify each narrowband noise over the whole downstream band. The bandwidth of a narrowband noise is determined as the frequency range on which the noise PSD is 3 dB above its background noise.

The final step of the narrowband detector is to verify if each detected band is indeed a narrowband. If its bandwidth is greater than 276 kHz (as defined in the specification before), then it is removed from the output list. The detector output consists of the following parameters: Peak frequency (PF); Peak power level (PP); and Bandwidth (BW).

Note that the narrowband detection algorithm described here is able to detect a packet of (closely located) peaks as well. The minimum distance between two peaks can be detected is limited by the sub-sampling rate applied to the line referred noise on the DSP. Currently, the line referred noise is sub-sampled by 8, resulting the minimum frequency difference can be identified is 4.3125*8=345 kHz, which is too coarse for the narrowband detection. Improved precision can be achieved by reducing the sub-sampling rate. Further, the performance of the detector needs to be evaluated. With a finer sampling grid, embodiments of the invention are able to apply the detection theory to analyze the rates of false alarm and missed detection.

An example Wideband Detector in block 410 will now be described. The detection of wideband noise is independent of the detection of narrowband noise; i.e. one or a few narrowband noises can sit within the frequency range of a wideband noise. Wideband detection is mainly based on the definition of wideband noise specified above. Since the background noise is unknown, embodiments of the invention use −140 dBm/Hz as the reference noise level. Then, if there exists a frequency range which spans more than 276 kHz and over which the noise PSD of every frequency point is 12 dB above the reference, a wideband noise is declared. Depending on which DS band it resides, the wideband noise can be either of DS1, DS2, or DS3.

In embodiments of block 410, the output of the wideband detector is a structure including the following elements: band location (DS1/2/3) (BL); average power level (AP); central frequency (CF); start/End Frequency; and average noise PSD over the band of interest.

For a WB noise, the central frequency is defined as the frequency point that divides the WB noise into two sections of equal power. The rationale of introducing this parameter is to distinguish two noises of the same average power but with different weight against the frequency.

The example wideband detector described above may use a refined background reference noise level for wideband noise detection; instead of using −140 dBm/Hz as the background noise, embodiments of the invention may derive the true reference from the line referred noise. The WB threshold Thd_wb depends on the actual noise level, which may be depend on the modem noise floor, and which may be different, when the modem is in showtime or not. For Noise Finder, there is a fixed value of −137 dBm/Hz, while for Noise Monitor, the process searches through the whole DS band to find a) the minimum PSD of each DS band; b) the global minimum PSD of the whole DS band. The threshold is set as follows: for DS1, Thd_wb=PSDmin_ds1+3; for DS2, Thd_wb=PSDmin_ds2+3; and for DS3, Thd_wb=PSDmin_ds+3

Here, the number 3 corresponds to 3-dB bandwidth definition. PSDmin_ds1 and PSDmin_ds2 are the minimum noise PSD in DS1 and DS2, respectively, while PSDmin_ds=min(PSDmin_ds1, PSDmin_ds2, PSDmin_ds3).

Further, alternative signal processing algorithms can be exploited to detect wideband signals, other than based on a PSD level against a background noise reference.

In connection with Thread 1 processing, block 410 detects narrowband (NB) and wideband (WB) noises. The process starts with WB detection, followed by NB detection. The reason why WB detection is initiated before NB detection is that certain WB noises (e.g. common mode noise) exhibit multiple peaks which are easily treated as NB signals without the knowledge of the presence of WB noise, and which can be eliminated if it is already known that they reside in a WB signal: based on the knowledge of the presence of a WB signal in a particular band, detection criteria can be adjusted for the detection of NB to avoid false detection of NB embedded in the WB noise.

The decision of what is called a NB or a WB interferer is arbitrary and is dependent on the boundary of the bandwidth of the noise beyond which a NB is declared a WB. To eliminate a blind spot in distinguishing NB and WB, the following boundary definition is proposed:

A narrowband noise is defined as a signal whose bandwidth is equal to or less than Bw (e.g., Bw=276 kHz). Any signal whose bandwidth is greater than Bw is called wideband noise. To prevent a noise from changing category (e.g. from NB to WB, or from WB to NB) from time to time due to fluctuation, we allow for $\Delta B$ (e.g. $\Delta B=Bw/2$) variation for each noise over time. That is to say, when a noise is detected as a NB, generally it stays as NB over its lifetime. If its bandwidth increases a bit to more than Bw, but as long as it is less than $Bw+\Delta B$, it is still the same NB. The same applies to WB noise.

Thread 2 processing (i.e. Noise Classifier) performed by block 410 will now be described in connection with FIGS. 8a to 8d. The input to this thread is the individual noises identified in Thread 1. For each noise, block 410 classifies it into one of the three categories—permanent, evolving and intermittent—along the persistence line, based on when it starts and ends and how its magnitude varies across a 15 minutes window.

Figure 8A:
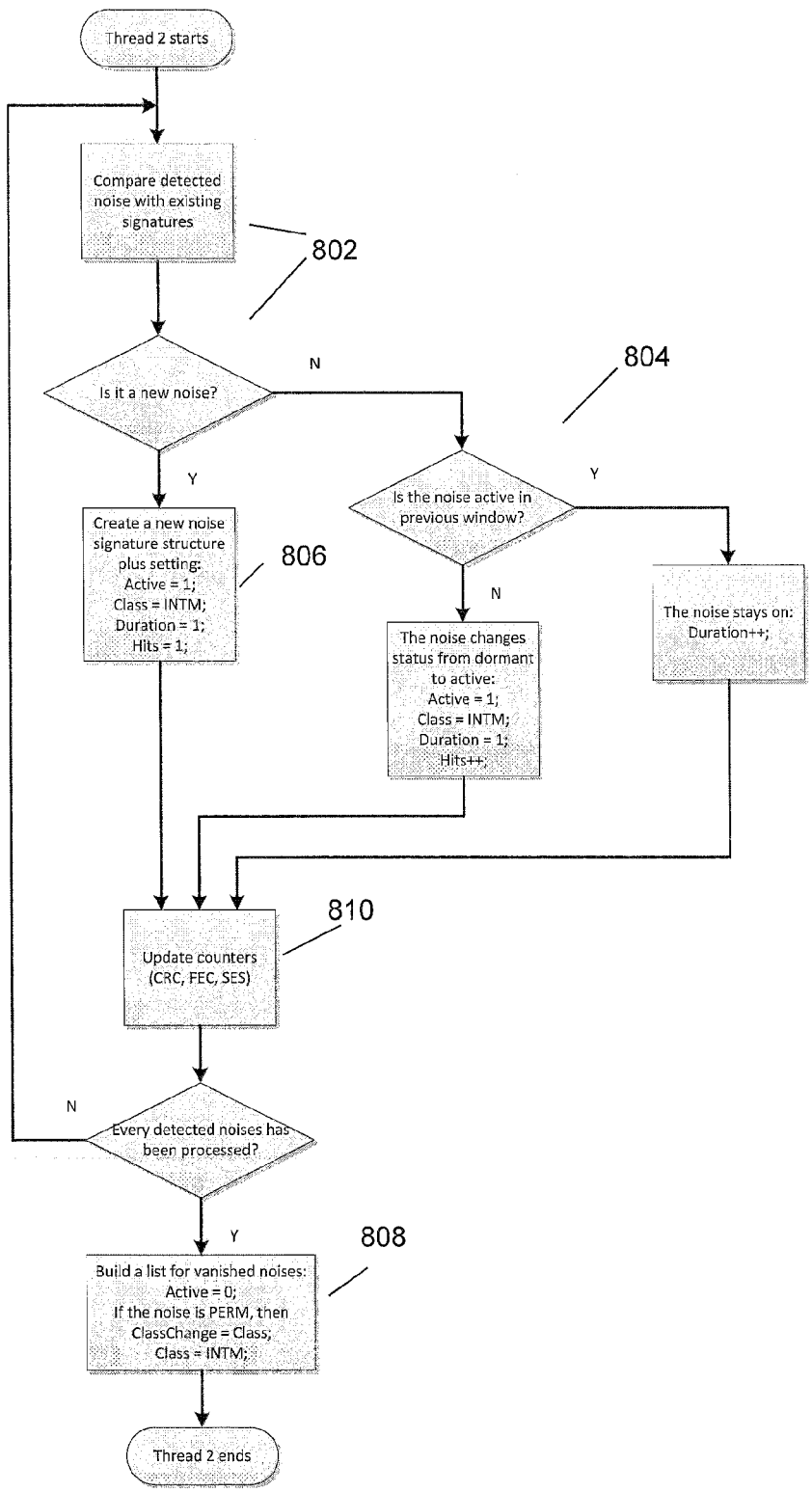
FIGS. 8a to 8d are a flowchart of a noise classification thread that can be implemented by a line noise analysis engine such as that shown in FIG. 4.

An example of initial Thread 2 processing performed block 410 is shown in FIG. 8a. As shown, this processing includes (steps 802) determining if an identified noise is an existing noise or a new noise. For an existing noise (steps 804), determine if it is an active noise or a dormant noise back to active, and track its duration. For a new noise (step 806), record the onset status and features (frequency range, noise PSD, etc.). Step 808 detects and record the disappearance of a noise. Step 810 updates counter values (CRC/FEC/SES) for all active noises.

It should be noted that that the processing shown in FIG. 8a is for the detection of intermittent (INTM) and permanent (PERM) noise only. The discrimination of evolving noise is implemented differently.

Detailed information is now provided for the matching process performed by embodiments of block 410 for both narrowband and wideband noises.

Figure 8B:
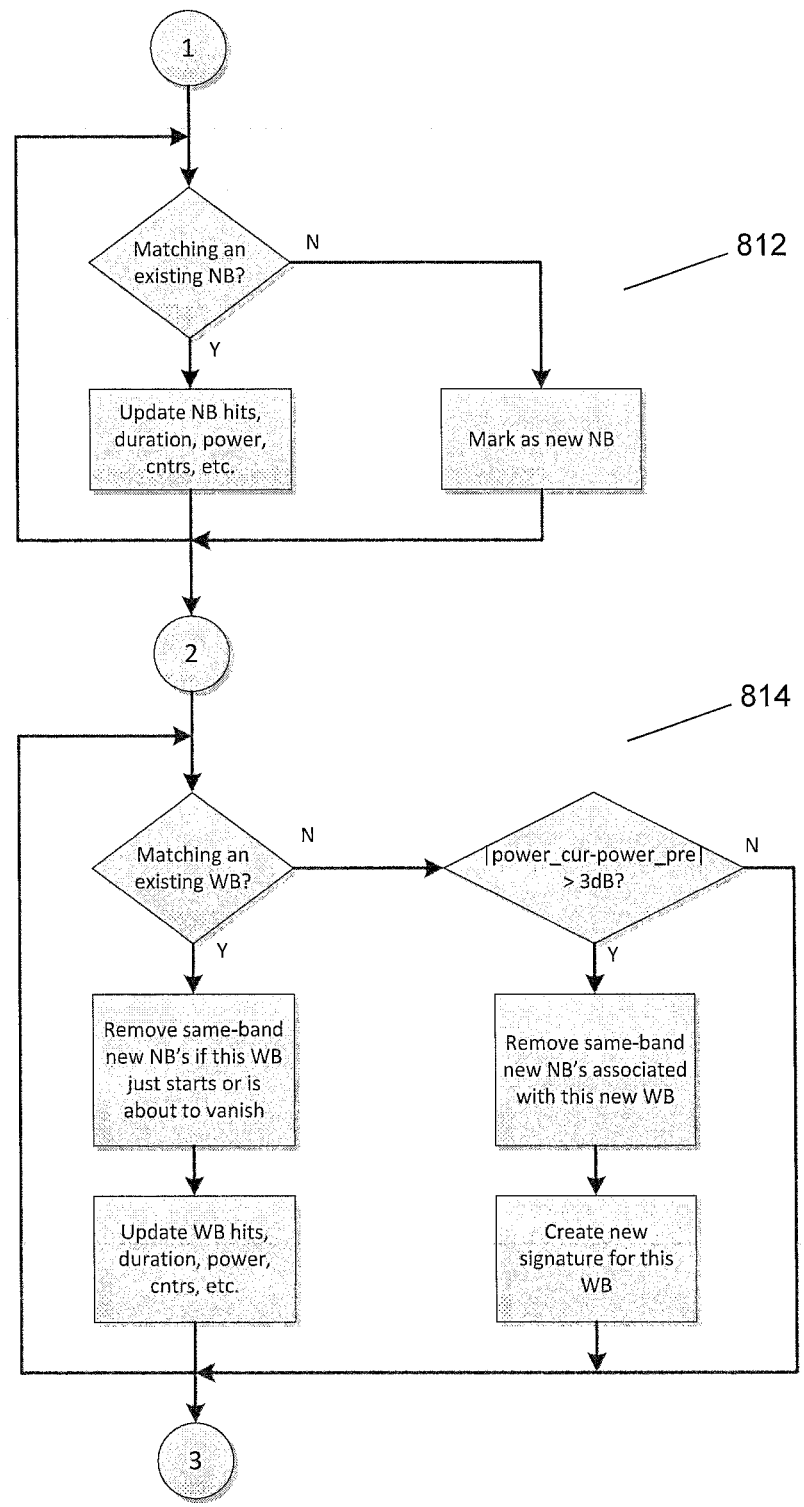

As shown in FIG. 8b, matching starts in step 812 with determining whether a detected NB noise is a new noise. As detailed above in connection with Thread 1 processing, the following three discriminators are used by block 410 to distinguish between different NB noises: peak frequency (PF); peak power level (PP); and bandwidth (BW).

In an embodiment, to declare a matching noise is found from the database, the detected noise has to satisfy one or more of all three conditions: Cond1=(|PFd−PFt|<ThdF); cond2=(|PPd−PPt|/PPt<ThdP); cond3=(|BWd−BWt|/BWt<ThdB), where PFd, PPd and BWd are the parameters of detected noise, while PFt, PPt and BWt are for the target noise; and ThdF, ThdP and ThdB are the corresponding thresholds.

For regular NB noise, e.g. RFI's, peak frequency is the main characteristics to discriminate different NB signals, while condition 2 and 3 can be relaxed somewhat. Currently, the frequency threshold is set to 69 kHz, which is the minimum distance between two NB's can be identified due to a large a subsampling value of fsub=8. The threshold for peak power and bandwidth is set to 20% and 50%. The reason of the rather loose threshold for the matching process of the BW is associated to the subsampling value fsub.

Steps 814 in FIG. 8b illustrate an example WB Noise Matching process according to embodiments of the invention. With the implementation of wideband noise discriminator, multiple WB noises can be differentiated on the same DS band. The following three parameters are used to characterize different WB noises: band location (DS1/2/3) (BL); average power level (AP); and central frequency (CF)

The central frequency is defined as the frequency point that divides the WB noise into two sections of equal power. The rationale of introducing this parameter is to distinguish two noises of the same average power but with different weight against the frequency. In order to find a matching WB noise, the detected noise has to satisfy all three of the following conditions: Cond1=(BLd==BLt); Cond2=(|APd−APt|/Apt<ThdP); an Cond3=(|CFd−CFt|<ThdF), where BLd, APd and CFd are the parameters of detected noise, while BLt, Apt and CFt are for the target noise; and ThdP and ThdF are the corresponding thresholds. Similar to the NB case, power threshold is set to 20%. Upon the completion of wideband noise discriminator, the frequency threshold will be set to 69 kHz for the current fsub.

Figure 8C:
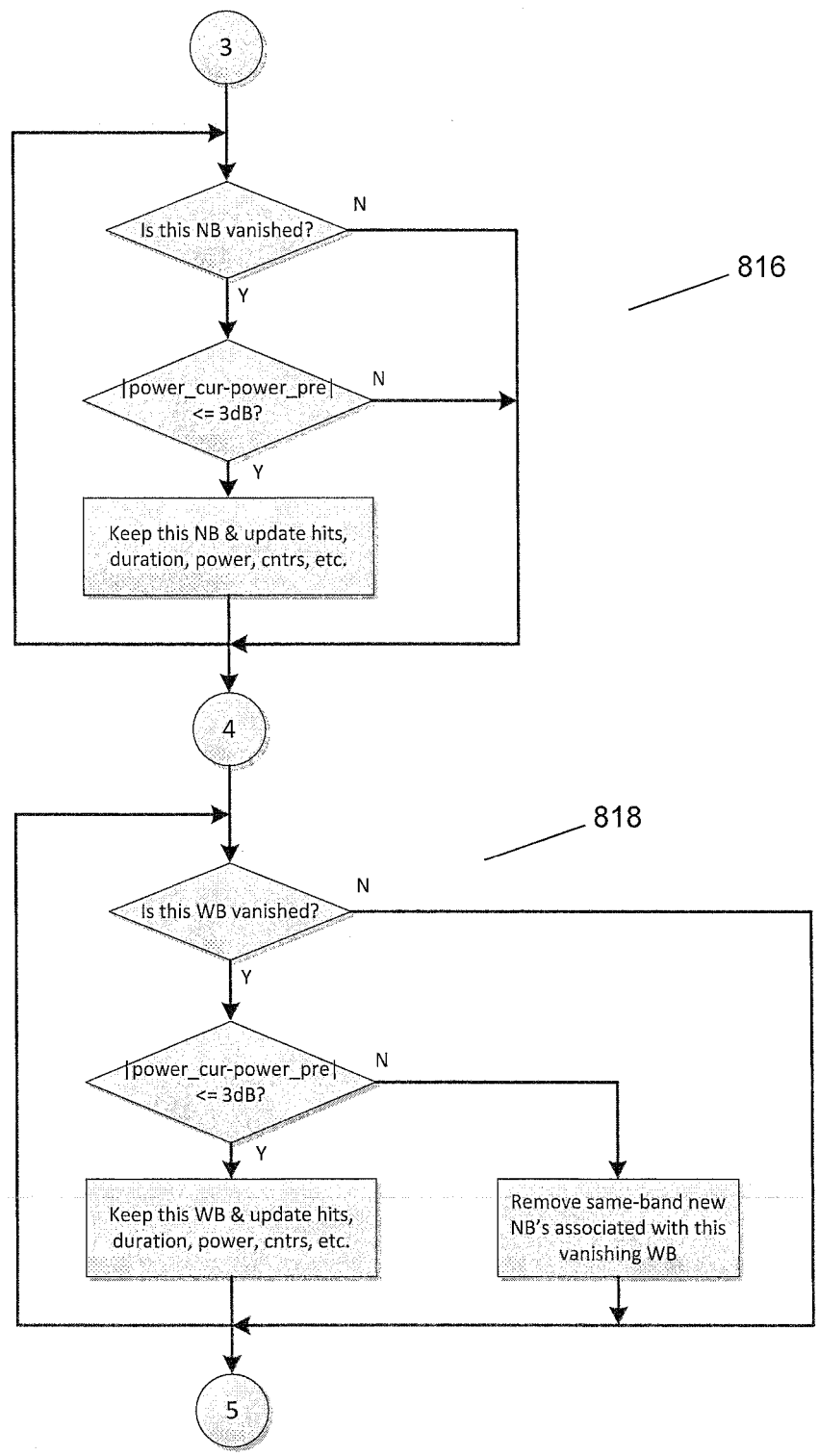
Figure 8D:
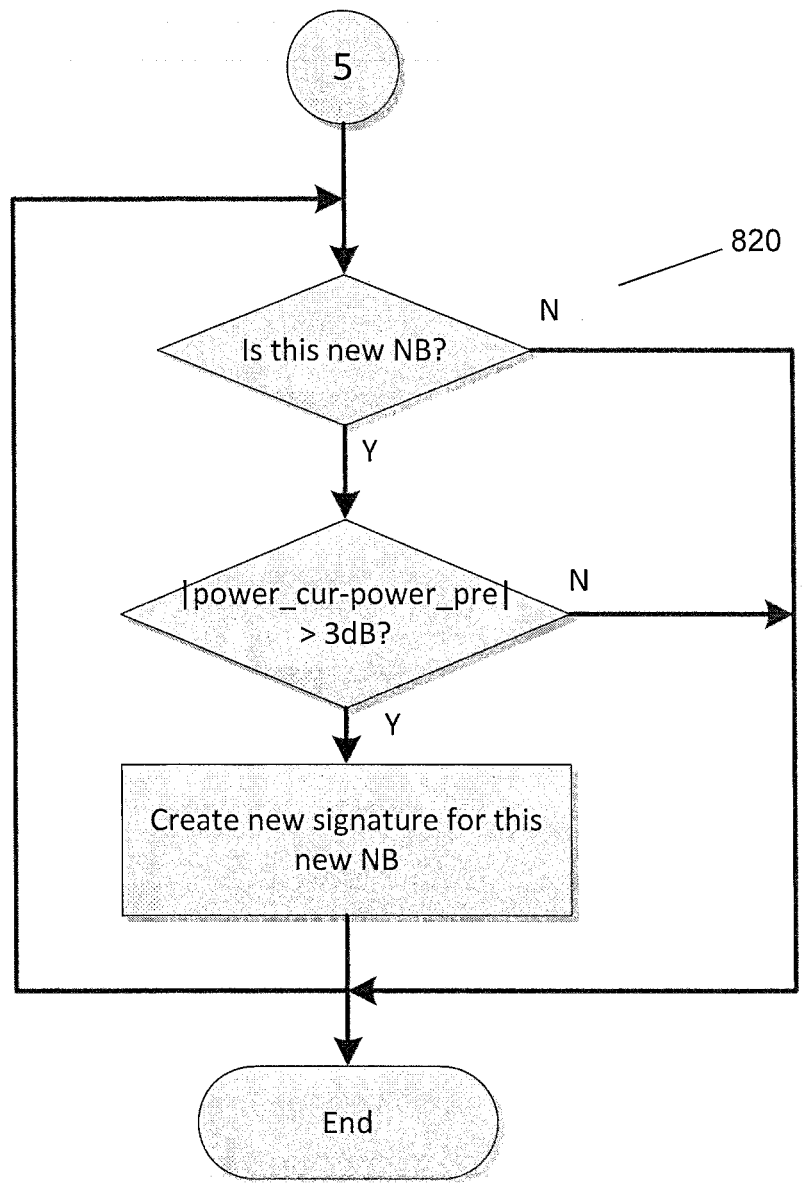

FIGS. 8b to 8d further illustrate a Joint NB and WB Noise Matching process performed by block 410 in embodiments of the invention.

The rationale behind the concept of joint WB and NB matching process results from the following observations: first, many times narrow band signals come along with the appearance of wideband signals. These WB (e.g., Common Mode signals converted to differential mode through a frequency selective coupling transfer function) created NB noises resembling RFI's and are detected as such in most cases. Also, when a WB signal disappears, it creates NB signals as well. Without the joint knowledge of NB and WB noises, false NB detection occurs. Similarly, false NB detection can occur in the presence of impulse noise whenever a partially filtered impulse is reflected in the Line Referred Noise primitive that is evaluated for the detection of the presence of a NB or WB. In other cases, the same noise may alternate appearance and disappearance frequently due to the fact that it sits right around the threshold of detection.

Taking all these into account, the following scenarios are considered in steps 814 to 820 shown in FIGS. 8b to 8d in embodiments of a joint noise classification and matching process for existing noises. These are described in more detail as follows.

For appearing or disappearing WB/NB noises, count partial one second and make it part of the duration; count the first N1 seconds and the last N2 seconds in transition (due to the fact that sometime it takes a few seconds for a noise to reach its full power or completely disappear). Next, filter out new NB noises upon appearance and disappearance of a WB. When impulse is detected, increase the threshold for NB noise detection. Compare NB/WB power with its previous PSD to achieve consistency in detection. Specifically, when a new NB/WB appears, compare it with its previous second PSD, if the difference is less than 3 dB, ignore it without adding a new signature; on the other hand, when a NB/WB disappears, compare it with its previous PSD, if the difference is less than 3 dB, keep it without flagging it as vanished.

In an embodiment, the implementation of joint classification consists of five main steps shown in FIGS. 8b to 8d. In step 812: check detected NB noise: update existing ones and flag new NB noise. In step 814, check detected WB noise: update existing ones; remove new NB noise associated with appearing and disappearing WB noise; create signatures for new WB noise. In step 816, check vanished NB noise. In step 818, check vanished WB noise. In step 820, create signatures for new NB noise.

Aspects of Thread 4 (i.e. Noise Signature Estimator) processing performed by block 410 will now be described. The information generated in Thread 1 and Thread 2, together with data collected in Thread 3, is exploited in Thread 4 to estimate the signature of the identified noise. The estimator performs the following tasks.

First, based on the input from lower threads, it captures or recaptures the basic features of each individual noise, which include: Maximum/minimum/average noise PSD within the lifespan of each noise to track noise power variation; On/Off noise PSD of intermittent or evolving noises; The evolving rate of evolving noises; Noise frequency range, peak location, peak PSD, average PSD, etc. which can be used to characterize the uniqueness of the noise.

Once the above noise signature is identified, it allows to remove some of noise components from the aggregated noise PSD, or even to derive the background noise. For example, in a self Fext dominant environment, embodiments of the invention are able to obtain Fext free line noise if ERB data are available. Accomplishing noise estimation separation also enables the invention to estimate the capacity impact of each individual noise. More specifically, it is possible to compute capacity loss associated with each noise, and therefore to estimate the system's Shannon capacity. The capacity loss associated with each noise can for example be computed as follows:

$$\text{Capacity Loss} = \left\{ \sum_{k=f0}^{f1} (PSD(k) - Ref) \right\} \times fsub \times \frac{4}{3} (kbps)$$

Where f0 and f1 correspond to the start and end tones of the band, reference is obtained from the background noise reference used for detection, fsub equals to 8 in current implementation, 4 stands for 4 kHz symbol rate, and lastly 3 dB per bit is assumed in the computation.

Next, the estimator derives the stability metric associated with each noise. The metric includes the statistics of counters (CRC, FEC, and SES) and possibly BS related information. Further, CRC bound can be derived from SNR to compare with the actual values obtained from DSP.

In addition to the above mentioned tasks, the noise signature estimator determines the type of the detected noise. Noise type is related to its bandwidth, persistence (or continuousness), and other features. For narrowband noise, it is necessary to discriminate between: AM radios and common mode (CM) narrowband interference (NBI) for permanent noise; HAM radios and CM NBI for intermittent noise; and CM NBI and other noise categories for evolving noise.

For wideband noise, similar techniques are needed to distinguish between: Self Fext, alien DSL and CM wideband interference (WBI) for permanent noise; DSL services and CM WBI for intermittent noise; and CM WBI and other noise categories for evolving noise.

It should be apparent that the determination of noise type can be quite involved. However, exploiting the characteristics of some typical noise provides helpful hints and is therefore effective in specific noise source type identification. For example, CM NBI is generally associated with a packet of closely located peaks; AM and HAM frequencies should be within the radio bands defined by US Amateur Radio Relay League (ARRL).

In embodiments, the data logging block 412 generates a 15-minute report and sends it to the CO (i.e. cloud). Before logging starts, block 412 classifies the noise based on its persistence to ensure the right noise class appears in the report. The determination of a noise being permanent is based on whether the noise presents in the 15-minute window all the time. After data reporting, all the counters are reset to prepare for the next record window. For every noise, regardless of its class or type, the following information is sent to the cloud: Noise class (permanent, intermittent, or evolving); Noise type (AM, HAM, CM, Fext, etc.); Current status (active or dormant); Frequency band (NB or WB); Frequency range; peak frequency and peak noise PSD for NB, average noise PSD for WB; Hits and per minute hits; duration and per minute duration; capacity loss due to this noise; Stability impact in terms of counter values of CRC, FEC, and SES; Stability impact in terms of margin reduction (overall margin, per band margin or per noise band BW margin reduction); and Maximum, minimum and average noise PSD over the life span of the noise.

Further, some noise specific features, e.g., rate of evolving for evolving noise, are recorded in the report.

Detailed Functional Blocks of INAE 404

Having described above the processing performed by impulse noise analysis engine (LNAE) 404 according to embodiments of the invention, the functional blocks of the INAE will now be described in more detail. As shown in FIG. 4, these blocks include data collection 414, data analysis 416, and data logging 418.

In embodiments, the only data sent to Thread 1 processing by block 414 are the INM standard parameters (INMEQ & INMIAT, INMAME, Offset, Step, . . . ) as well as the CRC/FEC counters. As per ITU G993.2 Amendment 2, these are described as follows.

INMAME: Number of DMT symbols counter in the observation window.

[INMAINPEQ0 . . . INMAINPEQ16]: A 17 values array summarizing the number of IN duration (in DMT symbols) observed in the observation window. The value range is [0:16], where 16 means that the IN is longer than 16 DMT symbols.

Inter Arrival Time (IAT): Is generated as the number of data symbols from the start of an Impulse Cluster to the start of the next Cluster. If Sync symbols occur between two Impulse Clusters, they shall not be counted in the IAT. Anomalies are generated for several ranges of Inter Arrival Time. The counters of these anomalies represent the IAT histogram. An alternative primitive to the histogram of the INM standardized parameter can also be generated by Thread 0 for consumption by Thread 1 every second for impulse detection. An example of such alternative primitive is a bit or byte array of size 4,000 where each bit or byte of the array represents whether or not one or more impulse have been detected on each DMT symbol of the 4,000 data symbols scanned in a one single second interval.

No major data processes are done by block 414 before the INM process function is called. Nevertheless, instead of sending the data as is, as the process is done through a per second window, the per second delta of each data is computed by block 414 and the obtained data are passed to the Thread 1 and onwards.

Thread 1 (i.e. Detection) processing performed by block 416 will now be described.

Thread 1 provides the number of noise detected from the INMEQ at the scale of the second, and for each of the noise the basic characteristics: Class (i.e. REIN, PEIN, SHINE, FA, etc.); If periodic, the estimated frequency and length at the scale of the window of observation; If aperiodic, the duration.

Figure 9:
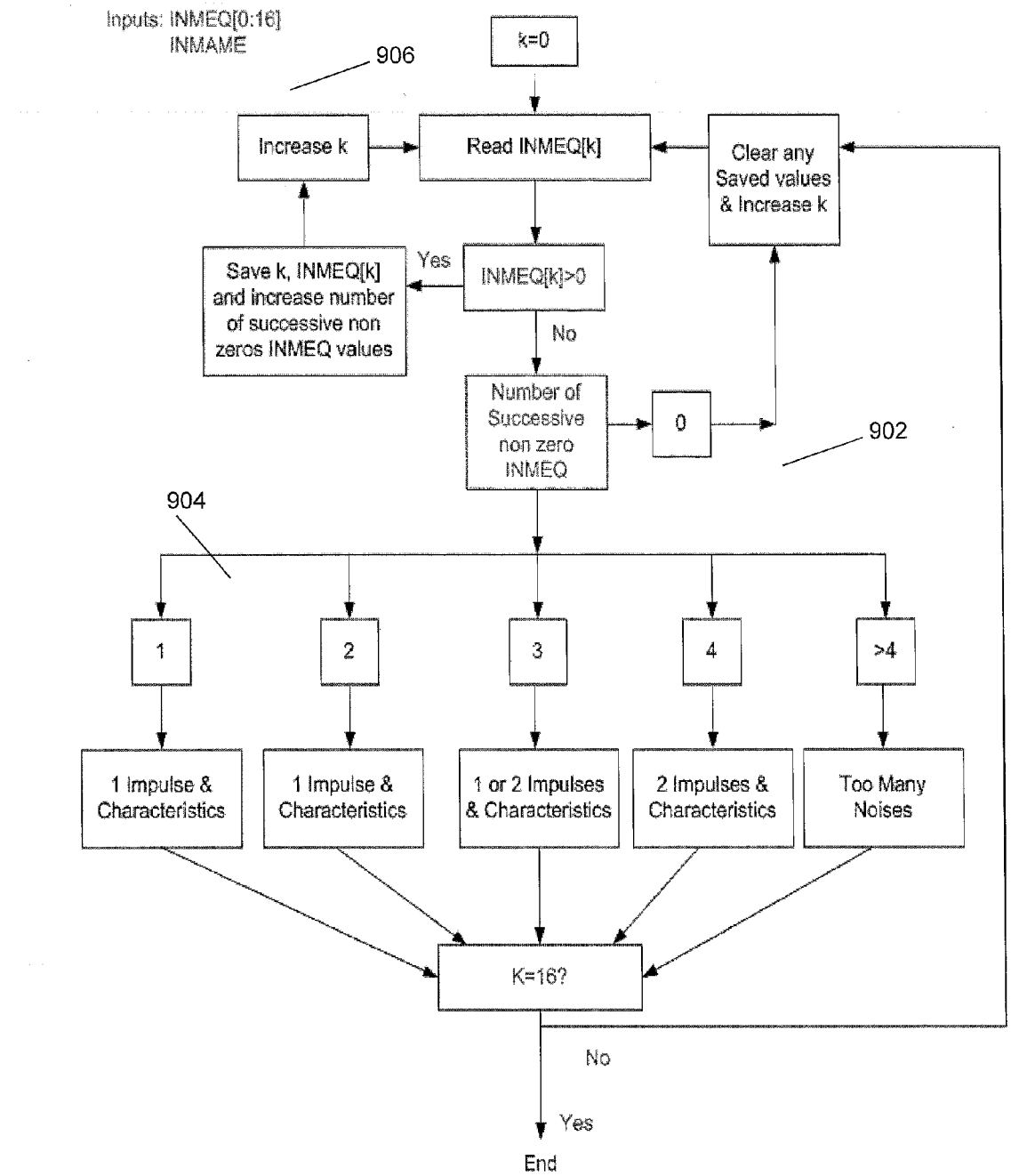
FIG. 9 is a flowchart of an impulse noise sources detection algorithm that can be implemented by an impulse noise analysis engine such as that shown in FIG. 4.

One detection algorithm is implemented in Thread 1 that determines the nature of the Impulses as follows. FIG. 9 is a flow chart illustrating an example algorithm to detect impulse noise from the INMIAEQ histogram (Thread 1 of the INM process). A linear approach has been chosen. In step 906, each bin are read successively (variable k). If the bin is not equal to zero, increase the number of successive symbol counter, save the bin value and move to the next bin. When a zero value is found, check the number of successive symbol counter in step 902. If the latter is not equal to zero, n impulses or multi impulses are present. Based on the value of the number of successive symbol counter (1, 2, 3, 4 or >4) a specific process is put in place in step 904. For example if the number of successive symbol counter is equal to 1, only one impulse is present and the length of the impulse is the saved value of the non zero bin.

Thread 2 (i.e. Persistence) processing performed by block 416 will now be described.

Figure 10A:
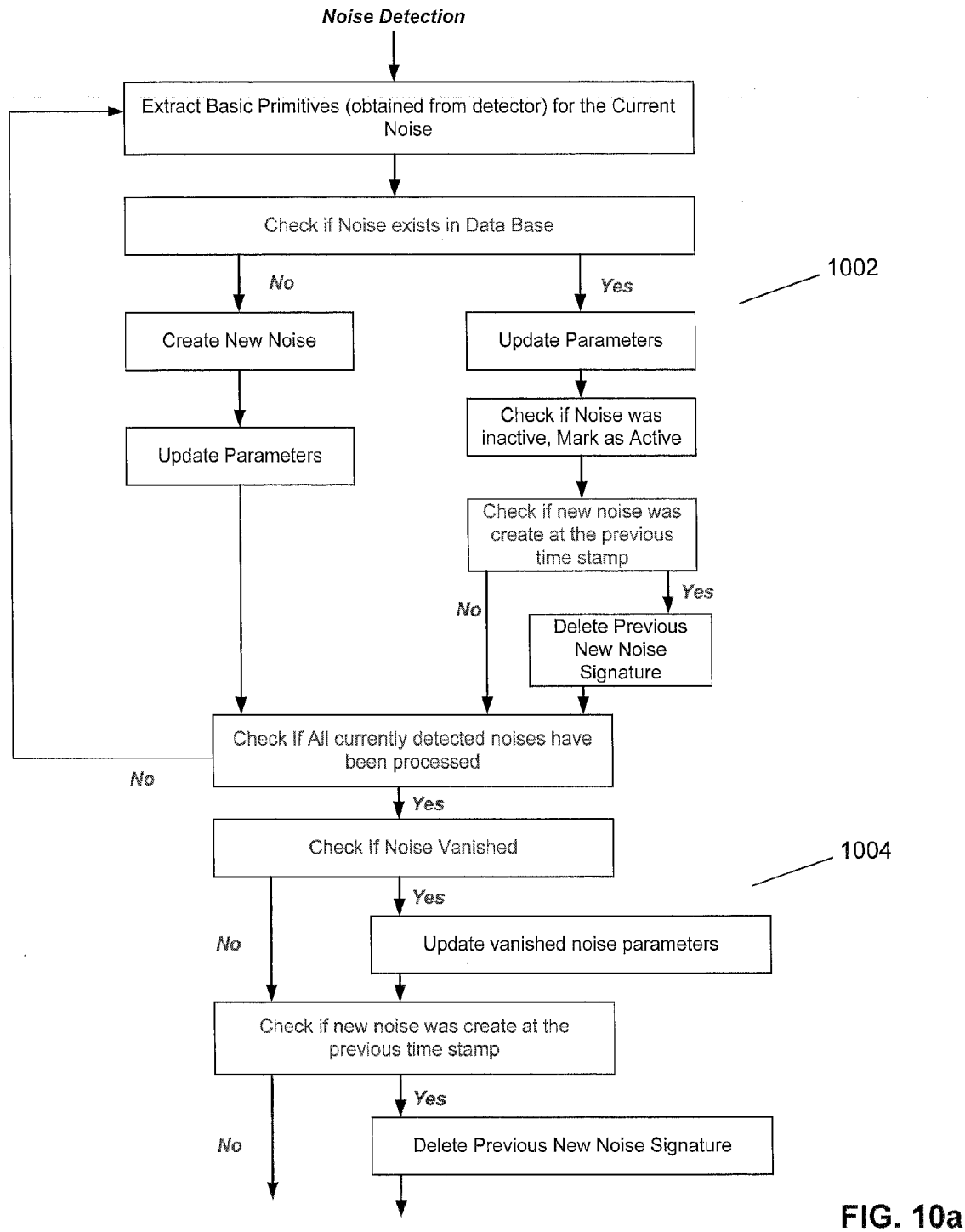
FIGS. 10a and 10b are a flowchart of a noise persistence classification process that can be included in a noise analysis engine such as that shown in FIG. 4.

In embodiments, Thread 2 processing by block 416 includes managing the INM Signature Data Base. The impulse noise database is based on a linked list structure. FIG. 10a describes an example approach according to embodiments of the invention.

The noises detected in Thread 1 are processed one by one. Based on the detector output, the Thread 2 algorithm checks whether the noise already exists in the data base. The purpose of the process is to create a new noise signature in the database at the first occurrence of the noise or to update the noise signature if it already exists. As shown in processing 1002, every time a new noise is detected, a structure is added to the linked link data base, and is by default an Intermittent noise (Class). When the noise already exists (intermittent of permanent) the different fields are updated accordingly.

An active flag is used for each noise structure. A noise is declared active when detected in the current window. Therefore the noise is inactive if it is not detected. Noises contained in the data base can be active or inactive. That means that at any instance of time noises having their active flag noise on are noises which have been currently detected. When a noise reappears, the noise structure is already present in the data base with an active flag equal to zero (inactive status). Because the noise is currently detected the active flag is changed from zero to one.

Figure 10B:
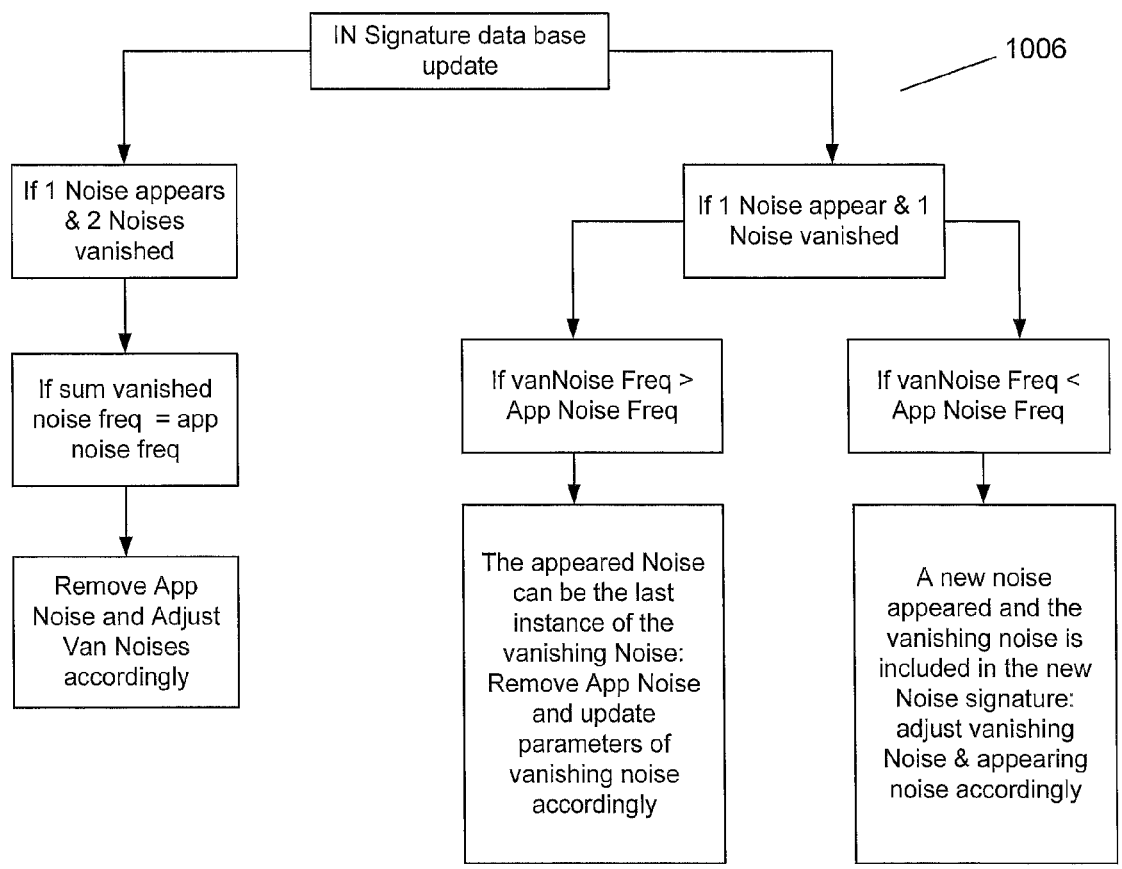

Additional processing shown in steps 1004 and 1006 in FIGS. 10a and 10b is performed to make sure the database is updated with correct information.

When a noise is active, embodiments of the invention update the Nb_Hits and Duration as well as the PerMinHits/perMinDuration. The REIN length and frequency can also be adjusted at a scale larger than a second.

For the specific case of REIN noise, as the noise always appeared in the middle of the one second window, the first detection based on the INMEQ does not offer accurate REIN length and frequency. Because of it, a noise structure with inaccurate parameters is created in the data base during the first second of the noise presence. During the subsequent one second window, the detector provides the accurate parameters which do not match the previous recorded data. Therefore a second noise (accurate this time) is created in the data base and is active, while the previous one changes status from active to inactive as it is not detected any more (because of the inaccurate parameters). In this specific context the inactive noise is removed from the data base and the parameters of the accurate noise are adjusted accordingly.

The same problem is encountered when a noise vanishes. Similarly as in the above case, a new but inaccurate noise can be created in the data base. Like previously, as a noise vanishes and a new inaccurate noise is created, we do not save the new noise in the data base but we re-adjust the parameters of the vanishing noise accordingly.

To resolve the side effect of noise appearing and vanishing for the database and to resolve the possibility of mistakenly matching a given impulse noise to another noise from the database when multiple REIN noises are present, a per second IN Signature Tracking state machine is put in place. As an illustrative example, when two REIN noises are present at the same time and have a similar length (such as 1 and 3 DMT symbols), the impulse noise detector can sometimes see only one noise instead of two during a small period of time (a second or two). The INMEQ histogram will be populated accordingly and the Thread1 detector will only declare 1 noise present instead of 2. The persistence processing by block 416 will declare the two noises currently present as vanishing and will create a new noise instance as appearing. These types of patterns with noise appearing/vanishing are predictable when two or more noises are present and the problem can be easily corrected when the persistence module look at a longer time scale to declare which noise appears and disappears.

Accordingly, a per second state machine in step 1006 has been put in place and run every second after the noise signature has been updated as described in FIG. 10*b*. The purpose of the state machine is to ensure that Appearing (App) noise are legitimately appearing and are not the result of other vanishing (Van) noise that were incorrectly detected as vanishing noise. Whenever a Vanishing noise appear simultaneously as a new noise appears, the state machine checks that the consistency of the database and update accordingly the signature of the appearing or vanishing noise. If one noise appears and two other noises vanish, the process checks if a misdetection did not occur and that the new noise is nothing more than the concatenation of the two vanished noise. In that order the frequency of the two vanished noise are added and compared to the frequency of the new noise. If equal (or really close) the algorithm corrects the concatenation of the two vanished noise by re-establishing them as active, update them accordingly and by removing from the database the new noise signature instance. A similar process is done when a new noise appears and another one vanished. The algorithm checks that the new noise does not include the vanishing noise by cross checking the vanishing frequency noise and the one from the new one. If so, the algorithm re-establishes the vanishing noise as active, and updates accordingly the new active noise.

An extension of the state machine of Thread 2 is the classification of noise occurring asynchronously as Single Electrical Impulse Noise (SEIN) across multiple second windows. The present inventors recognize the problem of not taking into account in the noise signature data base SEIN noise as a particular entity. Every noise coming out of the Thread 1 is categorized as a REIN noise and characterized by its frequency and length estimated at the scale of a second. Therefore when a SEIN noise appears it will be present in the data base as a REIN present only during 1 second (Hits=1, Duration=1). Embodiments of block 416 therefore concatenate all 1 second REIN noise into 1 IN noise signature nominated SEIN out of which a SEIN histogram is constructed. This histogram is defined by an x-axis related to the SEIN DMT symbol length and a y-axis related to the number of hits of the SEIN at the scale of the observation window.

Practically, the SEIN noise signature is updated every 10 sec (current default value). Every 10 sec the data base is run through during which every vanished REIN noise of only one second (Hits=1, Duration=1) will be added into the SEIN histogram based on its length and frequency and then the vanished REIN noise of only one second will be deleted from the database.

Thread 3-4 (i.e. IAT and Counters) processing performed by embodiments of block 416 will now be described.

Figure 11:
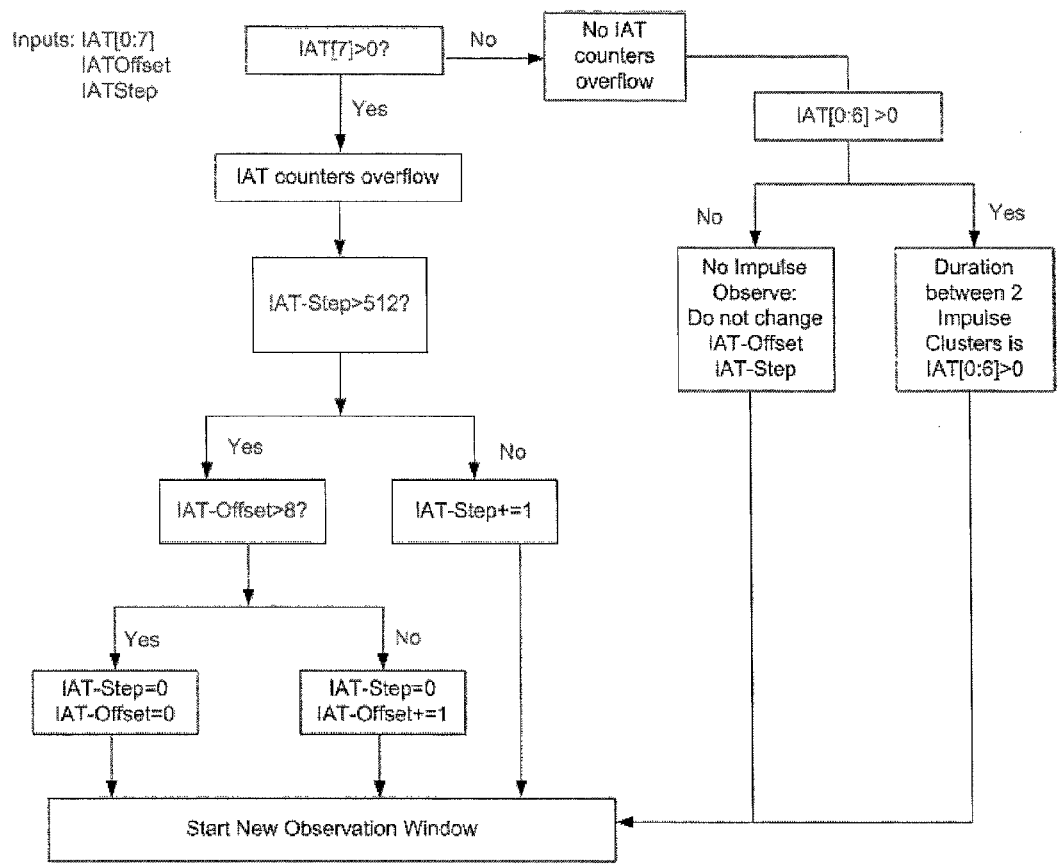
FIG. 11 is a flowchart of an IAT recursive algorithm according to embodiments of the invention.

One purpose of the IAT (Interval Arrival Time) processing is to be able to estimate the time of arrival between two clusters of impulses. The Inter Arrival Time Algorithm consists of determining the inter arrival time between two Impulse Clusters, and determining the Cluster Length. One example of a recursive algorithm for making this determination based on the INM Step and INM offset standard parameters is shown in FIG. 11.

System counters are available every second to Thread 3-4 processing. When a noise appears (flagged as intermittent) a 10 seconds average window estimates the per-second CRC/FEC counts observed during the appearance of the noise. During the 10 second window the accumulated values are saved in the Noise signature as "system CRC/FEC" associated with the the noise appearance. After 10 seconds, the average values are computed and saved in the Noise signature as "system CRC/FEC". They won't be updated later on, and will be part of the signature of the noise and its impact upon arrival. This 10 seconds window for the counter collection is proposed, because it is expected that for the arrival of most intermittent noise, the modem would either retrain after 10 seconds (per the retrain criteria), or the modem would have adjusted its on-line configuration (e.g. through SRA/SOS or bit swap) such that the modem does not retrain and no longer yields continuous errors (such as SES) that would have led to triggering a retrain event. When the noise vanishes, the system counters are then associated with the noise record and they are cleared for the next appearance of the noise. In the Noise Constitution description convention, the system counters represent a sub-parameter that can be used for the characterization of the impact of this noise on the stability of the line. Alternatively, the counters of "SES/ES/CRC/FEC" associated with the noise presence may be collected for the whole duration of the presence of the noise, and not just the initial 10 second window following the noise appearance. This continuous counter collection over the duration of the noise allows the association of the likely counter increase due to the presence of the noise upon its arrival and throughout its presence for the whole duration of the observation window.

Thread 5 (i.e. Logging) processing performed by embodiments of block 418 will now be described.

In embodiments, logging output records are implemented according to tables presented above. Based on the signature extraction obtained from Thread 4, a data log per 15 min window is extracted. Block 418 determines if some intermittent noises have the same nature based on their signature. If so, the numbers of occurrence of the specific identical noises are incremented. As a consequence the log data should not carry duplicate information about a same noise. It is also Thread 5 that links multiple independent noise in the database that are created according to a given pattern by a single noise source and reports it as composite noise. An example of such qualification of such composite noise source, is that of an HPAV which manifests itself by creating various signature of short and long burst during its transmission. The spectral, duration, and sequence in time of the appearance of such bursts and intermittent noises allow the noise to be classified as a single composite noise source, because of the signatures of the elementary noise constituting the composite noise resemble those of a power line communication system.

Use of Noise Analysis Records and Signatures for Actual Noise Source Identifications and Correlation Across CPEs and Correlation in Time for Each CPE In embodiments, detection and classification of noise with a noise analysis engine such as engine 402 is an intermediate step towards actual noise source identification. The 15 minute output record produced by engine 402 contains all necessary information to classify various categories of noises detected by a CPE, following a noise event on the DSL line. A noise event is defined as the presence, departure, appearance and evolution of a noise source impacting the DSL line that can be tracked by the engine 402 of an individual CPE. The class of the noise, its primary and secondary signature information, together with the time information (duration, number of hits) of the presence of the noise encoded in the 15 minute record enables a cloud based expert system to characterize actual noise sources in a DSL network of an operator.

Figure 12:
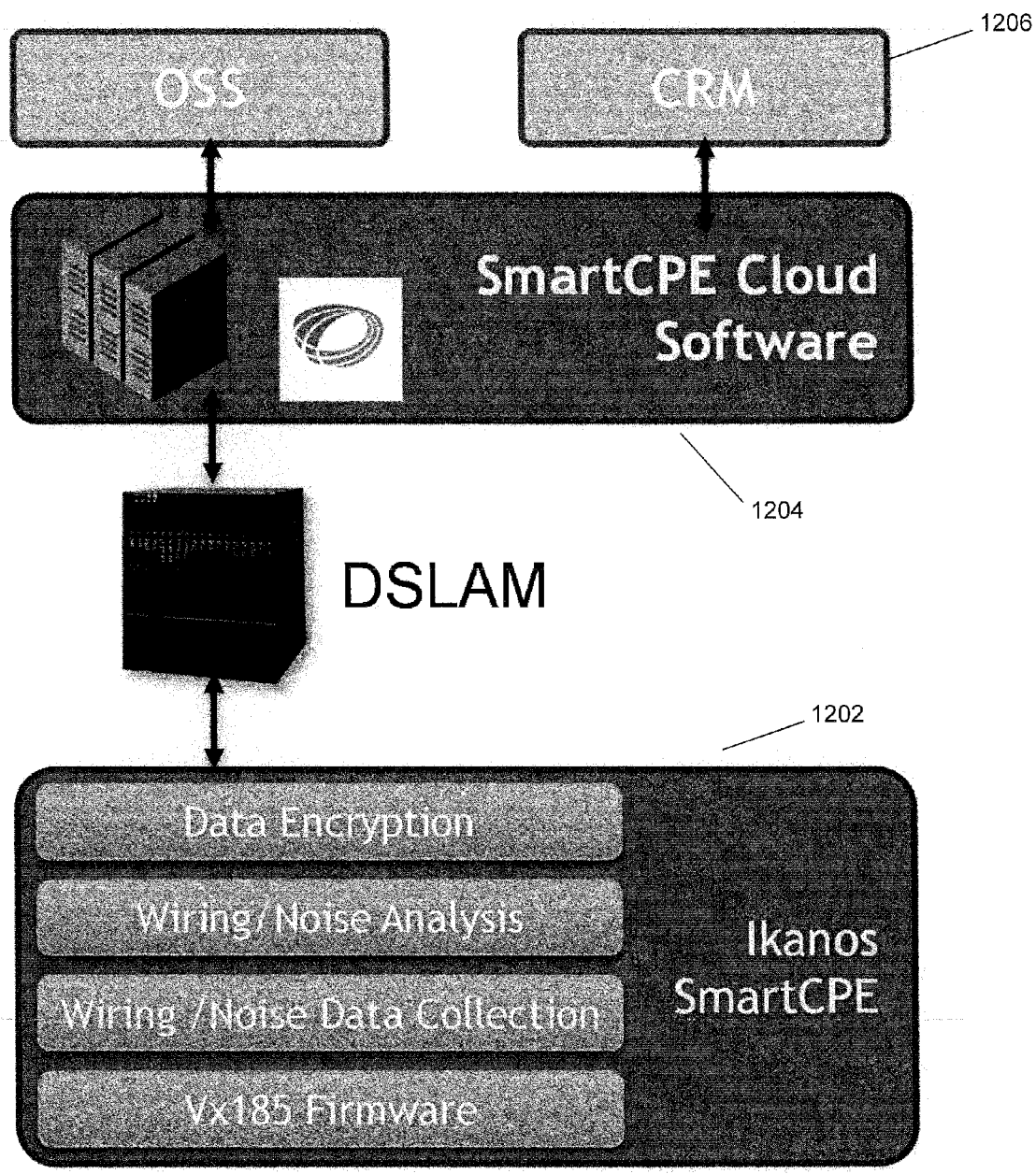
FIGS. 12 and 13 are block diagrams of an overall monitoring and analysis architecture of embodiments of the invention.

FIG. 12 illustrates an example system architecture in accordance with these additional aspects of the invention. As shown, the architecture includes a SmartCPE 1202 adapted with the noise analysis engine 402 of the invention. These diagnostics components are used during the installation and operation of the CPE. Additional components to be described in more detail below execute on the CPE and the cloud software 1204 at the CO to analyze the wiring and noise impairments that affect the CPE, and store the results in the cloud. This information is made available to the operator's OSS, NMS & CRM systems 1206.

The architecture shown in FIG. 12 includes a data collection engine such as that described above which collects various standard and proprietary DSL parameters such as Single Ended Line Testing (SELT) UER, Dual Ended Line Testing (DELT), Impulse Noise Monitoring (INM), & Proprietary PHY parameters such as ShowLN, ShowHLOG every second. This data is then analyzed for wiring and noise impairments on the CPE itself and the results of the analysis are transferred to the cloud. These results, along with the results of additional analysis in the cloud are provided to the operator's OSS/NMS via Representational State Transfer (REST) APIs.

Figure 13:
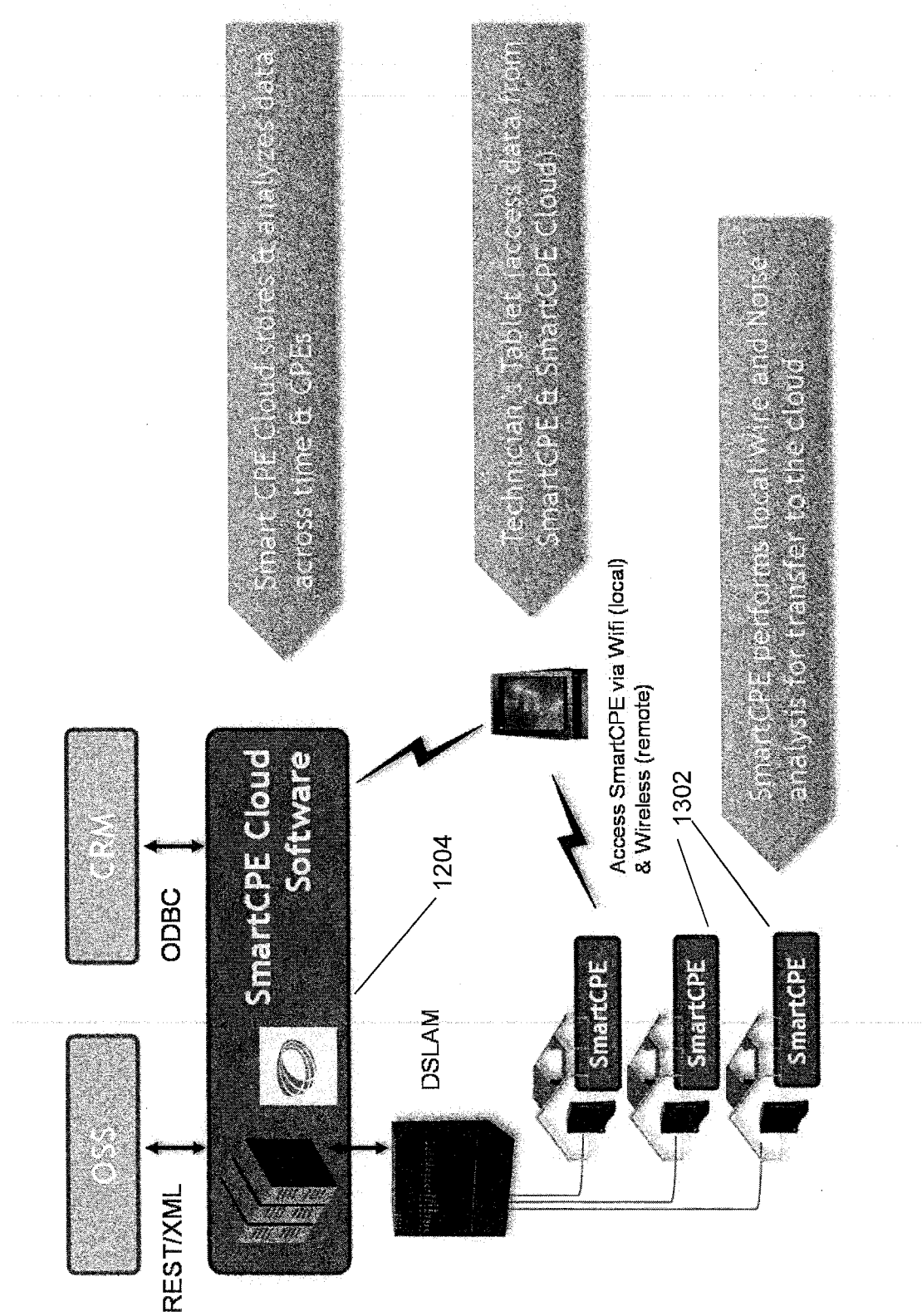

FIG. 13 further illustrates the interaction and interfaces with an OSS (Operation Support System) or NMS (Network Management System). The SmartCPE cloud software 1204 stores and analyses data across time for one or multiple CPEs. Each CPE 1302 (equipped with a noise analysis engine such as that described above) transfers to the cloud a time stamped 15 minute record, which is stored in a historical database. The cloud software allows for historical data to be stored, retrieved and displayed on demand. The cloud software has intelligence and the tools to simplify and manage information across time and customers. The information can be shared with the operator's OSS/ACS (Auto-Configuration Server)/NMS via an REST (Representational State transfer)/XML (eXtensible Markup Language) based interface to identify recurring problems and to correlate problems that affect multiple customers. One such tool gives the ability to associate historical data of noise records provided by each CPE to likely source of noise that corresponds to an actual piece of equipment at the customer.

With the 15 minute output record provided to the cloud, the Noise Finder performs an analysis and provides the "noise environment make up" (similar to the "loop topology make up") by describing the noise environment and classifying each noise according to three dimensions such as those described in more detail above.

Beyond the classification dimensions, each SmartCPE 1302 provides in the 15 minute output record a signature for each noise based on the structure of the noise and its impact on the DSL line. This signature can be used to provide powerful data analysis. For example, the signature may be used to identify the specific origin of a noise source (maintained in a noise signature database) such as the frequency of the pulse width modulator speed controller of a treadmill's DC motor, disturbing the DSL line. The signature can also be used to confirm the recurrence of a specific noise to help isolate the likely source for remediation. Lastly, the SmartCPE Cloud can be used to determine a noise signature that is affecting multiple customers such as the treadmill creating noise across a multiple dwelling unit.

As operators experience recurrence of field issues with specific equipment and customer appliances, the database of problematic noise sources can be enriched. This enables operators to identify more efficiently the dominant noise sources in their network and anticipate widespread impact of new known disturbances.

The SmartCPE Noise Monitor performed by a noise analysis engine such as that described above continuously monitors the DSL line while in service. Its primary objective is to log the appearance and disappearance of intermittent noises sources, detect precisely their time of appearance and quantify the possible impact they have on the stability of a customer's DSL line, as well as monitor changes to permanent noise sources. The timestamp associated with a retrain event captured in a noise monitor retrain report, as well as the per minute hit and duration counter information associated with the appearance of each noise are used to track in time the occurrence of noise event. This information is also stored by the SmartCPE cloud software 1204, so that an operator can review the information and identify patterns regarding the times when such noises occur.

In addition to dynamically diagnosing the presence of noises and their impact on the DSL line, it determines the type of noise, provides details about its characteristics, and suggests modifications to the customer's service profile. The service profile includes parameters such as INP, delay, margin, and tone blackouts.

Figure 20:
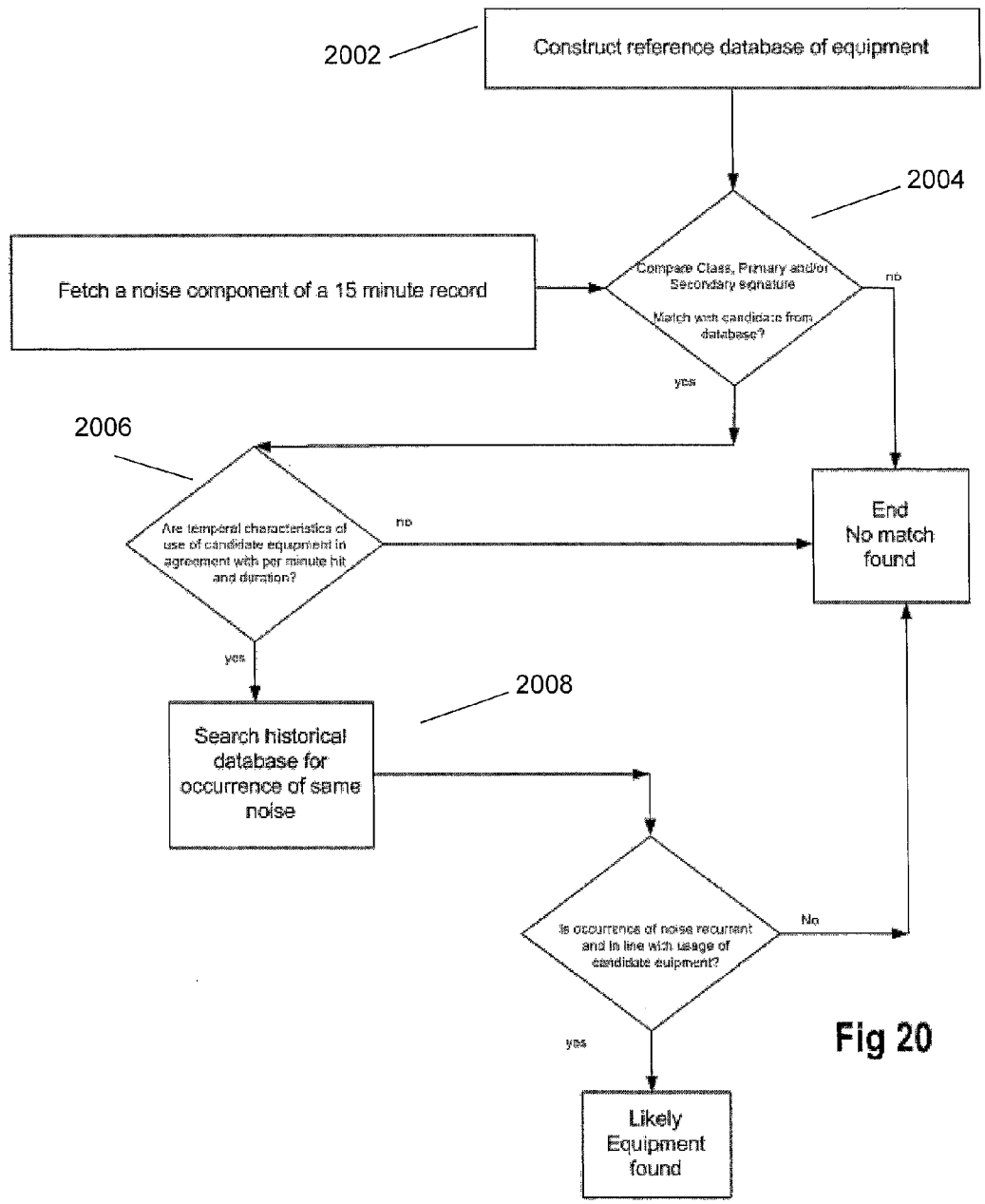
FIG. 20 is a flowchart illustrating an example process for actually identifying noise sources according to embodiments of the invention.

In the cloud smartCPE software 1204, several processes are implemented to enable operator to identify actual Noise source and to perform noise source correlation across CPEs A first process executed by software 1204 is Actual Noise source identification, as will now be described in connection with FIG. 20.

In a first step 2002, a reference database of actual noise sources specific to certain equipment and customer appliances that are known by the operator to be problematic noise sources is first created. The database is organized in an identical manner to the noise database that is populated by the embarked Noise Monitor module on the CPE, with the same noise class types and with primary and secondary signature fields populated.

As an example, based on a published information, a list of NB interferers is used to pre-populate the database with the following information. For example, the information can include a List of AM radio frequency, associated power received on a DM mode on a twisted pair and active for any particular geographical area. The information can further include a List of HAM radio transmission with a list of given frequency associated with amateur radio and reserved governmental communication systems with expected power received on a DM mode on a twisted pair in any particular geographical area. The information can still further include a List of equipment with asynchronous periodic switching devices with high rate (e.g. 200 KHz) and with confined spectrum.

Similarly, based on characterization of known equipment non compliant with EMI regulation and which may impact a DSL line, signatures of known Wideband disturbers may be included in the database. Examples include home equipment such as a treadmill, expected to have a wideband effect on the DSL line. Secondary characteristics of the PSD, such as the underlying repetitive pulse train at 16 kHz of 15 micros pulses associated with the pulse width modulator speed controller of a treadmill's DC motor along with typical PSD level expected on a twisted pair in what frequency range are populated in the noise database. Another example is signatures of known alien DSL services (non self-FEXT) with particular FEXT and NEXT PSD levels in which frequency band. Another example is signatures of known powerline communication systems, such as HP-AV, with typical characteristics of the transmission PSD and its duration, as experienced by a DSL system subject to its impact. Another example is a list of TV equipment, such as Flat LCD monitor with specific PSD characteristics and secondary signature such as the underlying repetitive pulse train with the characteristics of the pulse: Gaussian or deterministic.

Finally, known sources of appliances that create impulses are included in the database with the characteristics of the impulse they generate. Examples include defective modem power supply units that create synchronous (100 Hz/120 Hz) REIN of certain duration. Another example is equipment types that are known in a house environment to produce aperiodic impulsive noise with bursty nature. Such equipment's behavior are characterized by the length of the impulse they create, the level of its PSD, and the structure of the impulse represented in classes (such as plugging/unplugging, thermostats ON/OFF, motor ON/OFF, . . . ) which correspond to the classes implemented as part of the classification of the impulsive noise by the smartCPE noise monitor.

To complete the database, each of the noises in the reference database is associated with certain timing information, which characterizes typical duration during which the piece of equipment is used, how often it is turned ON and OFF, and at what time of the day. Examples are: A treadmill may be on for a duration that last typically from 10 to 30 minutes and more probable time in the day: 7 to 8 AM, 5 to 6 PM; Garden lighting will be turned on in the evening and be on for 4 to 5 hours into night; a TV set will predominantly be ON in the evening after 6 PM for a typical duration of 30 minutes to 3 hours.

Once an initial reference database is constructed, the search for matching actual noise sources to noise output records provided by the smartCPE noise monitor can take place. The process of matching is done along the following dimensions: individual noise characteristics including class matching, primary and secondary signature matching; temporal characteristics (i.e. number of hits and duration over the course of a 1 minute window, 15 minute window or 24 hour window); and time of occurrence (i.e. what time of the day).

In step 2004, class matching with primary and secondary signature matching is done in the cloud in a manner similar to the process matching an appearing noise to existing active or inactive noise on Thread 2 of the smartCPE noise analysis engine. Based on discriminators associated with each noise class (NB, WB, Impulsives, . . . ) that are used to distinguish between different noises in the database, a comparison process based on fuzzy logic is developed in order to find a likely match of the noise in the 15 minute output record reported and the operator candidate reference database. The output of the process indicates whether a reference noise source from the database may be a candidate match to the noise reported by the CPE, given the fuzzy logic parameters such as threshold against used against noise discriminator and range of confidence.

Once a class, subclass or piece of equipment has been isolated, in step 2006 a matching process is done on the temporal characteristics of the disturbing equipment and of the observed noise from the 1 minute and 15 minute record. The logic attempts to match the duration and number of hits and duration reported in the smartCPE output record to the range of duration and hits logged in the reference database for the candidate equipment. The output of the process provides confirmation or not that the candidate disturber may be the actual source of the noise event observed.

Finally, in step 2008 a search across the historical noise data logged for the particular CPE is performed to determine the occurrence rate of the specific noise, and a final matching process determines whether the occurrence of the noise likely coincides with the expected usage of the equipment, as captured in the database (e.g. what time of the day it is expected to be on, and for how long).

The overall matching process consists entirely at identifying a likely piece of equipment that affects the DSL line primarily on the use of fields and elements of the SmartCPE output data record collected every 15 minutes from the smartCPE noise analysis engine. By matching those records to a similarly populated database of known equipment, problems can be more isolated. As operators experience recurrence of field issues with specific equipment and customer appliances, the database of problematic noise sources can be enriched. This enables operators to identify more efficiently the dominant noise sources in their network and anticipate widespread impact of new known disturbances.

Further correlation of noise occurrence to external events can also be determined by matching the evolution of the signature reported by the smarCPE noise module in its 15 minute record to external information, such as environmental conditions or man-made behavior: an example of such correlation is the evolution of the perceived power of permanent RFI NB disturbers reported by the smartCPE module in its 15 minute record due to the ionospheres' diurnal transmission characteristics change, or the scheduled increase power level of the AM transmitters occurring during night time in response to such change of transmission characteristics. Correlation of the evolution of the smartCPE 15 minute record in the cloud with such trends enable operator to identify and confirm the cause of an evolution of the noise environment associated with one CPE.

Another process executed by embodiments of cloud software 1204 according to embodiments of the invention includes Cross-correlation across CPEs.

The process of matching noise visible across CPE is an extension of the previous matching process of an observed noise for one CPE to a likely source. It is also done along the following dimensions: individual noise characteristics including class matching, primary and secondary signature matching; temporal characteristics (i.e. number of hits and duration over the course of a 1 minute window, 15 minute window or 24 hour window); and time of occurrence.

As some noise sources are well characterized by one of their primary signature, the matching process across CPEs in the cloud SW is based on a manner similar to the process matching an appearing noise to existing active or inactive noise on Thread 2 of the smartCPE noise analysis engine. Based on discriminators associated with each noise class (NB, WB, Impulsives, . . . ) that are used to distinguish between different noises in the database, a comparison process based on threshold and fuzzy logic is developed in order to find a likely match of the noise in the corresponding 15 minute output records reported by multiple CPEs. An example of such a noise is a strong AM noise station at a well defined and known frequency; it is likely that the strong AM noise will be sensed on multiple CPEs sharing a same cable bundle. The matching of the presence of the permanent NB noise at that frequency across multiple CPE provides the evidence of the commonality of the noise source. In other situations, such as with wideband disturbers, the matching process takes place across secondary noise characteristics, such as a well defined characteristics of an underlying repetition pulse train, since the matching process on the frequency range in which the noise affects each CPE may differ within the same cable due to the cable imbalance which may be different for each CPE. As an example, correlating across CPE the presence of a wideband noise caused by a treadmill will be performed on the secondary signature of this noise in the 15 minute output data record associated, since the 16 kHz repetitive impulse train is reported as a intrinsic characteristics of the noise for all affected CPEs' noise records, while its impact visible in the PSD field of this noise 15 minute output data record may vary from one CPE to another CPE. Apart from this difference, the comparison process is still based on threshold and fuzzy logic and is developed in order to find a likely match of the noise in the corresponding 15 minute output records reported by multiple CPEs.

An important and powerful aspect of the process matching across CPEs in the cloud, based on the 15 minute record associated with each CPE, lies in the time consistency of the noise events as they are captured by each CPE. One noise event affecting multiple CPEs will be recorded simultaneously in all current 1 minute counters and 15 minute counters that are part of the record provided to the cloud by each CPE. The consistency in time of occurrence of events becomes a matching process that is done on the temporal characteristics of each observed noise from the 1 minute and 15 minute records of all CPEs. The logic attempts to match the duration and number of hits reported in the smartCPE output record for each noise and one CPE to the number of hits and duration reported in the smartCPE output record for each noise of all other CPEs with which correlation is performed. The output of the process provides confirmation or not that multiple CPEs see the same noise event observed. It also allows to confirm that a set of likely collocated CPEs are affected by the same noise source, or suffer from a common loop imbalance.

Figure 14:
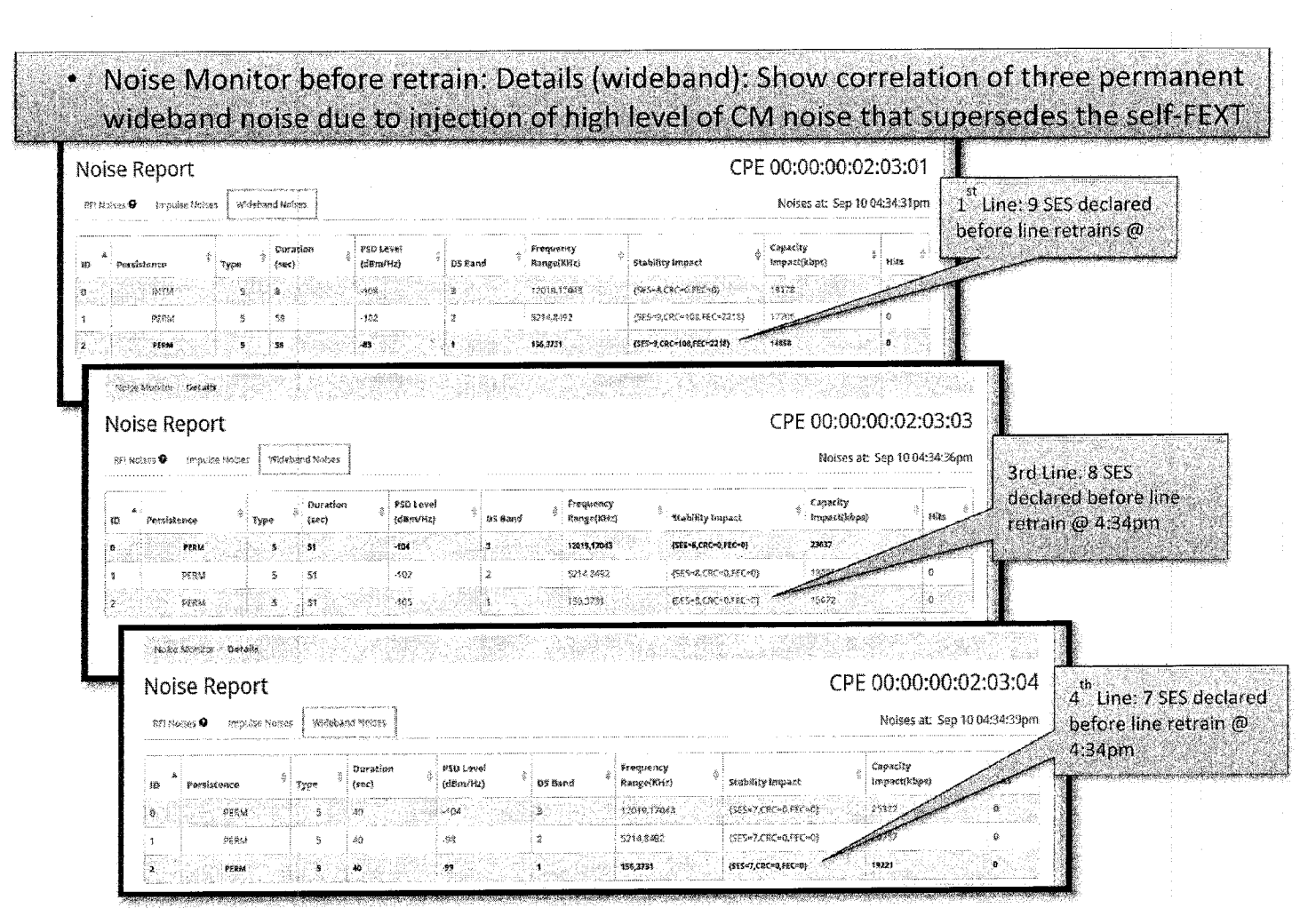
Figure 21:
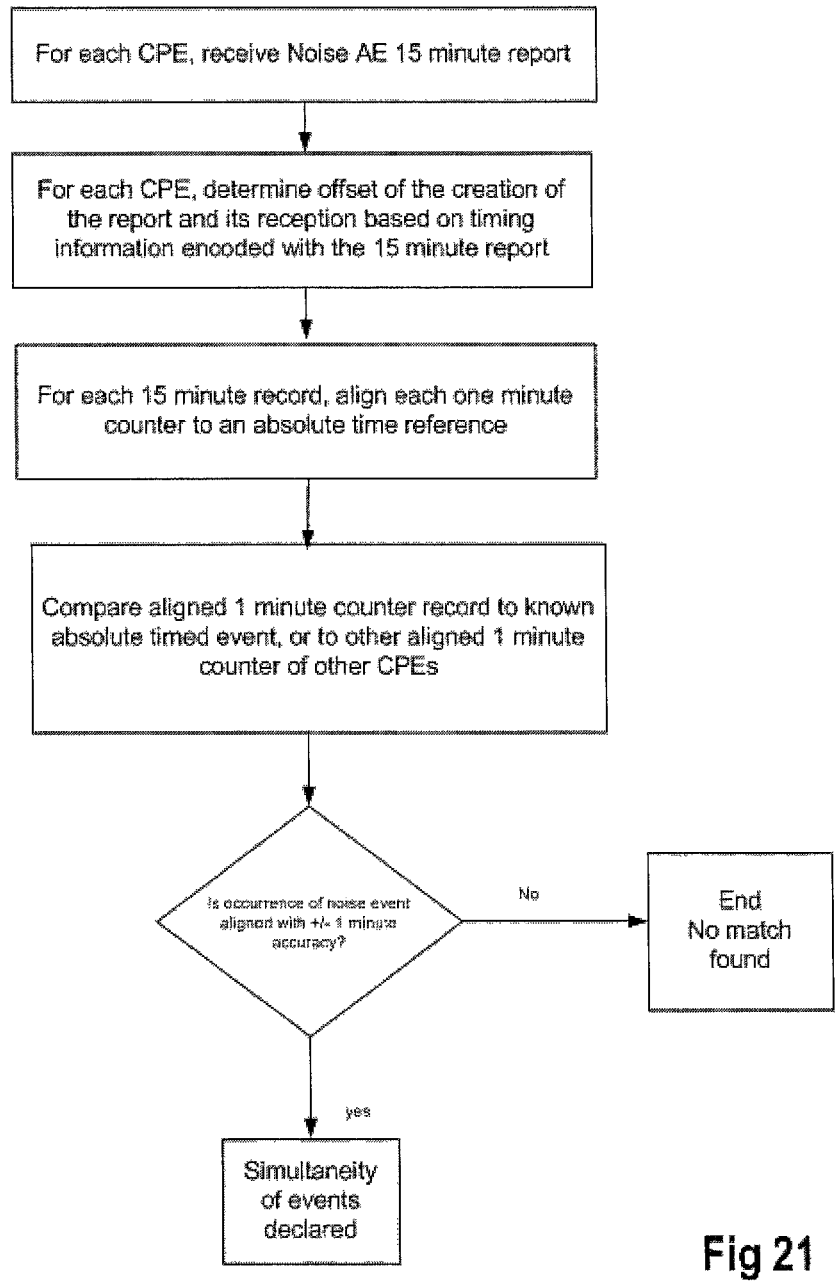
FIG. 21 is a flowchart illustrating an example process for correlating noise events in time according to embodiments of the invention.

While the matching logic for multiple CPEs is done using the temporal characteristics of each observed noise from the 1 minute and 15 minute records of all CPEs, a matching against an absolute time reference can also be done for noise events that occur across CPEs and are known to occur at an absolute time of the day. Indeed, each 15 minute noise report is associated with a given timestamp which indicates which 15 minute duration in any time of the day the 15 minute noise record covers for one CPE. When correlating 15 minutes record across multiple CPEs, the offset in time stamp information associated with each CPE 15 minute record is used to align more precisely the 1 minute counter and thereby determining with more accuracy the occurrence of a noise event on any CPE with an accuracy of one minute. For some events such as noise events that led to line retrain, the time stamping of the noise record created at the exact moment when all affected line retrains allows correlating retrain events due to a same source of noise appearance with an accuracy of a few seconds. This result is illustrated in FIG. 14, wherein the timestamp derived in the noise monitor report associated with a retrain event on three CPEs affected by the same noise source. An example process of aligning the 1 minute counter of the 15 minute records of each CPE and determining the simultaneity of noise events across CPE or against an absolute timed event is illustrated in FIG. 21.

In all cases of correlation of noise events across CPEs, the process is now made possible due to the availability of information of the noise characteristics and their timing information provided with the 15 minute noise records. The process of deriving the absolute time for the record is detailed below: the basic principle is to compute a relative offset from some known time point. The known time-point is the point at which the CPE sends (and the cloud receives) a report. By time stamping utilizing the relative time, both the creation time of the report and the transmission time of the report, and by sending both the relative transmission time and the relative creation time allows the computation of a delta of time in the cloud. Upon arrival in the cloud, which has a known time via connection to a time source over the internet, the server simply subtracts the delta from the current time, converting the report time to an absolute time.

A new process performed by smartCPE 1302 and/or software 1204 in embodiments of the invention includes correlating events for a single CPE over time.

The process of matching noise visible across multiple 15 minute records for a single CPE can be considered an extension of the matching processes described above. It is also complementary to the matching process that is implemented in the Noise Analysis Engine (e.g. engine 402) and embedded in the CPE itself. In the CPE, a database of noise is maintained across multiple 15 minute records, and which spans typically over a 24 hour period in one embodiment of the invention. At the end of 24 hours, the database is reset, or alternatively, the noise that are inactive for more than 24 hours are deleted from the database to conserve the most recent appearing noise records. Whenever a noise appears, the Thread 2 process of the embedded Analysis Engine determines whether there is a match against an existing record from the 24 hour database, and augments the database with the new detected noise, if there is no match. Thread 5 of the embedded analysis engine compares consecutive 15 minute records to update the status of the noise to permanent or intermittent and reports in its 15 minute record sent to the cloud the active noise and a unique Identifier of the noise from its current 24 hour database.

Within a given 24 hour window, the cloud SW 1204 matching process easily determines a pattern of a recurring noise event by scanning a 24 hour window for an exact match of the unique identifier of the noise provided from the Noise Analysis Engine embedded noise database through the 15 minute records. The accuracy of the matching process of two noise events reported by the cloud is in this scenario dependent on the matching process of the embedded analysis engine of the CPE, and the fuzzy logic running on the CPE itself. The cloud SW 1204 simply searches for an exact match of the noise identifier. In an alternative embodiment, the cloud SW 1204 also performs a matching process on the individual entries of the 15 minute records in the following dimensions: individual noise characteristics including class matching, primary and secondary signature matching; temporal characteristics (i.e. number of hits and duration over the course of a 1 minute window, 15 minute window or 24 hour window); and time of occurrence.

This alternative matching process enables the cloud SW 1204 to perform a variation of the noise matching association performed by the CPE itself. It is similar to the process of matching an appearing noise to existing active or inactive noise on Thread 2 of the smartCPE noise analysis engine, but it may be done with a different set of threshold and fuzzy logic than the one that is used by the smartCPE embedded analysis engine. The cloud SW 1204 matching logic provides complementary results than those provided by the smartCPE embedded analysis engine: it can associate more than one noise component in a recurring pattern matching process, whenever a composite noise event occurs that generates systematically multiple independent noise entries in the smartCPE 15 minute records provided to the cloud. Also the cloud SW 1204 matching process also searches a match across multiple 15 minute noise data record that are separated by days, weeks or months and for which the noise identifier for the particular recurring noise from the embedded has changed. Finally, the precise absolute time of occurrence of a noise event that can be reconstructed by the cloud based SW with a one minute accuracy, based on the time stamp associated with the 15 minute record time stamping and the 1 minute hit and duration counters provided with it, enables matching of noise events solely based on their exact time of occurrence, regardless of their noise characteristics. This is important as in some scenarios, the same noise event occurring at different times may be interpreted by the smartCPE embedded analysis engine as having totally two different noise characteristics, and therefore reported as two completely different noise entities in the 15 minutes data record provided to the cloud during the corresponding appearances. These two apparent noise entities from the corresponding two 15 minute data records can only be loosely matched in the cloud historical database, if it was not thanks to the absolute time in a day or a week, where the events occurred and which can be reconstructed from the timestamp associated with the 15 minute data record and its one minute counter. An example of such a scenario is the onset of a sprinkler system at a regular time of the day and which generates wideband noise that deteriorates the stability of the DSL link at different degrees based on environmental conditions. While the noise identification process by the smartCPE embedded analysis engine may result in two different or more noise records that loosely resemble each other, the precise timing information reconstructed from a timestamp associated with the 15 minute data record and its one minute hit counters allows deriving an absolute time reference of each noise event, corresponding to the onset of the sprinkler system. A search of any recurring event in a tight window of observation at a given time of the day across days, or weeks or months will yield a positive matching result for these noise events that appeared originally appeared as completely different entries in the smartCPE embedded analysis engine database.

Apart from this difference, the comparison process described above is still based on threshold and fuzzy logic and is developed in order to find a likely match of the noise across 15 minute output records reported by each CPE.

Management and Maintenance of Real Time Noise Database on CPE

In order to archive noise in the CPE, in embodiments of the invention a data base of noise signatures is created on the CPE and is managed and updated every second. During the first occurrence of a noise, an associated noise signature structure is created. Practically, each noise signature structure could be an independent structure or an item part of an ordered link list, an array or any other group entity. Each noise signature is composed of essential fields which characterize the noise, as listed before, such as for example: the center frequency of the noise spectrum; the spectrum bandwidth of the noise; the aggregated noise power across the noise bandwidth; and for impulse noise, the time domain pulse duration and its associated frequency. Each noise signature could is associated with system parameters such as the estimated capacity loss due to the presence of the noise, the associated SES, ES, CRC, FEC or any other counters increment due to the presence of the noise, and margin degradation due to the presence of the noise.

Each noise signature is composed with a parameter structure relating the time stamp presence of the noise: Hits—Number of time a noise appears; Per min Hits array—An array of number of time a noise appears decomposed on per minute slot; Duration—Number of time a noise is present; and a Per min Duration array—An array of number of time a noise is present decomposed on per minute slot.

The noise signature is also composed of different indexes such as: Noise_ID—an unique ID identifier associated to the noise when the noise appeared. If the ID is associated in an incremental manner, this ID is also representative of the relative noise appearance of this specific noise compared to other noise; Composite Noise ID—When a disturber such as a HPAV creates more than one noise signatures, the CPE can associate to the package of noise signature a composite ID meaning that, after detection, this specific noise signature is associated to a composite noise. Therefore all the noise signatures associated to a same disturber will get attributed a same composite noise ID.

After the creation of the noise signature in the embedded data base, this signature is updated every second based on current noise detection and the fields will be updated and refined. This task is done in Thread 2.

But the Data base also needs to be managed in its entirety. In that order cross signature processing are done. For example every 15 min, the data base is read in order to generate the message sent to the cloud. Or every 24 h the data base is cleared in order to start a fresh $24h$ window. Alternatively, noise records that are older than 24 h are deleted from the database to keep it current. At regular intervals, in order to avoid noise duplication, the data base will be read entirely and we will search for any noise duplicated based on its basic parameters (frequency, power, spectrum, pulse rate, . . . ). If a noise has been duplicated the duplicated instance will be erased and the remaining one updated. This process can be done after any empirical time duration, such as every 10 seconds or every 15 minutes before generating the cloud report.

In the case of impulse noise, every time a 1 second noise appears, a noise signature is created. In order to concatenate all those SEIN impulses into an aggregated histogram, the data base will also be read after an empirical duration (10 sec for example), searching for any impulse noise, which occurs only once. If it is found, the noise signature will be erased from the data base and the associated noise information will be populated in the SEIN noise signature. Identical process are done for SHINE or SHORT noise categories.

Another example of cross processing through the data base is done in order to match composite noise. Searching at specific time if different noise signatures share for example the same time stamps allows the CPE to update accordingly their composite noise ID.

All the above described processing examples are necessary in order to manage and maintain an accurate embedded real time noise signature data base. Similar process can be extended to the cloud which, based on the received 15 min window noise data bases, can run noise cross processing as the scale of the 15 min window or between 15 min window data bases. Each above process could be extended to the cloud as is.

Derivation of L0 Primitives for Noise Monitor

In embodiments described above, the input of the Threads of the noise analysis engine is what is referred to as "L0 primitives". As described above, L0 primitives are ITU-T DSL standardized or proprietary quality metrics produced by the underlying Firmware (FW) that controls the DSL hardware (HW) transceiver and monitors the status and quality of the DSL connection at the physical medium dependent layer (PMD) level and Transport Protocol Specific-Transmission Convergence (TPS-TC) level of the DSL protocol stack.

For the noise monitor analysis engine, L0 primitives can be separated into two categories: status parameters that characterize the behavior of the DSL link and metrics that characterizes the noise environment of the DSL line. While the former relates to how the DSL connection is affected by noisy conditions, the latter attempts to describe the noise environment for what it is in the presence or absence of a DSL connection. The primitives that relate to the quality of the DSL are for example: Attainable bit rate; Margin (aggregate, per band, per tone); counters (e.g. SES, ES, CRCs, RS, Retransmission counts, packet loss, . . . ); and failure and defects (Los of Signal (LOS), Los of Frame (LOF), . . . ).

The Primitives that relate to the description of the noise environment are for example: LN—A per tone line noise PSD reference array based on an average of estimated frequency domain noise samples; STATSN—Alternative per tone statistical moments based on frequency domain noise samples, such as the "crown ratio" factor, mean, variance, skewness, kurtosis, etc.; INM—Impulse noise monitoring histograms built on a per symbol duration and inter-arrival time information of impulses; INM-TD—Alternative time domain Impulse Noise array of per symbol detected impulses; and ERB data: sync symbol error raw data.

Both DSL Link statusses and Noise metrics are collected and post-processed on a per second basis and provided to Threads 1 and 3 of the analysis engine, as illustrated above. While the means by which the DSL link statusses are derived have been standardized, the derivation of the primitives that relate to the description of the noise environment remains to a large extent proprietary. Description of the means by which those metrics are derived for the purpose of meeting the objective of characterizing a noise environment by a smart-CPE noise analysis engine are laid out in more detail as follows.

The first requirement that needs to be satisfied for the Noise environment related primitives is that they enable the detection of noise along the three dimensions that are of interest for the noise classification: frequency (NB/WB), time (Continuous/Impulsive), and persistence (Intermittent/evolving/permanent).

For persistence discrimination, noise primitives are computed every second independently of the previous second, such that a polling of the primitives at a rate of one second enables detection of the persistence of a noise. For frequency discrimination, a per tone array of PSD and other statistical moments are derived to allow the frequency discrimination of noise sources along the frequency axis. For time discrimination, two somewhat independent metrics are derived that captured stationary or impulsive characteristics of the noise: namely, the averaged per-tone or aggregate metrics such as the PSD and other associated moments, and the per-symbol INM histogram or its alternative time domain array.

To enable time discrimination (stationary or impulsive characteristics of the noise), the process by which the per-tone averaged metrics such as the PSD and other associated moments, and the per-symbol INM histogram or its alternative time domain array are generated, results from a careful design. The objective of the design is to derive two sets of orthogonal metrics, one set essentially reporting on the characteristics of the continuous stationary noise, and the second set essentially reporting on the characteristics of the impulsive noise sources. To achieve this objective, a per symbol impulse detector is used to filter out of the continuous noise metrics the impact of any impulse detected. This is realized by detecting which DMT symbol is affected by an impulse and discarding it from the average process that provides the continuous per tone averaged noise metrics. On the other hand, populating the INM histograms or alternative time domain impulse arrays is based on the same impulse detector that takes, as configuration parameter, the level of the continuous noise, such that no continuous noise triggers the impulse detector, which only detects impulsive noise, whenever a continuous noise appears. This design process ensures that the two primitives that are being polled at a one second rate are close to being orthogonal, and that little post-processing in the subsequent layers of the AE is necessary to undo the impact of one type of noise (e.g. impulsive) into the other noise type metric (e.g. continuous) or vice versa.

The filtering of the impulse impacted symbols out of the averaged metric PSD or other statistical moments that describe the continuous noise sources enable better discrimination of noise sources in the noise analysis engine threads; as an example, in one embodiment, three per tone PSD arrays can be computed and provided to the Thread 1 of the analysis engine to enable better detection of impulsive and continuous noise source in a one second window.

A first array is an Impulse impacted symbol PSD array which is the average over the one second window of frequency domain noise samples of all symbols that are impacted by impulses. A next array is non impulse impacted symbol PSD which is the averaged over the one second window of frequency domain noise samples of all symbols not impacted by impulse. A third array is averaged PSD over the 1 second window, which is the average over the one second window of all frequency domain noise samples of all symbols that are impacted or not by impulses.

The three PSD or alternative statistical moment arrays are provided to the Line noise analysis engine Thread 1, as illustrated above, in order to provide orthogonal detection of continuous and impulsive noise sources.

Correspondingly, the process by which the impact of the arrival of a continuous noise on the impulse noise detection capability has to be taken care of. The manifestation of an intermittent continuous noise into the final one second INM histogram primitives that are presented to the IN analysis engine has to be filtered out. The filtering process of the intermittent continuous noise sources consists in disregarding in the histogram report the arrival of a contiguous noise of length that exceeds 500 ms. Also, when such a continuous noise appear for a duration of 500 msec or more, reconfiguration of the impulse detector parameters take place such that the sensitivity levels of the impulse detector adjust to the current continuous noise level. The result of such configurations ensure that in the absence of any other discriminator factor, only impulses of which the instantaneous power level exceeds by some margin the level of the PSD of the background noise are detectable and effectively detected by the impulse noise detector. As a result, the L0 primitive for the L1 thread of the IN AE only reports impulses that are consistently detectable because they are at a certain level above the continuous background noise.

Figure 18:
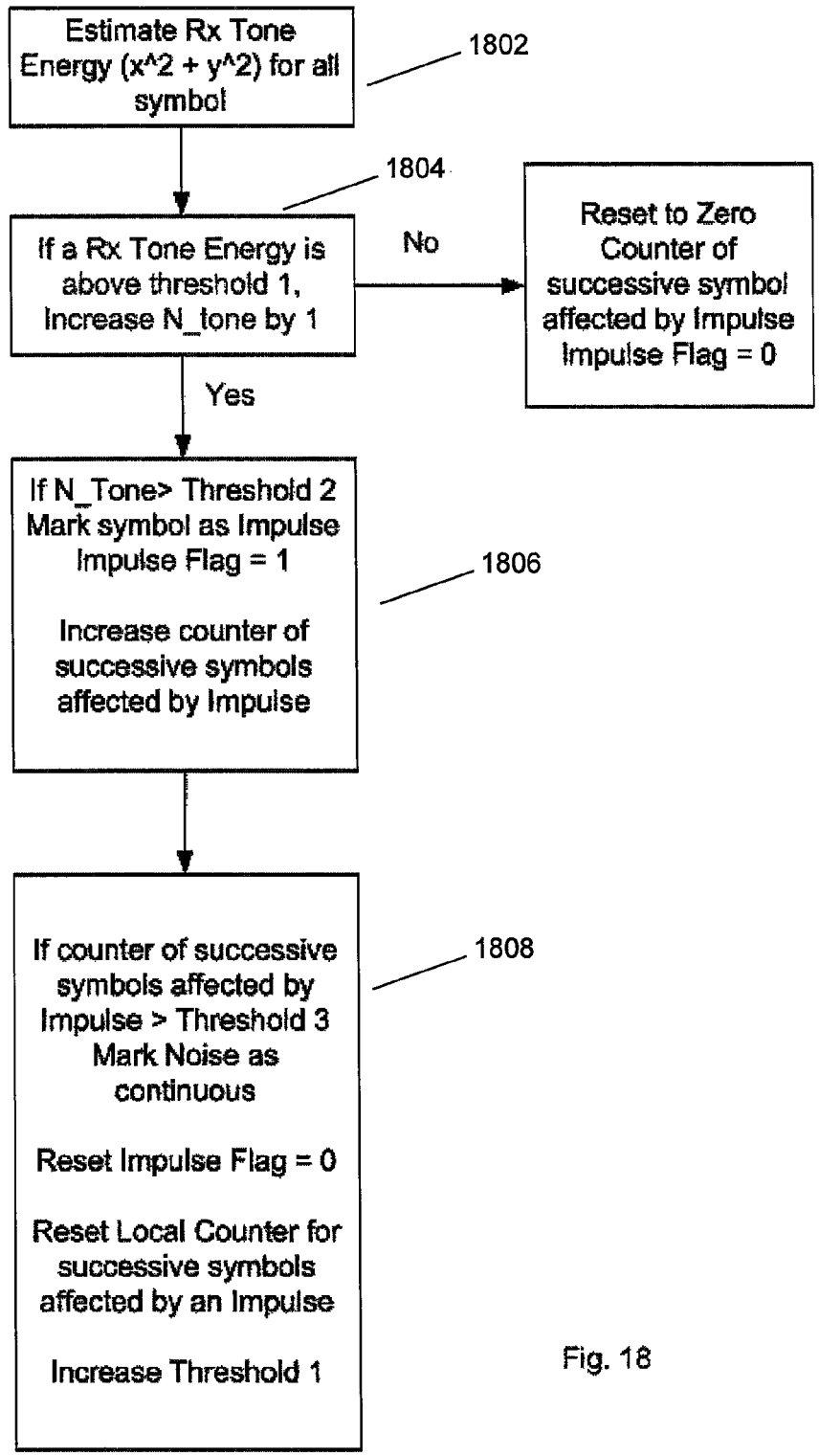
FIG. 18 is a flowchart illustrating an example process for detecting impulse noise according to embodiments of the invention.
Figure 19:
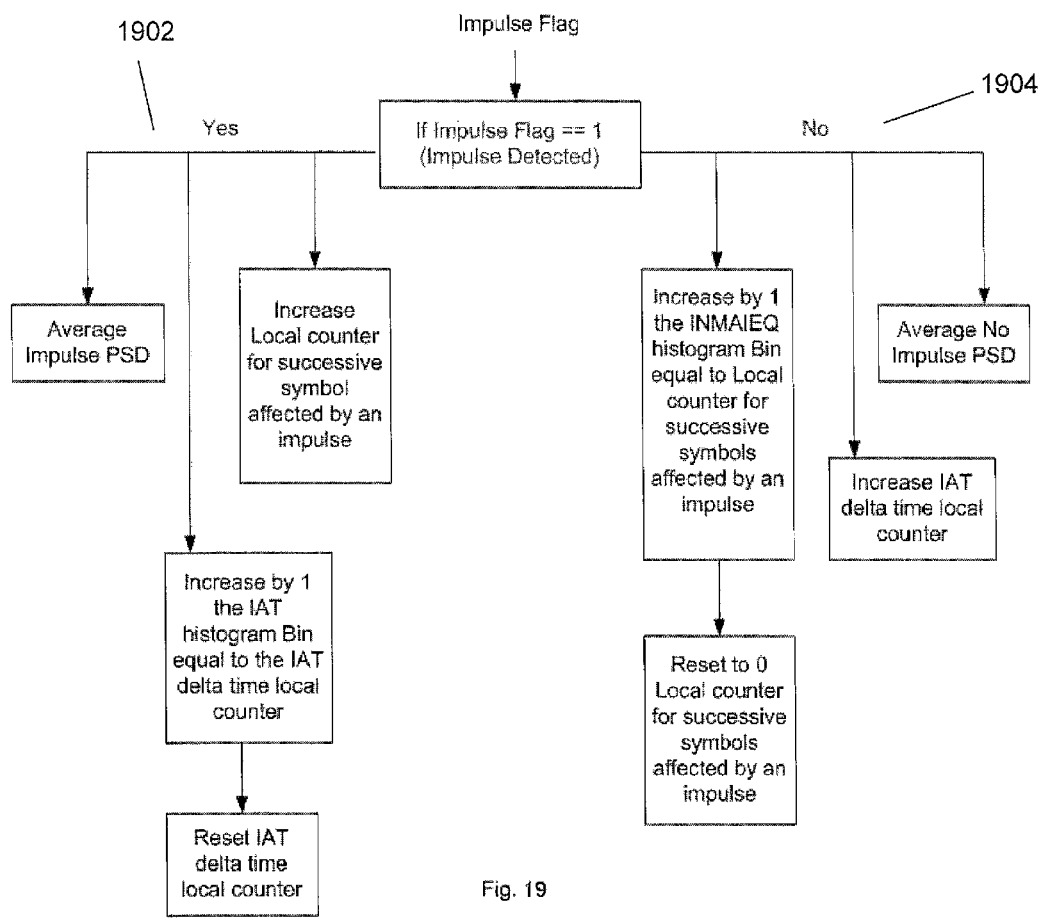
FIG. 19 is a flowchart illustrating an example process of building histograms and PSD related to impulse noise according to embodiments of the invention.

Example processes by which the impulse detector and primitives are adjusted from the impact of continuous noise, and the process by which the line referred noise and alternative continuous noise primitives are generated free of impulse ensures the orthogonality of the two sets of metrics and enable the Noise Monitor analysis engine 402 to operate more independently on impulsive and continuous noise sources for their respective characterization and tracking are illustrated on FIGS. 18 and 19.

FIG. 18 represents a flowchart description of the detection of the presence of an impulse noise, which generates an Impulse flag that is used to generate INMIAEQ histogram and impulse/no impulse PSD arrays. On every received symbol the instantaneous energy or the slicer error (Noise Monitoring) or the FFT output (Noise Finder) is computed for every tone in step 1802. A majority vote approach is used here as an example. Each tone energy is compared in 1804 to a reference (Threshold 1), such as an estimate of the background noise variance previously estimated. If the instantaneous energy is above the threshold, the tone is mark as impacted by noise and a counter related to the number of tones affected by a noise is increased by 1 in 1806. After processing each tone, if the counter related to the number of tones affected is above a Threshold 2 (such as 20% of the total number of tones), the symbol is marked as affected by an impulse (Impulse Flag=1) in 1808. Otherwise the symbol is marked as not affected by an impulse (Impulse Flag=0).

In order to track the appearance of a continuous noise which triggers continuously the detector, a local counter counting the number of successive symbols marked as affected by an impulse is introduced and is increased every time an impulse is detected. If the number of successive symbols marked as affected by an impulse counter is above a Threshold 3 (such as 2000, limit of a SHORT Noise), a continuous noise environment is declared and the Threshold 1 is increased accordingly in order to avoid the impulse detector triggering on the current continuous noise. Also, the Reset Local Counter for successive symbols affected by an impulse is reset to 0, such that the continuous noise does not affect the population of the INMIAEQ histogram.

After impulse detection, the current Impulse flag is used to build INM Histograms and Impulse/No Impulse PSD, as illustrated in FIG. 19. When an impulse is detected (Impulse=1), the impulse PSD average takes into account the current symbol input. In order to compute the INMIAEQ Histogram a local counter for successive symbols affected by an impulse is incremented by 1 in 1902. A similar process is done when no impulse is detected: the no impulse symbol is used in the no impulse PSD average estimation and in order to build the IAT histogram a IAT delta time local counter is incremented in 1904.

Based on these two local counters, the IAT & INMIAEQ histograms are populated. When an impulse is detected the IAT Histogram bin related to the IAT delta time local counter is increased by one and the IAT delta time local counter is reset to zero. Similarly, when no impulse is detected the INMAIEQ Histogram bin related to the local counter for successive symbols affected by an impulse is increased by one and the local counter for successive symbols affected by an impulse is reset to zero.

In a DSL multicarrier receiver implementation, noise metrics such as INM histograms and per tone statistical moment for impulsive and continuous noise are built on slicer error obtained in the frequency domain after the useful DSL signal that is transmitted has been estimated on data symbols while the modem is in datamode operation. These error samples are a faithful representation of the noise samples on the DSL channel provided the useful DSL signal has been properly estimated and no decoding errors appear in the demodulation/decoding process of the data symbols. On the other hand, whenever known transmitted signal symbols or sequence of known symbols are being demodulated, such as the known sync symbol pattern that is regularly transmitted among useful data symbols in showtime, the error samples computed are exact and can be used for specific noise characterization on the line without concern of reliability of the noise samples. For example, the derivation of an impulse noise PSD produced by a REIN impulse solely based on data symbols is inaccurate due to the likelihood that the error samples obtained on these impacted data symbols are unreliable due to slicing errors under a high level REIN noise scenario. Alternatively, one can make use of the error samples collected on the sync symbol (and referred to as ERB (Error Reporting Block)) to estimate a faithful PSD of the impulse impacted symbols, whenever in a REIN environment, only these synch symbols impacted by impulse and collected for PSD estimate are being considered. Collecting error samples on sync symbols based on an indicator of an impulse detector allows for a reliable estimate of a periodic impulse noise PSD in showtime, together with its associated background noise. Alternative statistical moments and primitives can also be built based on the sync symbols errors, either on symbols impacted by impulse or on symbols not impacted by impulses or both at a time.

Derivation of L0 Primitive for Noise Finder

Whenever the modem is not in showtime and is in a listening mode (i.e. in a noise finder session), the samples used to populate impulse noise and continuous noise primitives no longer consist of slicer error data on unknown or known transmitted data. The noise finder module of the smart CPE relies primarily on data that is collected while the modem is inactive. The inactive state of the modem allows better accuracy of the noise data collected (in the absence of any CO TX and CPE TX signals on the line), better signal processing of time domain and frequency domain samples, more memory and resource at our disposal for the post processing of the noise detected over extended period of time. In the absence of any useful data, the frequency domain samples obtained at the FFT output after conversion from time domain constitute the only necessary metric to build impulsive and continuous noise primitives. Similar to the primitives derived from showtime frequency domain noise samples of the noise monitor module (i.e. noise analysis engine operating during showtime), the primitives of the noise finder rely on an impulse detector, which populates histograms and enables filtering of the impulses from the line referred noise primitives. The primitives are made identical to the Line Referred Noise and Impulse Histograms primitives such that the same thread analysis can run on the output of the noise finder primitives.

Figure 15:
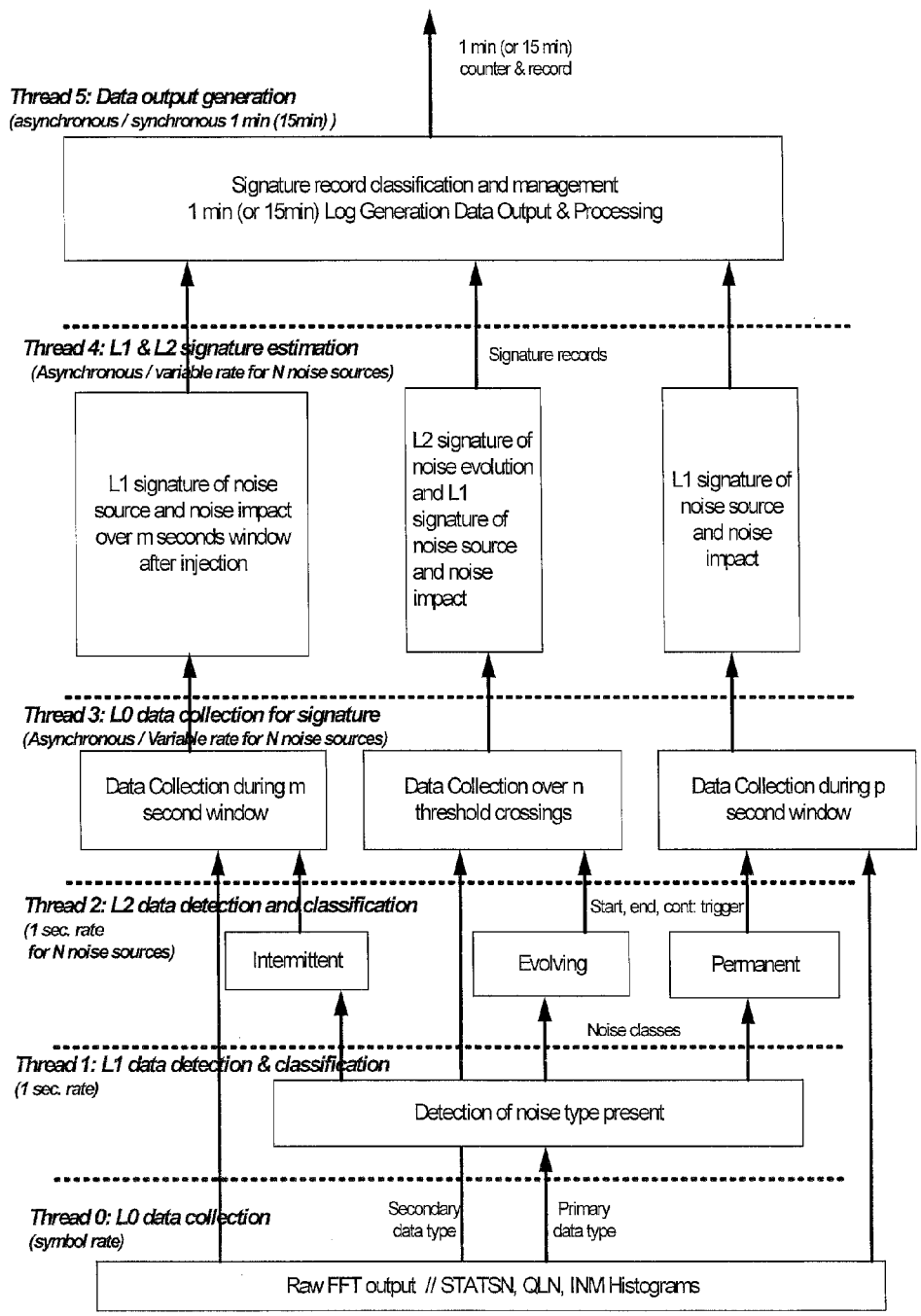
FIG. 15 is a flowchart illustrating an example noise finder process according to embodiments of the invention.

An example process is illustrated in connection with FIG. 15.

As shown, processing for a Noise Finder module (i.e. noise analysis engine operating in a listening mode) according to embodiments of the invention is similar to the processing described above for the Noise Monitor module (i.e. noise analysis engine operating during showtime). The objective of the noise Finder is essentially the same as that of the noise monitor, which consists in enumerating, after identification and classification, the various types of noises present on the DSL line, while the line is not used for DSL transmission. The window of observation will be typically 1 min but can extend to 15 minutes to replicate the window of observations typically used during the monitoring while the line is in showtime. The output results of the observation window will be identical to that of the noise monitor, with possibly more details of signature and sensitivity of the noises on the line since the analysis does not suffer from the presence of DSL signal on the line. Additional signal processing will be possible for better noise characterization due to the availability of the processor, which is not dedicated to DSL data processing at this time. The input data for the processing is similar to that of the noise monitor, as it essentially consists of per symbol error samples collected in the frequency domain. By requirement, the structure of the noise analysis processing threads designed for the noise monitor AE is conserved to apply identically to the data of the noise Finder. The same analysis engine receives either data from the Noise Finder or from the Noise monitor while in showtime in order to provide a consistent analysis of the noise environment, whether the line is in use or not for DSL service.

Figure 16:
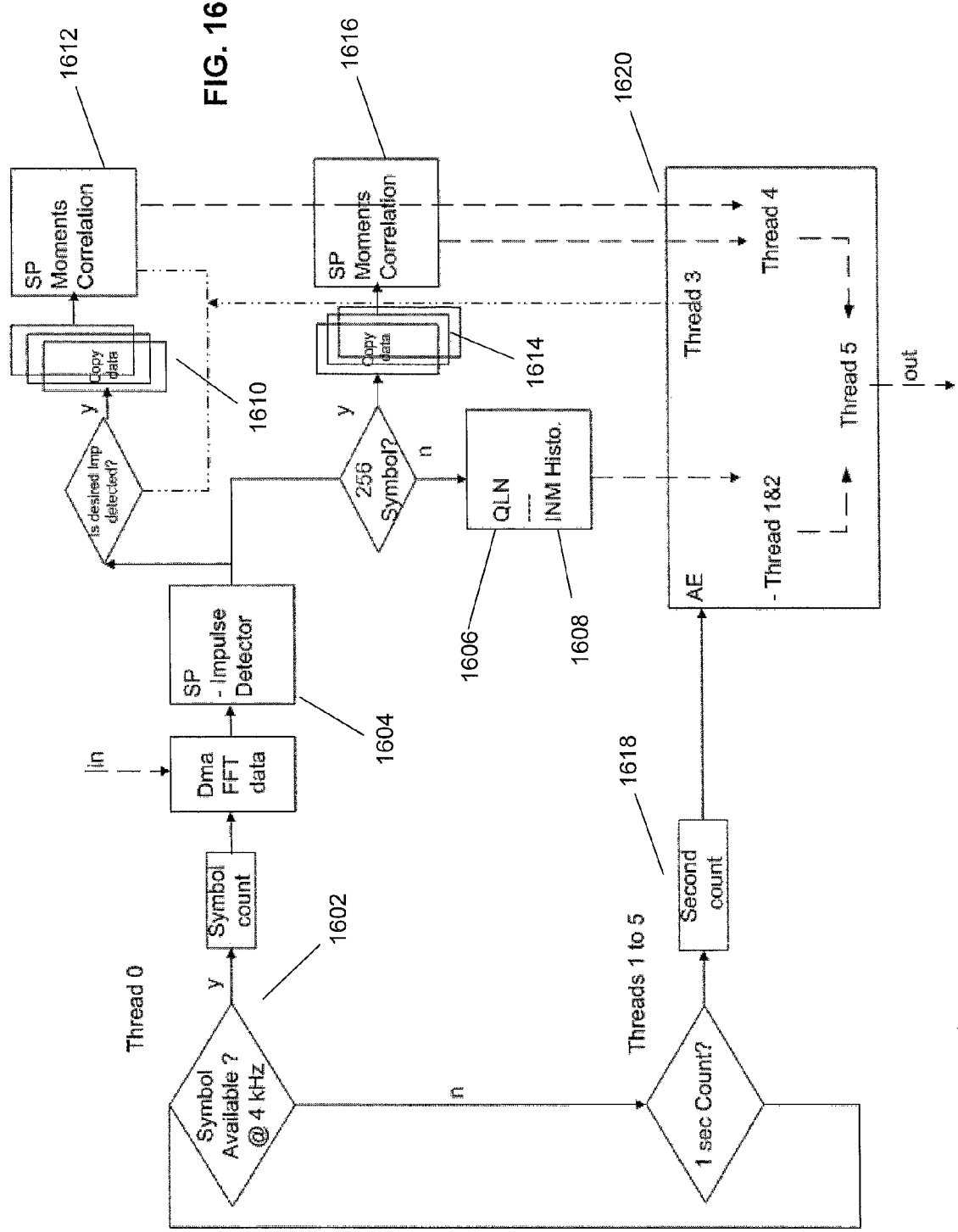
FIG. 16 is a block diagram illustrating operations of example elements of a noise finder process according to embodiments of the invention.

FIG. 16 is a high level description of the SW architecture running of the Noise finder session on the CPE looks like. It illustrates the State Machine and processes associated with the Noise Analysis Engine and in particular how Thread 0 is implemented. The various elements of this SW architecture illustrated are as follows.

Symbol based State Machine 1602. The L0 data collection operates on a symbol based state machine triggered by the availability of FFT output data available from the DMA interrupt. A symbol counter will enable processing of sync symbol and one second event.

Impulse detector 1604: The impulse detection is performed on each symbol based on time domain or frequency domain information. This impulse detection can be done across the bands, per band or per subband. Per symbol average power comparison with reference level (e.g. background noise), by summing up power of all tones or a subset of tones dispersed throughout the bands and compared against single or multi-level threshold. Per symbol per band (DS1, DS2, DS3) or subband (16 tones) by summing up power of tones of subband, band and compare to a per band, subband reference level. Alternatively, the comparison of the variance of each tone can be compared to a threshold and a logical operation can be performed on the comparison outputs of all tones.

Quiet Line Noise (QLN) monitor 1606: A QLN measurement consists of an per tone average of the power of the noise over the 1 second window to provide a similar primitive as for the Line Noise analysis engine 404. The average is done conditionally on an impulse detector flag or flags. The impulse detector flag will be masked with a parameter of maximum erased duration, which would allow to consider the FFT output in the average process, if more than n (n TBD) consecutive symbols are affected by a continuous noise. The un-masking of the "impulse events" from the Line Referred Noise beyond a certain continuous duration (e.g. 500 msec) at the Thread 0, is meant to capture short continuous noise source of continuous nature. An alternative option is to generate arrays of PSD ((a) without impulse—b) with impulse—c) with impulse only) in order to determine at the thread 1 level the distinction between impulsive noise of long duration and short continuous noises.

INM histograms 1608: INM histograms can be populated using the impulse detector flag as input. If several detector flags are available (e.g. per band, per subband), as many corresponding histograms or alternative time primitives array will be built. Similar INMEQ/INMAT histograms to those derived in showtime and based on the whole band, per band, per subband detectors are populates over the 1 second window to be passed on to the thread 1 of the analysis engine. Alternate symbol by symbol primitives (a 4096 symbol array) using binary or a multilevel detector flag based on the whole band, per band or per subband can be populated over the one second window.

Asynchronous symbol State Machine and copy 1610: A State Machine (SM) is provided to copy non contiguous symbols on a subset (size n) of symbols within a one second window, in order to allow a possible asynchronous post-processing on a subset of symbols. The SM copies symbols and manages the buffer (clear, buffered symbol counter, buffer full indicator flag, . . . ) The condition of which symbols to store will typically be for example dependent on an impulse detector output (e.g. per band impulse detector), and the selection of which detector and the enabling of the conditional copy is under control of the Thread 3 of the analysis engine. A limited number of symbols is stored (e.g. less than 10 symbols per second or superframe). A management of the buffered data is under control of Thread 3 once the amount of data to be stored or the available space is reached, as flagged by a SM buffer full indicator.

Asynchronous symbol processing 1612: Processing of asynchronously stored symbols can be performed either as part of the background Thread 4 processing, or possibly every 256 symbols. An example of Thread 4 asynchronous processing is a correlation of individual symbol with a set of pre-defined reference symbol signatures (pre-stored waveform) in order to confirm the correlation of impulses with known noise patterns. Impulses for examples are expected to have a few distinct shapes or waveforms, since they arise from one, or only a few, distinct sources. An attempt is made to identify individual impulses sources and their numbers by distinguishing their signatures.

Access to time domain data allows the noise monitor to characterize impulses noises from its time domain perspective. Alternatively, an IFFT of the frequency domain samples can yield a time domain waveform characterizing an impulse noise. A systematic correlation of previously collected impulse waveforms stored with the collected data samples can allow the determination of the number of distinct sources and confirmation of their relative impact level to the DSL line.

An example process of determining the signature of impulse includes storing initial candidate impulse waveforms, Collecting new impulse waveforms, as they impact the line, performing matched filtering of new impulse waveforms with candidate impulse waveforms to determine match of distinct impulse noise sources, and storing initial candidate impulse waveforms.

Since the process includes determining an initial set of candidate impulse waveforms, this determination is iterative and gets refined over time. An initial set of candidate reference impulse waveforms may be collected in an initial observation period after triggering of impulse noise detectors. Those waveforms may be limited to only parts of the band, such as DS1, DS2, or DS3. A set of orthogonal waveforms is selected out of these sets for each band, if cross-correlation of the individual waveforms with each other in a band is negligible. The remaining set of orthogonal waveforms will constitute the candidate impulse waveforms set for each of the bands.

As new impulses impact the line as determined by the relevant impulse detector, the corresponding frequency error samples for the band will be collected real time, and correlated with the set of reference impulse waveforms.

The process of correlating impulses in the time domain while their arrival time may vary within the DMT symbol in which their presence has been detected is simplified if the process of time correlation is considered in the frequency domain, by performing a tone to tone multiplication over the band of interest, as illustrated below:

$$\mathcal{F}^{-1}\{X^*, Y\}_n = \sum_{l=0}^{N-1} x_l^* \cdot (yN)_{n+l} \stackrel{def}{=} (x * y_N)_n.$$

Where Y is the frequency domain data samples of the collected data samples in the band of interest. X* is the conjugate of the frequency domain data samples of one of the reference impulse waveform in the band of interest. The inverse FFT provides a measurement of the correlation in the time domain. The amplitude of the peak of the correlation is then compared to the amplitude of the peak of the autocorrelation of the reference impulse waveforms themselves. Determination of the matching process will then relies on a comparison of the relative amplitudes of the peak of the correlation of the sampled waveform with all possible candidate reference waveforms and the amplitude of their autocorrelation peaks. Since the occurrence of impulses originating from a same source is expected to be of rather constant magnitude, a normalization process of the input data power may not be required. A discrimination based on the amplitude of the peak of the correlation within a certain expected range is already a measure of the presence of the reference impulse. Alternatively, the width of the peak of the correlation may be used to confirm the high correlation with a reference impulse. This may be necessary whenever the impulse response of the impulse noise data collected falls across the boundary of the DMT symbol. The output of the matched filtering process may also provide a peak position that yield information as to the relative offset of the sampled waveform with respect to the reference candidate waveform, which may also be used in the discrimination process.

The output of the correlation process is an array of candidate impulse waveforms corresponding to each distinct impulse noise source, observed in the band of interest. An impulse waveform is declared of interest, if it has been observed more than once or twice in the window of observation. Else, it will be considered as an isolated event and it will be discarded. Associated with the array of candidate impulse waveforms, a hit count number is maintained over the observation window for each stored impulse noise waveform. This hit count number is provided on a per second basis to the thread 1 of the analysis engine for the determination of the associated impulse within the current one second window.

Sync symbol SM and copy 1614: To be compatible with the showtime Noise Monitor, a specific processing once every 256 symbols (aka. Sync symbol error) is implemented in the noise finder. This enables development of a signature scheme that can be applied to sync symbols; an example of which would be the FEXT Free Line Noise derivation. A State Machine that copies every sync ($256^{th}$) symbol and enables a specific processing: e.g. a systematic average of sync symbols over a hyperframe duration of N sync symbols where N (e.g 256) is under control of Thread 3. A logic is designed to initialize the average, count number of sync symbols and place the output of computation in a dual output buffer of results for consumption by higher threads of the Analysis Engine.

STATSN (Sync symbol processing) 1616: Other statistics of the noise can be computed beyond the average power on the FFT output data for every sync or $256^{th}$ DMT symbol on a per tone basis. The statistics (referred to as STATSN) allows characterization of the noise statistics beyond its power metric. Those statistics are of interest to derive a specific signature of the noise. As the derivation of the statistics is expected to be MIPS expensive, a proposal is to perform the computation only on a subset of symbols, hence every $256^{th}$ symbol. The processing can consist of: Systematic average of mean and variance, Higher order moments (kurtosis, skewness), X/Y cross-correlation, and radius estimator of constellation and ratio of the power of the estimated radius of the noise constellation over the variance of the radius, also called "crown ratio".

As for PSD, two outputs of processing can be collected: one for non impulse impacted sync symbols and one for impulse impacted sync symbols. Based on the possibility of using multiple impulse detectors (e.g. per band detector), the processing of bands for impulse impacted symbols may not be performed on the identical symbols for the three bands. The process of the STATN per tone arrays is done in Tthread 1 for detection of presence of specific noise, or in Thread 4 for determination of a particular noise signature. An example of such a usage relates to the "crownratio" array: certain noise sources such as AM radios induce a crown effect of the distributions of the noise samples at the FFT output of the associated tones that they disturb. A detector of thread 1 based on thresholding the "crown ratio" metric constitutes an excellent detector of AM radios in Gaussian wideband background noise. Further the "crown ratio" metric can be used to derive a noise signature of wideband or narrowband noise. As an example, a 16 kHz pulse train associated with a treadmill DC motor PCM current injector produces in the per tone "crown ratio" array a repetitive pattern from which the underlying 16 kHz repetition train can be easily derived. The high "crown ratio" at multiple of a fundamental frequency also reveals the repetition of deterministic bursts.

One Second state Machine 1618: In embodiments of the noise monitor, the Analysis Engine operates on a per second state machine. The one second tick is computed on an equivalent 4 k symbols counter.

Since not all primitives generated by the Noise Finder L0 thread are identical to those generated in data mode by the Noise Monitor L0 thread for the LNAE 404 and INAE 406, the interface is adapted accordingly. The purpose is to enable the same functionality than what the Noise Monitor provides with similar L0 input primitives.

Threads 1 thru 5 of Noise Analysis Engine 1620: As illustrated in FIG. 15, processing of the QLN and INM equivalent primitives of the Noise finder is preferably done with the same L1 and L2 Analysis engines associated with the showtime Noise Monitor analysis engine 402. A one second state machine is implemented that polls QLN and INM data every second and process them with the same 5 thread process implemented for the detection and classification of noises in datamode. Since the noise finder may have different or additional L0 primitives, the thread 1 thru 4 of the Analysis Engine 402 may be expanded to take advantage of these new primitives. Also, the DSL link statistics such as stability counters are not collected during a noise finder session. The output of the noise finder process is a set of noise records that populate the noise database in an manner identical to what is created with the noise monitor. The equivalent of the 15 minute record is created for the duration of the noise finder session, which can last between a couple seconds to minutes or more. The equivalent 15 minute record will be time stamped and uploaded to the cloud database upon the modem reaching showtime at the next DSL connection.

Embedded Diagnostics Application for Wiring Monitoring

As shown in FIG. 12, embodiments of SmartCPE 1202 include a wiring monitor module. Example objectives of the Wiring Monitor module include monitoring while in showtime a possible evolution of a wiring impairment (slow or sudden change of the direct or echo path), for example the evolution of an attenuation due to an elevation of the temperature of the cable, or a sudden increase of echo following a loose connection, and performing an analysis of the channel (direct path, echo path), while the modem is starting up or in showtime, so as to track changes between startups.

The second objective attempts to alleviate the disruption associated with a "SELT/DELT Wiring Inspector" session that is systematically performed prior to startup whenever the line retrains, and which keeps the line unavailable for service for the total duration of the SELT and DELT sessions and their post-analysis. The "wiring monitor" module session does not add down time, and for wiring fault events that lead to a retrain, the characterization of the wiring impairment that has led to the retrain will be characterized in the following startup, if the impairment remains, and provided that it has not already been diagnosed prior to the line retrain event.

The wiring monitor module in embodiments of the invention is not a substitute to a "wiring inspector" module, which still can be invoked whenever the line is unable to connect (e.g. line cut), or whenever the CPE is allowed to enter a disruptive maintenance mode that can keep the line down for the duration of a SELT and/or DELT session.

Two use cases of the wiring monitor module are described below.

Showtime use case: to track slow or sudden change of the wiring topology that impacts the modem operation while the modem is in operation (showtime). Not unlike the Noise Monitor, two situations of different gravity level are expected: changes of the wiring conditions that only degrades the stability of the DSL line, and causes a reduction of noise margin, appearances of CVs, ES, . . . ; changes of the wiring conditions that impact catastrophically the stability of the line and are cause of a retrain. Examples of wiring condition variations that are to be expected to fall in this category are: 1) slow evolution of the direct and echo channel attenuation due to temperature variation of the loop—2) Sudden wiring connection change (bad splice, loose connector) impacting the perceived far end signal and echo power signal levels intermittently. In order to track those changes, two primitives are to be monitored on a per second basis: RX signal power and/or Magnitude and Phase primitive of the RX signal in the DS RX band; and Echo signal power and/or Magnitude and Phase primitive of the TX signal in the US TX band. The evolution of these primitives across contiguous seconds enables detection of sudden wiring connectivity problems, while observation across minutes or hours will provide the ability to track and log slow evolution of wiring changes.

Startup use case: to analyze wiring topology upon startup and determine to what extent it has evolved with respect to a previous startup Wiring Monitor session or a previous reference Wiring Inspector session. The primitives that may be monitored on startup are Hlog, Hlin (DS) or corresponding impulse response, and normalized Echo response in the frequency or time domain (i.e. normalized with Rxpath configuration changes such as AGC Gain, and delay caused by a Tx and Rx symbol boundary change). The Wiring monitor process compares the primitives collected to those obtained at a prior startup and flags any variation beyond a given threshold. It also passes on those primitives to an analysis engine module that is similar to the DELT-Hlog and SELT-UER analysis engine, in which the input will be limited to either DS Hlog (as opposed to US+DS Hlog) or to an Echo that is only captured in the relevant U0, U1, U2 band on startup during discovering or training, or as in whatever proprietary band during the R-P-Line Probe signaling. The output of this analysis provides similar information to that obtained by a Wiring Inspector session (loop length estimate, BT tap detection, etc.) with possibly less accuracy than the Wiring Inspector due to either the band limitation of the probing signals (DS for Hlog, and US for Line-Probe), and/or the duration of the signaling (Significantly less than SELT UER), and/or the constraint of the transmit signal levels (e.g. UPBO). Regardless of this accuracy, the objective of the wiring monitor on startup is to detect changes in wiring conditions and give a first indication of a possible change of wiring that can be further characterized by a Wiring Inspector session, using SELT and DELT in a disruptive manner.

Figure 17:
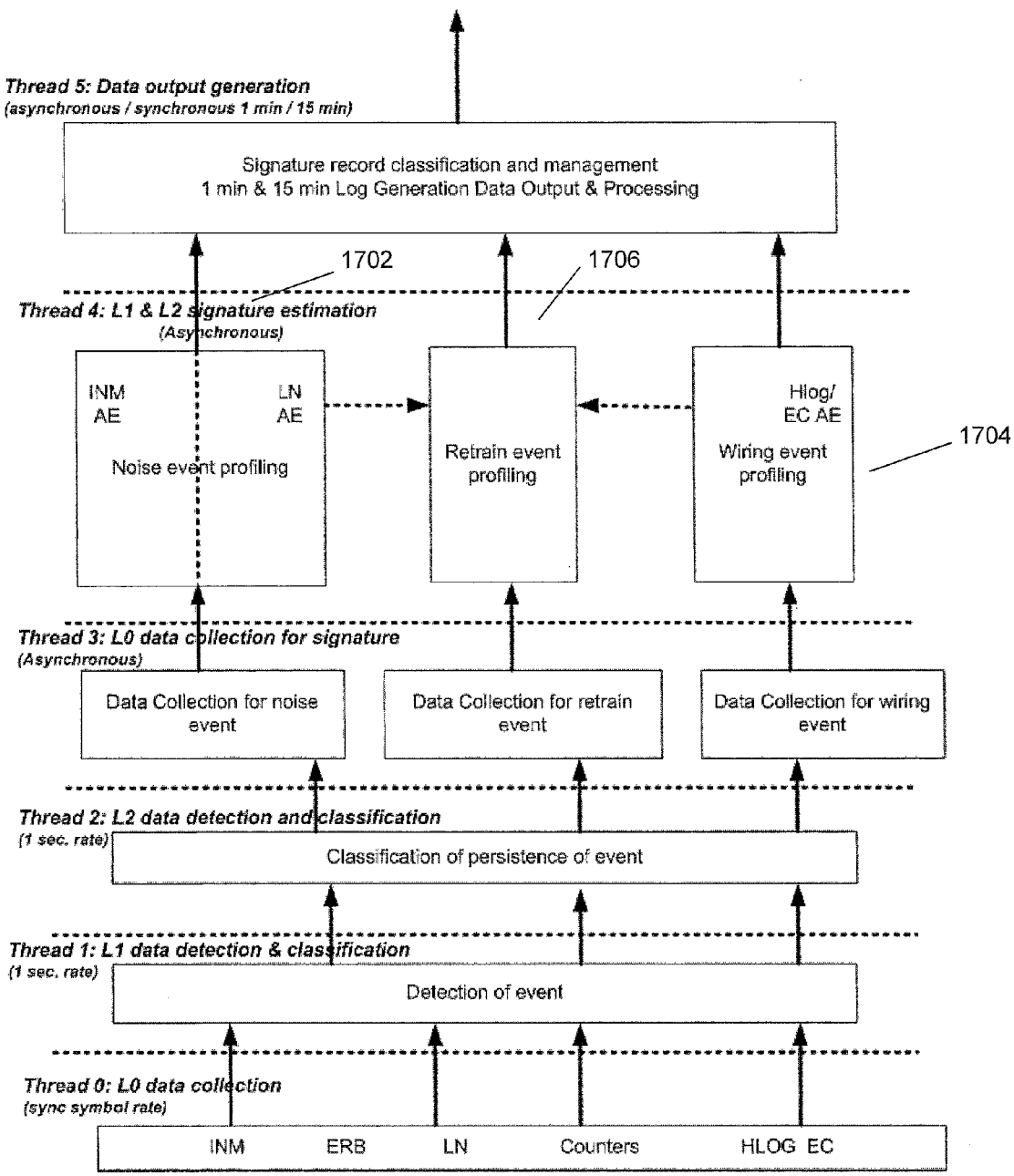
FIG. 17 is a flowchart illustrating an example wiring monitor process according to embodiments of the invention.

FIG. 17 illustrates an example process for implementing the "showtime" requirements of a wiring monitor according to embodiments of the invention. As shown in FIG. 17, it is organized in the same six thread structure as the Noise Monitor processing described in more detail above. Processing 1702 on the left side of the flowchart is associated with the Noise Analysis Engine. Processing 1704 on the right of the flowchart is associated with the Wiring Monitoring Analysis Engine. Both Analysis Engines are interconnected to a retrain event profiling Analysis Engine 1706 that determines upon a retrain event, if an environmental noise change or a wiring change is the source of the retrain.

The relevant threads 1704 of the wiring monitor are detailed below.

The lowest Thread is the L0 data collection. It is a repetitive thread, which sole objective is to retrieve from the FW/HW the raw L0 data on which analysis is to be performed. The characteristics of this thread of retrieval of the data onto which detection will be performed are: Smallest time granularity specified: e.g. sync symbol rate; Collection of primary data type, on which next immediate thread's detection process will be performed; Collection of secondary data type, on which Thread 3 data collection process will be performed for Thread 4 signature estimation of the wiring change.

Thread 0 can be implemented as a state machine polling required statuses at a rate of once per second or faster. The primitives polled are as follows.

SATN-pb: Signal Attenuation per band is a measured of the signal attenuation in the mth DS band.

LOS defect: Loss of Signal defect is a proprietary defect that reports the absence or loss of far end remote signal received at the receiver. Monitoring of the evolution of this defect will be a good indication of a disruption of the line at any point between CO and CPE. Echo indicator: Echo indicator is a proprietary metric of the TX echo signal (such as power of the echo over a subset of US tones). Monitoring of the evolution of this metric while in showtime will be a good indication of a disruption of the line at a point close to the CPE, since the echo power change will be caused by a change of impedance impacting the CPE.

Hlog/Hlin: Hlog/Hlin can be either derived from the FFT output signal power and or indirectly through FEQ coefficient phase and magnitude. It gives an accurate indication of the per tone direct channel attenuation in the DS bands. Analysis of the Hlog/Hlin or of its IFFT transform can help provide an estimate of the loop topology. Monitoring of the Hlog/Hlin transfer function or its corresponding time domain impulse response provides information as to the variation of the direct channel transfer function due to temperature over time. An Hlog computed based on FEQ coefficients may or may not allow the detection of sudden changes in the loop conditions, such as for a loose connection, if FEQ is frozen or averages out the instantaneous channel attenuation that the loose connection may induce momentarily. Echolog/Echolin (Echo): Echolog/Echolin can be either derived from the FFT output signal power and or indirectly through EC coefficients phase and magnitude, and give an accurate indication of the per tone echo channel attenuation in the US bands. Analysis of the Echo or of its IFFT transform can help provide an estimate of the loop topology, in a manner that is identical to SELT-UER. Monitoring of the echo transfer function or its corresponding time domain impulse response provides information as to the variation of the echo channel transfer function due to temperature over time.

Wiring monitor 1704 Thread 1 is a process that detects in the wiring primitives whether a wiring event has occurred. In general, the wiring event may consist in a value of a wiring parameter exceeding a given threshold, or the existence of a feature in the wiring primitive that is begin tracked: a large echo signal.

Wiring monitor 1704 Thread 2 is a persistence test that detects in the noise event, which in all generality can be qualified as a to a wiring parameter, or the evolution of a feature of the wiring primitive. An example of each is the persistence of an LOS signal detected on Thread 1 during consecutive seconds. The gradual evolution of an echo level on the echo power primitive following a temperature change of the loop over hours. Similar to the noise monitoring a wiring event database is created against which recurrent wiring events are matched over the course of 24 hours.

Based on the results of processing 1704 Threads 1 and 2, Wiring monitor Thread 3 collects additional information that are provided to Thread 4 for further characterization of the signature of the wiring event. For example, counters information can be fetched to be associated with the wiring event detected.

Wiring monitor 1704 Thread 4 qualifies the wiring event and extract a signature for this event. An example of such characterization is the logging of the Hlog attenuation of the loop over the 15 minute window to determine the min and max Hlog attenuation over the course of the day.

In concert with the retrain monitor logic, Thread 5 determines the reason for a possible retrain caused by a wiring event. Thread 5 also provides a report of the wiring events occurring within the 15 minute window and populate one minute hit and one minute duration counters in a manner identical to that of the noise monitor module.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A customer premises equipment (CPE) apparatus comprising:
   an embedded noise analysis engine implemented by a modem chipset that collects information regarding a noise affecting communications to and from the CPE apparatus and classifies the noise according to dimensions of frequency, time, and persistence,
   wherein the noise is classified as one from the group consisting of: a narrowband interferer and a wideband interferer, and is further classified as being one from the group consisting of: impulsive and continuous, and
   wherein the embedded noise analysis engine further tracks the appearance and disappearance of the classified noise, and wherein the classification in the persistence dimension further includes classifying the noise as one from the group consisting of: permanent, intermittent, and evolving.

2. The CPE apparatus according to claim 1 wherein the embedded noise analysis engine further produces an output comprising a descriptive structure of a constitution of the noise as one of a plurality of noise sources affecting the communications.

3. The CPE apparatus according to claim 1, wherein the embedded noise analysis engine further produces an output comprising a 15 minute counter report associated with the presence of each of the noise sources.

4. The CPE apparatus according to claim 1, wherein the communications comprise a DSL transmission system.

5. The CPE apparatus according to claim 1, wherein the communications comprise a wireline transmission system being one of Multi-Media over COAX, HPNA, IEEE P1901, HPAV, ITU-T G.hn.

6. The CPE apparatus according to claim 1, wherein the embedded noise analysis engine maintains an embedded noise signature database based on the classification.

7. The CPE apparatus according to claim 1, wherein the communications are performed using symbols transmitted at a symbol rate, and for a time period corresponding to several thousand symbols transmitted at the symbol rate.

8. The CPE apparatus according to claim 3, wherein the 15 minute counter report includes information regarding a duration of an impact of each of the noise sources.

9. The CPE apparatus according to claim 6, wherein the embedded noise signature database is updated every second for the noise.

10. The CPE apparatus according to claim 6, wherein the entire contents of the embedded noise signature database are updated asynchronously or periodically.

11. The CPE apparatus according to claim 7, wherein the symbol rate is about 4 kHz and the given time period is about 15 minutes.

12. The CPE apparatus according to claim 8, wherein the duration information of the impact of the noise sources includes a 1 minute counter counting the number of hits of the noise sources over each one minute interval.

13. The CPE apparatus according to claim 8, wherein the duration information of the impact of the individual noise sources includes a 1 minute counter counting the number of seconds during which the noise sources are declared present over a one minute interval.

14. A method of classifying noise implemented in a customer premises equipment (CPE) apparatus, the method comprising:
   detecting information regarding a noise affecting communications to and from the CPE apparatus and classifying the noise according to dimensions of frequency, time, and persistence;
   classifying the noise as one from the group consisting of: of a narrowband interferer and a wideband interferer, and as one from the group consisting of: impulsive and continuous; and
   tracking an appearance and disappearance of the classified noise;
   wherein the classification in the persistence dimension further includes classifying the noise as one from the group consisting of: permanent, intermittent, and evolving.

15. The method of claim 14, wherein the noise is a line noise, and wherein the data includes a line noise primitive.

16. The method of claim 14, wherein the noise is an impulse noise, and wherein the data includes an impulse noise primitive.

17. The method of claim 14, wherein the information regarding the noise includes PHY primitives comprising INM histograms, line referred noise, sliced symbol errors, and G.ploam counters.

18. The method according to claim 14, further comprising:
   determining, by the CPE apparatus, a persistence of the noise on the line, wherein the persistence includes measures of one from the group consisting of: a presence of the noise in a given time window and how a characteristic of the noise changes in the given time window;
   wherein the communications are performed using symbols transmitted at a symbol rate, and wherein the given time window is a period corresponding to several thousand symbols transmitted at the symbol rate.

19. The method according to claim 18, wherein the symbol rate is about 4 kHz and the given time period is about 15 minutes.

* * * * *